United States Patent
Takenaka et al.

(10) Patent No.: US 7,319,919 B2
(45) Date of Patent: Jan. 15, 2008

(54) CONTROL DEVICE AND FOOTSTEP DETERMINATION DEVICE FOR LEGGED MOBILE ROBOT

(75) Inventors: Toru Takenaka, Wako (JP); Takashi Matsumoto, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 665 days.

(21) Appl. No.: 10/511,360

(22) PCT Filed: Apr. 28, 2003

(86) PCT No.: PCT/JP03/05450

§ 371 (c)(1),
(2), (4) Date: Oct. 14, 2004

(87) PCT Pub. No.: WO03/090982

PCT Pub. Date: Nov. 6, 2003

(65) Prior Publication Data

US 2005/0228539 A1     Oct. 13, 2005

(30) Foreign Application Priority Data

Apr. 26, 2002 (JP) .............................. 2002-127682

(51) Int. Cl.
*G06F 19/00* (2006.01)
(52) U.S. Cl. ............ 700/245; 700/246; 700/251; 700/253; 700/260; 700/261; 318/568.1; 318/568.12; 318/568.16; 318/568.17; 318/568.2; 901/1; 901/9; 901/46; 180/8.1
(58) Field of Classification Search ........... 700/245, 700/246, 251, 253, 260, 261; 318/568.1, 318/568.12, 568.16, 568.17, 568.2; 901/1, 901/9, 46; 180/8.1, 8.6, 65.1; 701/23; 320/116, 320/120; 446/376, 384
See application file for complete search history.

(56) References Cited

U.S. PATENT DOCUMENTS 6,115,639 A * 9/2000 Takenaka .................... 700/85

(Continued)

FOREIGN PATENT DOCUMENTS

EP     1 083 120 A2     3/2001

(Continued)

OTHER PUBLICATIONS

WO 02/40224 A1, Gait Pattern Generating Device for Legged Mobile Robot, Publication Date: May 23, 2002.

(Continued)

*Primary Examiner*—Thomas Black
*Assistant Examiner*—McDieunel Marc
(74) *Attorney, Agent, or Firm*—Rankin, Hill, Porter & Clark LLP

(57) ABSTRACT

A landing position/orientation of a foot (22) to be landed in a landing action of a robot (1) such as a biped mobile robot or the like is estimated, and a desired footstep path for the robot (1) is set up. Based on the estimated landing position/orientation and the desired footstep path, a future desired landing position/orientation is determined in order to cause actual footsteps of the robot (1) (a sequence of landing positions/orientations of the foot (22)) to approach desired footsteps. Using at least the determined desired landing position/orientation, a desired gait for the robot (1) is determined, and the robot (1) is controlled in operation depending on the desired gait. For determining the desired landing position/orientation, mechanism-dependent limitations of the robot (1) such as an interference between the legs thereof, etc., and limiting conditions of an allowable range in which a desired ZMP can exist are taken into consideration.

42 Claims, 32 Drawing Sheets

U.S. PATENT DOCUMENTS

| | | | |
|---|---|---|---|
| 6,243,623 B1* | 6/2001 | Takenaka et al. | 700/245 |
| 6,301,524 B1* | 10/2001 | Takenaka | 700/245 |
| 6,353,773 B1* | 3/2002 | Takenaka | 700/245 |
| 6,922,609 B2* | 7/2005 | Takenaka et al. | 700/245 |
| 6,963,185 B2* | 11/2005 | Takenaka et al. | 318/568.12 |
| 6,969,965 B2* | 11/2005 | Takenaka et al. | 318/568.12 |
| 7,145,305 B2* | 12/2006 | Takenaka et al. | 318/568.12 |
| 7,221,999 B2* | 5/2007 | Sano | 700/254 |

FOREIGN PATENT DOCUMENTS

| | | |
|---|---|---|
| EP | 1 120 203 A1 | 8/2001 |
| JP | 05-318339 | 12/1993 |
| JP | 05-324115 | 12/1993 |
| JP | 10-086080 | 4/1998 |
| JP | 2002-326173 | 11/2002 |

OTHER PUBLICATIONS

WO 03/057425 A1, Gait Producing Device for Leg Type Movable Robot, and Control Device, Publication Date: Jul. 17, 2003.

* cited by examiner

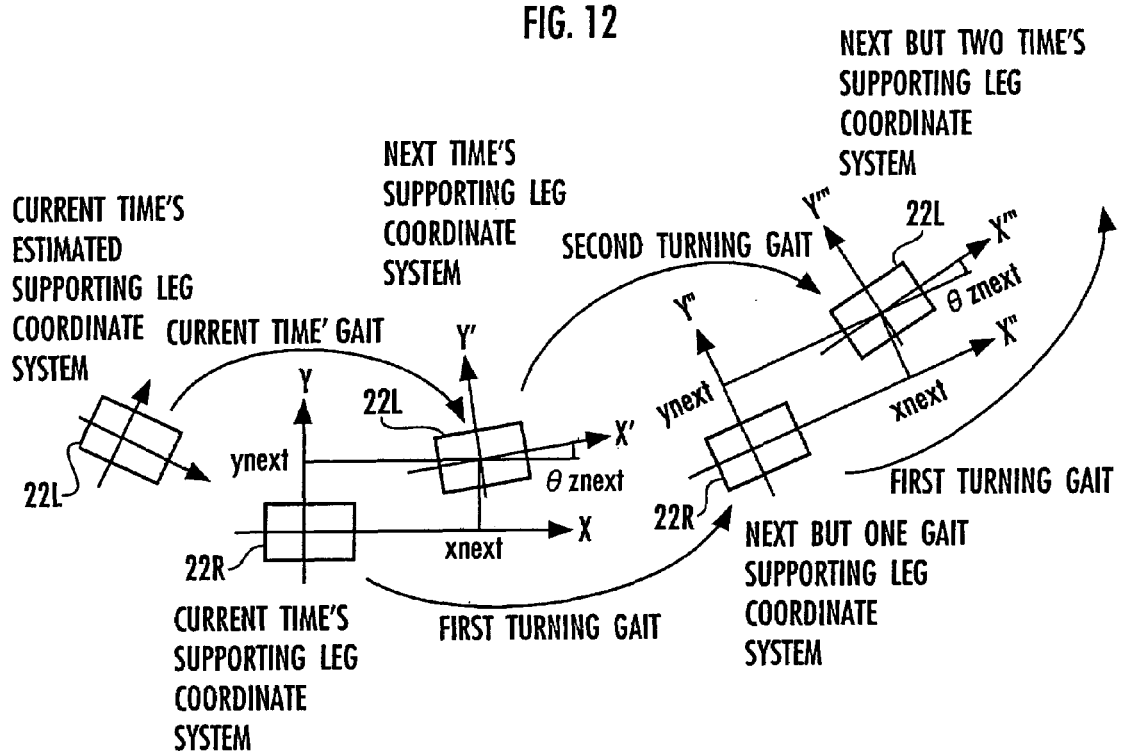

FIG. 13

ENTRY

S3000 DETERMINE CURRENT TIME'S SHORT-TERM DESIRED POINT Q(0) BASED ON REPRESENTATIVE POINT P(0) OF ESTIMATED SUPPORTING LEG COORDINATE SYSTEM AND DESIRED PATH

S3002 DETERTMINE REPRESENTATIVE CANDIDATE POINT R(0) OF NEXT TIME'S GAIT SUPPORTING LEG COORDINATE SYSTEM ON LINE SEGMENT P(0) Q(0)

S3004 DETERMINE POINT CLOSEST TO REPRESENTATIVE CANDIDATE POINT R(0) IN ALLOWABLE LANDING RANGE (SELF-DEPENDENT ALLOWABLE LANDING POSITION RANGE), AS P(1)

S3006 DETERMINE POSITION AND ORIENTATION OF NEXT TIME'S GAIT SUPPORTING LEG COORDINATE SYSTEM SO THAT POSITION OF REPRESENTATIVE POINT OF NEXT TIME'S GAIT SUPPORTING LEG COORDINATE SYSTEM IS P(1) AND DIRECTION OF X-AXIS OF NEXT TIME'S GAIT SUPPORTING LEG COORDINATE SYSTEM IS ORIENTATION OF LINE SEGMENT P(0)Q(0)

S3008 DETERMINE NEXT TIME'S SHORT-TERM DESIRED POINT Q(1) BASED ON REPRESENTATIVE POINT P(1) OF NEXT TIME'S GAIT SUPPORTING LEG COORDINATE SYSTEM AND DESIRED PATH

S3010 DETERTMINE REPRESENTATIVE CANDIDATE POINT R(1) OF NEXT BUT ONE TIME'S GAIT SUPPORTING LEG COORDINATE SYSTEM ON LINE SEGMENT P(1) Q(1)

S3012 DETERMINE POINT CLOSET TO REPRESENTATIVE CANDIDATE POINT R(1) IN ALLOWABLE LANDING RANGE (SELF-DEPENDENT ALLOWABLE LANDING POSITION RANGE), AS P(2)

S3014 DETERMINE POSITION AND ORIENTATION OF NEXT BUT ONE TIME'S GAIT SUPPORTING LEG COORDINATE SYSTEM SO THAT POSITION OF REPRESENTATIVE POINT OF NEXT BUT ONE TIME'S GAIT SUPPORTING LEG COORDINATE SYSTEM IS P(2) AND DIRECTION OF X-AXIS OF NEXT BUT ONE TIME'S GAIT SUPPORTING LEG COORDINATE SYSTEM IS ORIENTATION OF LINE SEGMENT P(1) Q(1)

RETURN

FIG. 21

ENTRY

S3200 DETERMINE CURVE THAT IS ASYMPTOTICALLY CLOSE TO DESIRED PATH BASED ON REPRESENTATIVE POINT P(0) OF ESTIMATED SUPPORTING LEG COORDINATE SYSTEM AND DESIRED PATH

S3202 DETERMINE REPRESENTATIVE CANDIDATE POINT R(0) OF NEXT TIME'S GAIT SUPPORTING LEG COORDINATE SYSTEM ON CURVE

S3204 DETERMINE POINT CLOSEST TO REPRESENTATIVE CANDIDATE POINT R(0) IN ALLOWABLE LANDING RANGE (SELF-DEPENDENT ALLOWABLE LANDING POSITION RANGE), AS P(1)

S3206 DETERMINE POSITION AND ORIENTATION OF NEXT TIME'S GAIT SUPPORTING LEG COORDINATE SYSTEM SO THAT POSITION OF REPRESENTATIVE POINT OF NEXT TIME'S GAIT SUPPORTING LEG COORDINATE SYSTEM IS P(1) AND DIRECTION OF X-AXIS OF NEXT TIME'S GAIT SUPPORTING LEG COORDINATE SYSTEM IS ORIENTATION OF LINE TANGENTIAL TO CURVE AT REPRESENTATIVE POINT P(1)

S3208 DETERMINE REPRESENTATIVE CANDIDATE POINT R(1) OF NEXT BUT ONE TIME'S GAIT SUPPORTING LEG COORDINATE SYSTEM ON CURVE

S3210 DETERMINE POINT CLOSET TO REPRESENTATIVE CANDIATE POINT R(1) IN ALLOWABLE LANDING RANGE (SELF-DEPENDENT ALLOWABLE LANDING POSITION RANGE), AS P(2)

S3212 DETERMINE POSITION AND ORIENTATION OF NEXT BUT ONE TIME'S GAIT SUPPORTING LEG COORDINATE SYSTEM SO THAT POSITION OF REPRESENTATIVE POINT OF NEXT BUT ONE TIME'S GAIT SUPPORTING LEG COORDINATE SYSTEM IS P(2) AND DIRECTION OF X-AXIS OF NEXT BUT ONE TIME'S GAIT SUPPORTING LEG COORDINATE SYSTEM IS ORIENTATION OF LINE TANGENTIAL TO CURVE AT REPRESENTATIVE POINT P(2)

RETURN

FIG. 24

ENTRY

S3300 DETERMINE DEVIATION e BY WHICH DESIRED ZMP EXCEEDS ALLOWABLE RANGE

S3302 $R(0) = Ka * e + R(0)$

S3304 DETERMINE POINT CLOSEST TO REPRESENTATIVE CANDIDATE POINT R(0) IN ALLOWABLE LANDING RANGE (SELF-DEPENDENT ALLOWABLE LANDING POSITION RANGE), AS P(1)

S3306 DETERMINE POSITION AND ORIENTATION OF NEXT TIME'S GAIT SUPPORTING LEG COORDINATE SYSTEM SO THAT POSITION OF REPRESENTATIVE POINT OF NEXT TIME'S GAIT SUPPORTING LEG COORDINATE SYSTEM IS P(1) AND DIRECTION OF X-AXIS OF NEXT TIME'S GAIT SUPPORTING LEG COORDINATE SYSTEM IS ORIENTATION OF LINE TANGENTIAL TO CURVE AT REPRESENTATIVE POINT P(1)

S3308 DETERMINE REPRESENTATIVE CANDIDATE POINT R(1) OF NEXT BUT ONE TIME'S GAIT SUPPORTING LEG COORDINATE SYSTEM ON CURVE

S3110 DETERMINE POINT CLOSEST TO REPRESENTATIVE CANDIATE POINT R(1) IN ALLOWABLE LANDING RANGE (SELF-DEPENDENT ALLOWABLE LANDING POSITION RANGE), AS P(2)

S3312 DETERMINE POSITION AND ORIENTATION OF NEXT BUT ONE TIME'S GAIT SUPPORTING LEG COORDINATE SYSTEM SO THAT POSITION OF REPRESENTATIVE POINT OF NEXT BUT ONE TIME'S GAIT SUPPORTING LEG COORDINATE SYSTEM IS P(2) AND DIRECTION OF X-AXIS OF NEXT BUT ONE TIME'S GAIT SUPPORTING LEG COORDINATE SYSTEM IS ORIENTATION OF LINE TANGENTIAL TO CURVE AT REPRESENTATIVE POINT P(2)

RETURN

FIG. 25

ENTRY

S3400 — DETERMINE CURRENT TIME'S SHORT-TERM DESIRED POINT Q(0) BASED ON REPRESENTATIVE POINT P(0) OF ESTIMATED SUPPORTING LEG COORDINATE SYSTEM AND DESIRED PATH

S3402 — DETERMINE REPRESENTATIVE POINT P(1) OF NEXT TIME'S GAIT SUPPORTING LEG COORDINATE SYSTEM ON LINE SEGMENT P(0) Q(0) SO AS NOT TO EXCEED ALLOWABLE LANDING RANGE (SELF-DEPENDENT ALLOWABLE LANDING POSITION RANGE)

S3404 — DETERMINE POSITION AND ORIENTATION OF NEXT TIME'S GAIT SUPPORTING LEG COORDINATE SYSTEM SO THAT POSITION OF REPRESENTATIVE POINT OF NEXT TIME'S GAIT SUPPORTING LEG COORDINATE SYSTEM IS P(1) AND DIRECTION OF X-AXIS OF NEXT TIME'S GAIT SUPPORTING LEG COORDINATE SYSTEM IS ORIENTATION OF LINE SEGMENT P(0) Q(0)

S3406 — DETERMINE NEXT TIME'S SHORT-TERM DESIRED POINT Q(1) BASED ON REPRESENTATIVE POINT P(1) OF NEXT TIME'S GAIT SUPPORTING LEG COORDINATE SYSTEM AND DESIRED PATH

S3408 — DETERMINE REPRESENTATIVE POINT P(2) OF NEXT BUT ONE TIME'S GAIT SUPPORTING LEG COORDINATE SYSTEM ON LINE SEGMENT P(1) Q(1) SO AS NOT TO EXCEED ALLOWABLE LANDING RANGE (SELF-DEPENDENT ALLOWABLE LANDING POSITION RANGE)

S3410 — DETERMINE POSITION AND ORIENTATION OF NEXT BUT ONE TIME'S GAIT SUPPORTING LEG COORDINATE SYSTEM SO THAT POSITION OF REPRESENTATIVE POINT OF NEXT BUT ONE TIME'S GAIT SUPPORTING LEG COORDINATE SYSTEM IS P(2) AND DIRECTION OF X-AXIS OF NEXT BUT ONE TIME'S GAIT SUPPORTING LEG COORDINATE SYSTEM IS ORIENTATION OF LINE SEGMENT P(1) Q(1)

RETURN

FIG. 28

```
ENTRY
│
│                                                                S3600
├─[ SET FIRST TURNING GAIT DETERMINED IN LAST CONTROL PERIOD AS
│    CURRENT TIME'S GAIT, AND SECOND TURNING GAIT AS NEXT TIME'S GAIT ]
│                                                                S3602
├─[ CALCULATE PREDICTED NEXT TIME'S LANDING POSITION/POSTURE AND
│    PREDICTED NEXT BUT ONE TIME'S LANDING POSITION/POSTURE BASED ON
│    ESTIMATED SUPPORTING LEG COORDINATE SYSTEM, AND CURRENT TIME'S
│    DESIRED GAIT AND NEXT TIME'S DESIRED GAIT ]
│                                                                S3604
├─[ CALCULATE PREDICTED NEXT TIME'S LANDING POSITION DEVIATION AND
│    PREDICTED NEXT TIME'S LANDING ORIENTATION DEVIATION, WHICH ARE
│    POSITIONAL DEIVATION AND ORIENTATIONAL DEVIATION FROM DESIRED
│    PATH OF PREDICTED NEXT TIME'S LANDING POSITION/POSTURE ]
│                                                                S3606
├─[ CALCULATE PREDICTED NEXT BUT ONE TIME'S LANDING POSITION
│    DEVIATION AND PREDICTED NEXT BUT ONE TIME'S LANDING ORIENTATION
│    DEVIATION, WHICH ARE POSITIONAL DEIVATION AND ORIENTATIONAL
│    DEVIATION FROM PATH OF PREDICTED NEXT BUT ONE TIME'S LANDING
│    POSITION/POSTURE ]
│                                                                S3608
├─[ CORRECT POSITION AND ORIENTATION OF NEXT TIME'S GAIT SUPPORTING
│    LEG COORDINATE SYSTEM AND POSITION AND ORIENTATION OF
│    NEXT BUT ONE TIME'S GAIT SUPPORTING LEG COORDINATE SYSTEM
│    BASED ON ABOVE DEVIATION ]
│
RETURN
```

CONTROL DEVICE AND FOOTSTEP DETERMINATION DEVICE FOR LEGGED MOBILE ROBOT

TECHNICAL FIELD

The present invention relates to a legged mobile robot such as a biped mobile robot or the like, and more particularly to an apparatus for guiding the path (guiding the trajectory) of such a legged mobile robot.

BACKGROUND ART

Generally, legged mobile robots which move by repeating lifting and then landing actions of each of a plurality of legs are problematic in that as the moving speed of the robot increases, the frictional force between the foot at the distal end of a leg and the floor reaches a limit due to reactive forces produced when the leg swings, causing an angular slippage between the foot and the floor, so that the robot as a whole has its posture turned about a vertical axis and tends to deviate from the direction of a desired gait or from a desired path.

Additionally, only a desired gait for keeping the body of a robot in a vertical posture (upstanding posture) at all times and causing the robot to walk straight is not necessarily generated. At a desired gait, the entire robot or the body of the robot may turn or may be tilted forwardly, rearwardly, leftwardly, and rightwardly. That is, there is a posture rotation of the entire robot (or a posture rotation of a representative region such as the body of the robot) even at a desired gait. In the present specification, a posture rotation at a desired gait will be referred to as a desired posture rotation.

The robot tends to be displaced from the direction of a desired gait or from a desired path basically due to the phenomenon that an actual posture rotation of the entire robot (or an actual posture rotation of a representative region such as the body) deviates from the desired posture rotation. This phenomenon should strictly be called "perturbation from the desired posture rotation" or "posture rotation perturbation". However, if there is no danger of confusion of the phenomenon with the desired posture rotation, then it will be shortened into "posture rotation". A phenomenon that the robot in its entirety is rotated in posture about the vertical axis and deviates from the direction of a desired gait will hereinafter referred to as "spin".

In order to solve the above problems, it is necessary to recognize the position of the robot and the direction in which the robot moves, and perform trajectory guidance control for preventing the robot from deviating from a desired path.

Known systems for path guidance control include trajectory guidance control systems for flight vehicles such as rockets and unmanned vehicles. However, it has been difficult to apply these control systems directly for controlling legged mobile robots. There are three reasons, for example, for the difficulty as described below.

First, many regions such as the body of a robot are intensively accelerated and decelerated even while the robot is making one step, and it has been difficult to accurately recognize an actual position and posture (orientation) of those regions.

Secondly, even when a robot moves straight, for example, the position or posture of the body, which is a representative part, of the robot needs to swing to the left and right at all times in order to keep the robot in dynamic balance. Therefore, the speed of the body and the traveling direction (moving direction) thereof are not in harmony with each other. Furthermore, since the robot can move in any desired directions irrespective of the orientation of the body, the orientation of the body and the traveling direction thereof are not necessarily in agreement with each other. That is, simply observing an instantaneous motion status of the robot, such as the speed of the body, the orientation of the robot, etc., fails to determine whether the robot is going to deviate from the desired path or not.

Thirdly, since the robot has to be kept in posture balance and the capability limits of actuators must not be exceeded, the robot has been unable to abruptly change the gait. For example, if the robot is to abruptly change the landing position for a foot thereof immediately before the foot lands on the floor, the robot may be unable to change the landing position because the speeds or forces of actuators may be likely to exceed their limits. Even when the robot can change the landing position, the robot may possibly be thrown out of balance after the foot has landed on the floor.

As described above, it has been difficult to simply apply the conventional path guidance technology to robots.

The present invention has been made in view of the above background. It is an object of the present invention to provide a control apparatus for controlling a legged mobile robot to appropriately perform a path guidance (trajectory guidance) process for guiding the robot to follow a desired path.

Another object of the present invention is to provide a control apparatus for controlling a legged mobile robot to move smoothly without going out of a limited range even when the landing position for each leg is limited upon each step, as when the robot moves on steppingstones or a staircase.

Still another object of the present invention is to provide a footstep determining apparatus which is capable of appropriately determining desired footsteps for a robot as a row of landing positions/directions for legs based on a given desired path or a limited range of landing positions with respect to steppingstones, before the robot moves or in a simulation performed by an offline computer.

DISCLOSURE OF THE INVENTION

To achieve the above objects, according to a first invention, there is provided an apparatus for controlling a legged mobile robot which is movable by repeating lifting and then landing actions of each of a plurality of legs, characterized by foot landing position/orientation estimating means for estimating a landing position and landing orientation of the foot of each of the legs which is landed in each landing action of the robot, desired path setting means for setting a desired footstep path for the robot, desired foot landing orientation determining means for determining a desired landing orientation of the foot which is landed in at least either one of subsequent landing actions of the robot in order to cause actual footsteps of the robot to approach the desired footstep path based on at least the estimated landing position and landing orientation of the foot and the desired footstep path, desired gait determining means for determining a desired gait for the robot using at least the desired landing orientation determined by the desired foot landing orientation determining means, and operation control means for controlling operation of the robot depending on the determined desired gait.

According to the first invention, attention is focused on a landing position and landing orientation (hereinafter also referred to as a landing position/orientation) of the foot of each of the legs which is landed in each landing action of the robot, and the landing position/orientation of the foot is used as representing the position and moving orientation of the robot. An actual landing position/orientation of the foot is estimated, and a desired footstep path is set up as a target for footsteps of the robot represented by a sequence of landing positions/orientations. Based on the estimated landing position/orientation and the desired footstep path, a desired landing orientation of the foot which is landed in at least either one of subsequent landing actions of the robot in order to cause actual footsteps (a sequence of landing positions/orientations that are estimated) of the robot to approach the desired footstep path. That is, a desired landing orientation for the foot to be landed in a future landing action is determined. A desired gait for the robot is determined using at least the determined desired landing orientation, and the robot is controlled in operation depending on the desired gait.

The landing positions/orientations of the feet of the robot are less liable to suffer frequent variations than other parts of the robot, such as a body thereof. Even when an angular slippage (spin) occurs between the foot and the floor, any change in the landing position of the foot due to the angular slippage is small, and the stability of a change in the landing orientation is high. Therefore, the landing position/orientation of the foot is stabler as representing a position and moving direction of the robot than the other parts of the robot. Therefore, when a landing position/orientation of the foot is estimated, the estimated landing position/orientation is suitable as representing an actual position and moving direction of the robot. As a result, according to the first invention, the robot can appropriately be guided for movement along a path.

In the first invention, the desired landing orientation preferably comprises an orientation about a vertical axis, and the landing orientation estimated by the foot landing position/orientation estimating means preferably includes at least an orientation about a vertical axis (second invention). This is because an actual moving path of the robot is mainly determined by the orientation of the landed foot about the vertical axis.

In the first invention or the second invention, if the legged mobile robot comprises a biped mobile robot having two legs, the desired landing orientation determined by the desired foot landing orientation determining means preferably includes at least a desired landing orientation of the foot which is to be landed in a next time's landing action of the robot and a desired landing orientation of the foot which is to be landed in a next but one time's landing action of the robot, and the desired gait determining means preferably determines a desired gait which defines the next time's landing action of the robot using at least the desired landing orientation determined by the desired foot landing orientation determining means for the next time's landing action and the next but one time's landing action (third invention).

With the biped mobile robot, by determining next time's and next but one time's desired landing positions/orientations and determining a desired gait which defines the next time's landing action using at least the desired landing orientations, it is possible to determine a desired gait taking into account a next but two time's desired landing orientation when the desired gait which defines the next time's landing action is determined. As a consequence, the robot can be moved highly stably while causing the actual footstep path of the robot to approach the desired footstep path.

In the first through third inventions, preferably the desired foot landing orientation determining means determines a desired landing position for the foot which determines the desired landing orientation, together with the desired landing orientation, based on at least the landing position and landing orientation of the foot estimated by the foot landing position/orientation estimating means and the desired footstep path, and the desired gait determining means determines the desired gait using the desired landing position and the desired landing orientation which are determined by the desired foot landing orientation determining means (fourth invention).

With the above arrangement, not only the desired landing orientation, but also the desired landing position, are determined, and they are used in determining the desired gait. Thus, the desired gait for causing the footstep path of the robot to approach the desired footstep path more smoothly can be determined.

In the fourth invention, preferably, the desired foot landing orientation determining means comprises means for determining a desired landing orientation about a vertical axis and a desired landing position of the foot which is to be landed in at least several landing actions ahead including a next time's landing action, based on at least the landing position and landing orientation estimated by the foot landing position/orientation estimating means and the desired footstep path, the desired gait determining means comprises means for determining a desired gait which defines the next time's landing action using at least the desired landing position and desired landing orientation of the foot in the several landing actions ahead, which are determined by the desired foot landing orientation determining means, and the desired foot landing orientation determining means determines a combination of a desired landing position and a desired landing orientation of the foot within a self-dependent allowable landing range determined under mechanism-dependent limiting conditions of the robot itself, which include an interference between the leg making the next time's landing action and the other leg, when a desired landing position and a desired landing orientation of the foot corresponding to at least the next landing action are to be determined (fifth invention). The several landing actions may be one landing action.

According to the fifth invention, when a next time's desired landing position/orientation is to be determined, a combination of the desired landing position/orientation is determined within the self-dependent allowable landing range. Therefore, not only the ability to follow the desired footstep path, but also the mechanism-dependent limiting conditions of the robot itself, which include an interference between the leg making the next time's landing action and the other leg, are taken into consideration. Therefore, a desired gait for causing the footstep path of the robot to follow the desired footstep path and preventing the legs of the robot from interfering with each other is determined to move the robot smoothly.

The self-dependent allowable landing range is preferably set based on a map or formula which is determined in advance as defining a relative allowable landing range of the foot to be landed in the next time's landing action, with respect to the foot landed in the landing action (sixth invention). As the self-dependent allowable landing range depends upon a relative positional and orientational relationship between the landed foot and the foot to be landed next, that relationship may be represented by a map or formula for reducing calculating loads that are imposed when the self-dependent allowable landing range is determined.

In the fifth or sixth invention, preferably, the desired gait determining means comprises means for provisionally determining a desired ZMP in the desired gait which defines the next time's landing action using at least the desired landing position and desired landing orientation determined by the desired foot landing orientation determining means, and the desired foot landing orientation determining means corrects at least either one of the desired landing position and desired landing orientation of the foot to be landed in at least either one of the several landing actions ahead when the provisionally determined desired ZMP does not satisfy predetermined limiting conditions (seventh invention).

A desired ZMP for a gait which satisfies dynamic equilibrium conditions is affected by the desired landing position or the desired landing orientation, and needs to exist in a landing surface of the robot (more accurately, within a so-called supporting polygonal shape). Therefore, if the desired ZMP does not satisfy predetermined limiting conditions (specifically, conditions in which the desired ZMP can exist), at least either one of the desired landing position and desired landing orientation of the foot to be landed in at least either one of the several landing actions ahead is corrected to determine a desired gait which is capable of causing the footsteps of the robot to follow the desired footstep path while keeping the robot in dynamic stability.

In the fourth through seventh inventions, if the legged mobile robot comprises a biped mobile robot having two legs, the desired landing position for the foot preferably comprises a representative point having a predetermined positional relationship to each foot and a desired position for a representative point which is determined in advance with respect to each foot such that the representative point with respect to each foot becomes an identical point for both feet when the robot is upstanding in a predetermined reference symmetrical posture, and the desired footstep path preferably comprises a path to be approached by the representative point (eighth invention). With this arrangement, the desired footstep path may be shared by the feet of the left and right legs of the robot.

In the eighth invention, the representative point preferably comprises a point set up near the heel or toe of each foot (ninth invention). This makes it possible to prevent the feet from interfering with each other when the feet are landed closely to each other.

According to a tenth invention, there is provided an apparatus for controlling a legged mobile robot which is movable by repeating lifting and then landing actions of each of a plurality of legs to determine a desired gait, control operation of the robot depending on the desired gait, determine a hypothetical periodic gait following a new desired gait when the new desired gait is determined each time the foot of each leg of the robot is landed in at least each landing action of the robot, and determines the desired gait so as to approach the periodic gait, comprising foot landing position/orientation estimating means for estimating a landing position and landing orientation of the foot of each of the legs which is landed in each landing action of the robot, desired path setting means for setting a desired footstep path for the robot, desired foot landing position/orientation provisionally determining means for provisionally determining a desired landing position and desired landing orientation of the foot which is landed in at least either one of subsequent landing actions of the robot based on at least either one of a latest desired gait and the periodic gait corresponding to the desired gait, and the estimated landing position and landing orientation of the foot, desired foot landing position/orientation correcting means for correcting at least either one of the provisionally determined desired landing position and desired landing orientation in order to cause actual footsteps of the robot to approach the desired footstep path based on the provisionally determined desired landing position and desired landing orientation and the desired footstep path, and desired gait determining means for determining the new desired gait for the robot using at least the corrected desired landing position and desired landing orientation.

According to the tenth invention, as with the first invention, attention is focused on a landing position and landing orientation of the foot of the robot, and the landing position/orientation of the foot is used as representing the position and moving orientation of the robot. According to the tenth invention, a desired landing position and desired landing orientation of the foot which is landed in at least either one of subsequent landing actions of the robot is provisionally determined based on at least either one of a latest desired gait (a latest one of already determined desired gaits) and the periodic gait corresponding to the desired gait, and the estimated landing position and landing orientation of the foot. Then, at least either one of the provisionally determined desired landing position and desired landing orientation is corrected in order to cause actual footsteps of the robot to approach the desired footstep path based on the provisionally determined desired landing position and desired landing orientation and the desired footstep path. The new desired gait for the robot is determined using at least the corrected desired landing position and desired landing orientation, and the robot is controlled in operation depending on the desired gait. According to the tenth invention, therefore, the robot can appropriately be guided for movement along a path while keeping the robot in continued stability.

In the tenth invention, as with the second invention, preferably, the desired landing orientation comprises an orientation about a vertical axis, and the landing orientation estimated by the foot landing position/orientation estimating means includes at least an orientation about a vertical axis (eleventh invention).

In the tenth or eleventh invention, preferably, the desired gait determining means comprises means for provisionally determining a desired ZMP in the new desired gait using at least the desired landing position and desired landing orientation corrected by the desired foot landing position/orientation correcting means, and the desired foot landing position/orientation correcting means corrects at least either one of the desired landing position and desired landing orientation in at least either one of the several landing actions, which has been provisionally determined by the desired foot landing position/orientation provisionally determining means, when the provisionally determined desired ZMP does not satisfy predetermined limiting conditions (twelfth invention).

With the above arrangement, it is possible to determine a desired gait which is capable of causing the footsteps of the robot to follow the desired footstep path while keeping the robot in dynamic stability, as with the seventh invention.

In the tenth through twelfth inventions, if the legged mobile robot comprises a biped mobile robot having two legs, the desired landing position for the foot preferably comprises a representative point having a predetermined positional relationship to each foot and a desired position for a representative point which is determined in advance with respect to each foot such that the representative point with respect to each foot becomes an identical point for both feet when the robot is upstanding in a predetermined reference symmetrical posture, and the desired footstep path preferably comprises a path to be approached by the representative point (thirteenth invention). In the thirteenth invention, the representative point preferably comprises a point set up near the heel or toe of each foot (fourteenth invention). The thirteenth invention and the fourteenth invention offer the same operation and advantages as the eighth invention and the ninth invention, respectively.

According to a fifteenth invention, there is provided an apparatus for controlling a legged mobile robot which is movable by repeating lifting and then landing actions of each of a plurality of legs, comprising foot landing position/orientation estimating means for estimating a landing position and landing orientation of the foot of each of the legs which is landed in each landing action of the robot, allowable foot landing range setting means for setting a plurality of environment-dependent allowable landing ranges corresponding to several landing actions ahead which include at least next time's and next but one time's landing actions, of environment-dependent allowable landing ranges determined under environmental conditions in which the robot moves, which are allowable ranges of combinations of landing positions and landing orientations of feet landed in the landing actions of the robot, desired foot landing position/orientation determining means for determining combinations of desired landing positions and desired landing orientations of feet to be landed in the several landing actions ahead in order to satisfy the environment-dependent allowable landing position ranges, based on at least the estimated landing orientation of the foot and a plurality of environment-dependent allowable landing position ranges set by the allowable foot landing range setting means, desired gait determining means for determining a hypothetical periodic gait of the robot using at least the determined desired landing positions and desired landing orientations corresponding to the determined several landing actions ahead, and determining a new desired gait for the robot which defines at least the next time's landing action in order to approach the determined hypothetical periodic gait, and operation control means for controlling operation of the robot depending on the determined new desired gait.

According to the fifteenth invention, as with the first invention, attention is focused on a landing position and landing orientation of the foot of the robot, and the landing position/orientation of the foot is used as representing the position and moving orientation of the robot. According to the fifteenth invention, environment-dependent allowable landing ranges are set up instead of the desired footstep path, and combinations of desired landing positions and desired landing orientations of feet to be landed in the several landing actions ahead are determined in order to satisfy the environment-dependent allowable landing position ranges, based on at least the estimated landing orientation of the foot and environment-dependent allowable landing position ranges. A hypothetical periodic gait of the robot is determined using at least the determined desired landing positions and desired landing orientations, and a new desired gait for the robot which defines at least the next time's landing action is determined in order to approach the determined hypothetical periodic gait. The robot is then controlled in operation depending on the determined new desired gait.

According to the fifteenth invention, a desired gait for satisfying the environment-dependent allowable landing position ranges (not deviating from those ranges) in each landing action while keeping the robot in continued stability is determined to move the robot. Therefore, when the robot moves on steppingstones or the like, the rotor can be controlled to move in continued stability while preventing the feet from stepping out of an allowable landing range such as the stepping stones or the like.

In the fifteenth invention, as with the second invention, preferably the desired landing orientation comprises an orientation about a vertical axis, and the landing orientation estimated by the foot landing position/orientation estimating means includes at least an orientation about a vertical axis (sixteenth invention).

In the fifteenth or sixteenth invention, preferably the desired foot landing position/orientation determining means determines a combination of a desired landing position and desired landing orientation for the foot in at least the next time's landing action within a common region of a self-dependent allowable landing range determined under mechanism-dependent limiting conditions of the robot itself, which include an interference between the leg making the next time's landing action and the other leg, and the environment-dependent allowable landing range corresponding to the next time's landing action, and the desired gait determining means uses the desired landing position and desired landing orientation for the foot to be landed in at least the next time's landing action in order to determine the hypothetical periodic gait (seventeenth invention).

With the above arrangement, when a desired landing position and desired landing orientation for the foot in at least the next time's landing action is to be determined, a combination of a desired landing position and desired landing orientation is determined in a common region of the environment-dependent allowable landing range and a self-dependent allowable landing range. Therefore, not only limiting conditions posed on landing positions/orientations due to the environment-dependent allowable landing range, but also the mechanism-dependent limiting conditions of the robot itself, which include an interference between the leg making the next time's landing action and the other leg, are taken into account. Consequently, a desired gait for preventing the legs of the robot from interfering with each other while satisfying the conditions on the landing positions/orientations due to the environment-dependent allowable landing range is determined to move the robot smoothly.

In the seventeenth invention, the self-dependent allowable landing range is preferably set based on a map or formula which is determined in advance as defining a relative allowable landing range of the foot to be landed in the next time's landing action, with respect to the foot landed in the landing action (eighteenth invention). With this arrangement, as with the sixth invention, calculating loads can be reduced when the self-dependent allowable landing range is determined.

In the fifteenth through eighteenth inventions, preferably, the desired gait determining means comprises means for provisionally determining a desired ZMP in the desired gait for the robot which defines at least the next time's landing action, and the desired foot landing position/orientation determining means corrects at least either one of the desired landing position and desired landing orientation of the foot to be landed in at least either one of the several landing actions ahead when the provisionally determined desired ZMP does not satisfy predetermined limiting conditions (nineteenth invention).

According to the nineteenth invention, as with the seventh invention, it is possible to determine a desired gait which is capable of causing the footsteps of the robot to follow the desired footstep path while keeping the robot in dynamic stability.

In the fifteenth through nineteenth inventions, if the legged mobile robot comprises a biped mobile robot having two legs, the desired landing position for the foot preferably comprises a representative point having a predetermined positional relationship to each foot and a desired position for a representative point which is determined in advance with respect to each foot such that the representative point with respect to each foot becomes an identical point for both feet when the robot is upstanding in a predetermined reference symmetrical posture (twentieth invention). With this arrangement, since the environment-dependent allowable landing range and the self-dependent allowable landing range are each set up as an allowable range of combinations of the position of the representative point and the desired landing orientation of the foot, they can easily be set up.

In the twentieth invention, the representative point preferably comprises a point set up near the heel or toe of each foot (twenty-first invention). This arrangement offers the same operation and advantages as the ninth invention.

According to a twenty-second invention, there is provided an apparatus for controlling a legged mobile robot which is movable by repeating lifting and then landing actions of each of a plurality of legs, comprising foot landing position/orientation estimating means for estimating a landing position and landing orientation of the foot of each of the legs which is landed in each landing action of the robot, first allowable landing range setting means for setting a plurality of environment-dependent allowable landing ranges corresponding to several landing actions ahead which include at least next time's and next but one time's landing actions, of environment-dependent allowable landing ranges determined under environmental conditions in which the robot moves, which are allowable ranges of combinations of landing positions and landing orientations of feet landed in the landing actions of the robot, second allowable landing range setting means for setting a self-dependent allowable landing range for a combination of a landing position and landing orientation of the foot to be landed in the next time's landing action, based on a desired landing position and desired landing orientation of the foot in each landing action which are estimated by the foot landing position/orientation estimating means and mechanism-dependent limiting conditions of the robot itself, which include an interference between the leg making the next time's landing action and the other leg, desired foot landing position/orientation determining means for determining a combination of a desired landing position and desired landing orientation of a foot to be landed in the next time's landing action within a common region of the environment-dependent allowable landing range and the self-dependent allowable landing range which are set respectively by the first allowable landing range setting means and the second allowable landing range setting means for at least the next time's landing action, based on the environment-dependent allowable landing range and the self-dependent allowable landing range, desired gait determining means for determining a desired gait which defines the next time's landing action using at least the determined desired landing position and desired landing orientation, and operation control means for controlling operation of the robot depending on the determined desired gait.

According to the twenty-second invention, as with the first invention, attention is focused on a landing position and landing orientation of the foot of the robot, and the landing position/orientation of the foot is used as representing the position and moving orientation of the robot. According to the twenty-second invention, the environment-dependent allowable landing range and the self-dependent allowable landing range are set up, and a combination of a desired landing position and desired landing orientation of a foot to be landed in the next time's landing action within a common region of those ranges. A desired gait which defines the next time's landing action is determined using at least the determined desired landing position and desired landing orientation, and the robot is controlled in operation depending on the determined desired gait.

According to the twenty-second invention, therefore, a desired gait for satisfying both the environment-dependent allowable landing position ranges and the self-depending allowable landing range (not deviating from those ranges) in each landing action is determined to move the robot. Therefore, when the robot moves on stepping stones or the like, the rotor can be controlled to move while preventing the feet from stepping out of an allowable landing range such as the stepping stones or the like or from interfering with each other.

In the twenty-second invention, the desired landing orientation preferably comprises an orientation about a vertical axis, and the landing orientation estimated by the foot landing position/orientation estimating means preferably includes at least an orientation about a vertical axis (twenty-third invention).

In the twenty-second or twenty-third invention, preferably, the desired foot landing position/orientation determining means comprises means for determining the desired landing position and desired landing orientation corresponding to the next time's landing action and thereafter provisionally determining a self-dependent allowable landing range for the landing position of the foot to be landed in the next but one time's landing action based on the determined desired landing position and desired landing orientation and the mechanism-dependent limiting conditions of the robot, and means for correcting at least either one of the desired landing position and desired landing orientation corresponding to the next time's landing action in order to have a common region of at least the provisionally determined self-dependent allowable landing range corresponding to the next but one time's landing action and the next but one time's environment-dependent allowable range set by the first allowable landing range setting means for the next but one time's landing action, if the common region is not provided (twenty-fourth invention).

With the above arrangement, when the next but one time's environment-dependent allowable range and the self-dependent allowable landing range corresponding to the next but one time's landing action which is provisionally determined for the next time's desired landing position/orientation have no common region, the next time's desired landing position/orientation that has previously been determined is corrected to provide such a common region. That is, the next time's desired landing position/orientation is appropriately corrected and determined so that the next but one time's environment-dependent allowable range and the next but one time's self-dependent allowable landing range have a common region. Stated otherwise, the desired landing position/orientation in each landing action is determined for determining, continuously in the future, the desired landing position/orientation which satisfies a common region of the environment-dependent allowable range and the self-dependent allowable landing range. As a result, when the robot moves on stepping stones or the like, the robot is allowed to move continuously without stopping while in motion.

In the twenty-second through twenty-fourth inventions, the second allowable landing range setting means preferably sets the self-dependent allowable landing range based on a map or formula which is determined in advance as defining a relative allowable landing range of the foot to be landed in the next time's landing action, with respect to the foot landed in the landing action (twenty-fifth invention). With this arrangement, as with the sixth invention, calculating loads that are imposed when the self-dependent allowable landing range is determined can be reduced.

In the twenty-second through twenty-fifth inventions, if the legged mobile robot comprises a biped mobile robot having two legs, the desired landing position for the foot preferably comprises a point having a predetermined positional relationship to each foot and a position of a representative point which is determined in advance with respect to each foot such that the representative point with respect to each foot becomes an identical point for both feet when the robot is upstanding in a predetermined reference symmetrical posture (twenty-sixth invention). With this arrangement, since the environment-dependent allowable landing range and the self-dependent allowable landing range are each set up as an allowable range of combinations of the desired position of the representative point and the desired landing orientation of the foot, they can easily be set up.

In the twenty-sixth invention, the representative point preferably comprises a point set up near the heel or toe of each foot (twenty-seventh invention). This arrangement offers the same operation and advantages as the ninth invention.

According to a twenty-eighth invention, there is provided a footstep determining apparatus for determining a desired landing position and desired landing orientation for the foot of a leg to be landed in each landing action of a legged mobile robot which is movable by repeating lifting and then landing actions of each of a plurality of legs, comprising desired path setting means for setting a desired footstep path for the robot, wherein the desired landing position and desired landing orientation for the foot to be landed in each landing action of the robot are determined based on the desired landing position and desired landing orientation for the foot landed in at least the preceding landing action, and the desired footstep path.

According to the twenty-eighth invention, as with the first invention, attention is focused on a landing position and landing orientation of the foot of the robot, and the landing position/orientation of the foot is used as representing the position and moving orientation of the robot. According to the twenty-eighth invention, a desired landing position and desired landing orientation for the foot of a leg to be landed in each landing action is determined based on the desired landing position and desired landing orientation for the foot landed in at least the preceding landing action, and the desired footstep path. Therefore, before the robot starts moving, a sequence of desired landing positions/orientations for following the desired footstep path, i.e., desired footsteps, can properly be determined.

In the twenty-eighth invention, the desired landing orientation preferably comprises an orientation about a vertical axis (twenty-ninth invention).

In the twenty-eighth or twenty-ninth invention, when a desired landing position and desired landing orientation for the foot to be landed in each landing action of the robot is to be determined, a combination of a desired landing position and desired landing orientation for the foot in the landing action is preferably determined in a self-dependent allowable landing range which is determined under mechanism-dependent limiting conditions of the robot itself, which include an interference between the leg making the landing action and the other leg (thirtieth invention).

According to the thirtieth invention, when a desired landing position and desired landing orientation in each landing action is to be determined, since a combination of a desired landing position and desired landing orientation is determined within the self-dependent allowable landing range, not only the ability to follow the desired footstep path, but also the mechanism-dependent limiting conditions of the robot itself, which include an interference between the leg making the next time's landing action and the other leg, are taken into consideration. Therefore, a sequence of desired landing positions/orientations (desired footsteps) for causing the footstep path of the robot to follow the desired footstep path and preventing the legs of the robot from interfering with each other is determined.

In the thirtieth invention, preferably, the self-dependent allowable landing range which is used to determine a desired landing position and desired landing orientation for the foot to be landed in an Nth landing action of the robot is set based on a map or formula which is determined in advance as defining a relative allowable landing range of the foot to be landed in the Nth landing action with respect to the foot to be landed in an (N−1)th landing action (thirty-first invention). With this arrangement, as with the sixth invention, calculating loads that are imposed when the self-dependent allowable landing range is determined can be reduced.

In the twenty-eighth through thirty-first inventions, the footstep determining apparatus preferably has desired landing position/orientation provisionally determining means for, when a desired landing position and desired landing orientation for the foot to be landed in an Nth landing action of the robot is to be determined, provisionally determining a desired landing position and desired landing orientation of the foot to be landed in several landing actions ahead including the Nth landing action, based on a desired landing position and desired landing orientation for the foot to be landed in an (N−1)th landing action and the desired footstep path, provisional desired gait determining means for determining a provisional desired gait of the robot which defines at least the Nth landing action using the provisionally determined desired landing position and desired landing orientation in the several landing actions ahead, and desired landing position/orientation correcting means for determining whether a desired ZMP corresponding to the determined provisional desired gait satisfies a predetermined limiting condition or not, and, if the desired ZMP does not satisfy the predetermined limiting condition, correcting at least either one of the desired landing position and desired landing orientation of the foot to be landed in the Nth landing action, thereby to determine the desired landing position and desired landing orientation of the foot to be landed in the Nth landing action (thirty-second invention).

According to the thirty-second invention, a desired landing position and desired landing orientation of the foot to be landed in several landing actions ahead including the Nth landing action is provisionally determined (only a desired landing position and desired landing orientation in the Nth landing action may be provisionally determined), and a provisional desired gait of the robot which defines at least the Nth landing action is determined using the provisionally determined desired landing position/orientation If the desired ZMP of the provisional desired gait does not satisfy the predetermined limiting condition (specifically, the condition in which the desired ZMP can exist), then at least either one of the provisionally determined desired landing position and desired landing orientation in the Nth landing action is corrected thereby to determine the desired landing position and desired landing orientation in the Nth landing action. Consequently, based on the same concept as with the seventh invention, it is possible to determine a sequence of desired landing positions/orientations (desired footsteps) which is capable of causing the footsteps of the robot to follow the desired footstep path while keeping the robot in dynamic stability.

In the twenty-eighth through thirty-second inventions, if the legged mobile robot comprises a biped mobile robot having two legs, the desired landing position for the foot preferably comprises a point having a predetermined positional relationship to each foot and a desired position for a representative point which is determined in advance with respect to each foot such that the representative point with respect to each foot becomes an identical point for both feet when the robot is upstanding in a predetermined reference symmetrical posture, and the desired footstep path preferably comprises a path to be approached by the representative point (thirty-third invention). In the thirty-third invention, the representative point preferably comprises a point set up near the heel or toe of each foot (thirty-fourth invention). The thirty-third invention and the thirty-fourth invention offer the same operation and advantages as the eighth invention and the ninth invention, respectively.

According to a thirty-fifth invention, there is provided a footstep determining apparatus for determining a desired landing position and desired landing orientation for the foot of a leg to be landed in each landing action of a legged mobile robot which is movable by repeating lifting and then landing actions of each of a plurality of legs, comprising allowable foot landing range setting means for setting an environment-dependent allowable landing range determined under environmental conditions in which the robot moves, which is an allowable range of combinations of landing positions and landing orientations of feet landed in each landing actions of the robot, wherein a combination of the desired landing position and desired landing orientation for the foot to be landed in each landing action of the robot is determined based on the desired landing position and desired landing orientation for the foot landed in at least the preceding landing action, and the environment-dependent allowable landing range.

According to the thirty-fifth invention, as with the first invention, attention is focused on a landing position and landing orientation of the foot of the robot, and the landing position/orientation of the foot is used as representing the position and moving orientation of the robot. According to the thirty-fifth invention, a combination of the desired landing position and desired landing orientation for the foot to be landed in each landing action of the robot is determined based on the desired landing position and desired landing orientation for the foot landed in at least the preceding landing action, and the environment-dependent allowable landing range. Therefore, before the robot starts moving, a sequence of desired landing positions/orientations for preventing the feet of the robot from stepping out of an allowable landing range such as the stepping stones or the like, i.e., desired footsteps, can properly be determined.

In the thirty-fifth invention, the desired landing orientation preferably comprises an orientation about a vertical axis (thirty-sixth invention).

In the thirty-fifth or thirty-sixth invention, when a desired landing position and desired landing orientation for the foot to be landed in each landing action of the robot is to be determined, a combination of a desired landing position and desired landing orientation for the foot in the landing action is preferably determined in a common region of a self-dependent allowable landing range determined under mechanism-dependent limiting conditions of the robot itself, which include an interference between the leg making the landing action and the other leg, and the environment-dependent allowable landing range corresponding to the landing action, based on the self-dependent allowable landing range and the environment-dependent allowable landing range (thirty-seventh invention).

With the above arrangement, since a combination of a desired landing position and desired landing orientation for the foot in each landing action is determined in a common region of the environment-dependent allowable landing range and the self-dependent allowable landing range, not only limiting conditions posed on landing positions/orientations due to the environment-dependent allowable landing range, but also the mechanism-dependent limiting conditions of the robot itself, which include an interference between the leg making the next time's landing action and the other leg, are taken into account. Consequently, a sequence of desired landing positions/orientations for preventing the feet of the robot from interfering with each other (desired footsteps) while satisfying the conditions on the landing positions/orientations due to the environment-dependent allowable landing range is determined.

In the thirty-seventh invention, the self-dependent allowable landing range which is used to determine a desired landing position and desired landing orientation for the foot to be landed in an Nth landing action of the robot is preferably set based on a map or formula which is determined in advance as defining a relative allowable landing range of the foot to be landed in the Nth landing action with respect to the foot to be landed in an (N−1)th landing action (thirty-eighth invention). With this arrangement, as with the sixth invention, calculating loads that are imposed when the self-dependent allowable landing range is determined can be reduced.

In the thirty-seventh or thirty-eighth invention, the footstep determining apparatus preferably has desired landing position/orientation provisionally determining means for, when a desired landing position and desired landing orientation for the foot to be landed in an Nth landing action of the robot is to be determined, provisionally determining a desired landing position and desired landing orientation of the foot to be landed in several landing actions ahead including the Nth landing action, based on a desired landing position and desired landing orientation for the foot to be landed in an (N−1)th landing action, the environment-dependent allowable landing range corresponding to each of the several landing actions ahead, and the self-dependent allowable landing range corresponding to each of the several landing actions ahead, provisional desired gait determining means for determining a provisional desired gait of the robot which defines at least the Nth landing action using the provisionally determined desired landing position and desired landing orientation in the several landing actions ahead, and desired landing position/orientation correcting means for determining whether a desired ZMP corresponding to the determined provisional desired gait satisfies a predetermined limiting condition or not, and, if the desired ZMP does not satisfy the predetermined limiting condition, correcting at least either one of the desired landing position and desired landing orientation of the foot to be landed in the Nth landing action, thereby to determine a combination of the desired landing position and desired landing orientation of the foot to be landed in the Nth landing action (thirty-ninth invention).

According to the thirty-ninth invention, a desired landing position and desired landing orientation of the foot to be landed in several landing actions ahead including the Nth landing action is provisionally determined (only a desired landing position and desired landing orientation in the Nth landing action may be provisionally determined), and a provisional desired gait which defines at least the Nth landing action is determined using the provisionally determined desired landing position/orientation. If the desired ZMP of the provisional desired gait does not satisfy the predetermined limiting condition (specifically, the condition in which the desired ZMP can exist), then at least either one of the provisionally determined desired landing position and desired landing orientation in the Nth landing action is corrected thereby to determine the desired landing position/orientation in the Nth landing action. Consequently, based on the same concept as with the seventh invention, it is possible to determine a sequence of desired landing positions/orientations (desired footsteps) which is capable of satisfying the limiting condition of the environment-dependent allowable landing range and the self-dependent allowable landing range, while keeping the robot in dynamic stability.

In the thirty-fifth through thirty-ninth inventions, if the legged mobile robot comprises a biped mobile robot having two legs, the desired landing position for the foot preferably comprises a point having a predetermined positional relationship to each foot and a desired position for a representative point which is determined in advance with respect to each foot such that the representative point with respect to each foot becomes an identical point for both feet when the robot is upstanding in a predetermined reference symmetrical posture (fortieth invention). With this arrangement, since the environment-dependent allowable landing range and the self-dependent allowable landing range are each set up as an allowable range of the position of the representative point and the desired landing orientation of the foot, they can easily be set up.

In the fortieth invention, the representative point preferably comprises a point set up near the heel or toe of each foot (forty-first invention). This arrangement offers the same operation and advantages as the ninth invention.

BRIEF DESCRIPTION OF THE DRAWINGS

FIG. 12 is a diagram illustrative of a normal turning gait that is determined by the processing sequence of the flowchart shown in FIG. 9;

FIG. 13 is a flowchart of a trajectory guidance process in the flowchart shown in FIG. 9;

FIG. 21 is a flowchart of a trajectory guidance process according to a second embodiment;

FIG. 24 is a flowchart of a trajectory guidance correcting process according to the second embodiment;

FIG. 25 is a flowchart of a trajectory guidance process according to a third embodiment;

FIG. 28 is a flowchart of a trajectory guidance process according to a fourth embodiment;

BEST MODE FOR CARRYING OUT THE INVENTION

A control apparatus for a legged mobile robot according to embodiments of the present invention will be described below with reference to the accompanying drawings. A biped mobile robot will be described by way of example as the legged mobile robot.

Figure 1:
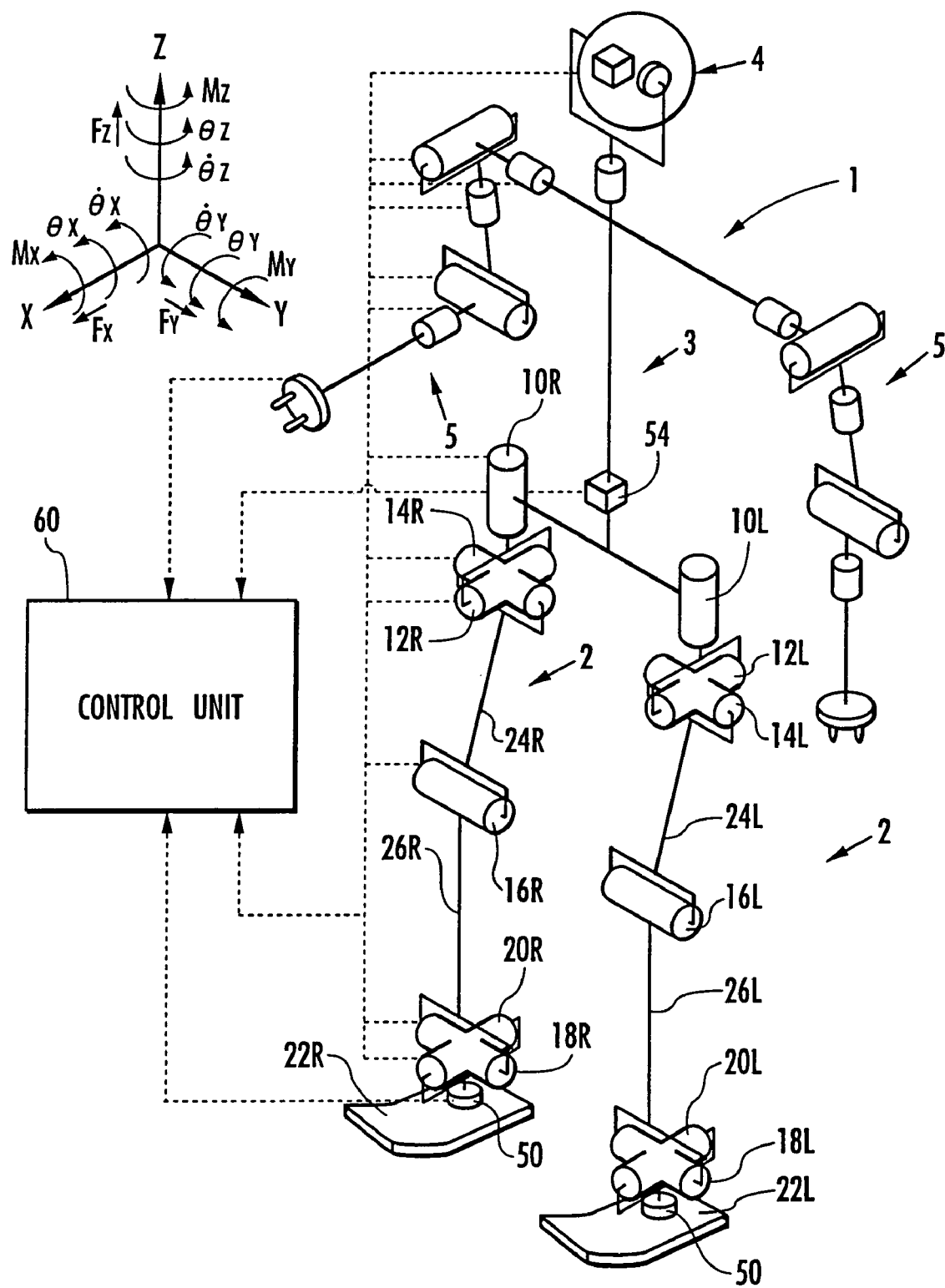
FIG. 1 is a schematic view showing a general overall arrangement of a biped mobile robot as a legged mobile robot according to an embodiment of the present invention.

FIG. 1 is a schematic view showing a biped mobile robot in its entirety as a legged mobile robot according to an embodiment of the present invention.

As shown in FIG. 1, a biped mobile robot (hereinafter referred to as robot) 1 has a pair of left and right legs (leg links) 2, 2 extending downwardly from a body (base body of the robot 1) thereof. The legs 2, 2 are identical in structure to each other, and each have six joints. The six joints include, successively from the body 3, joints 10R, 10L (the reference characters R, L mean that these joints correspond respectively to right and left legs, and are also applicable below) for turning (rotating) a hip (waist) (for rotating in yaw direction with respect to the body 3), joints 12R, 12L for rotating the hip (waist) in a rolling direction (about an X-axis), joints 14R, 14L for rotating the hip (waist) in a pitching direction (about a Y-axis), joints 16R, 16L for rotating knees in the pitching direction, joints 18R, 18L for rotating ankles in the pitching direction, and joints 20R, 20L for rotating the ankles in the rolling direction.

Feet (foot portions) 22R(L) at the distal ends of the respective legs 2 are mounted on lower portions of the two joints 18R(L), 20R(L) of the ankles of the legs 2. The body 3 is mounted on the uppermost portions of the legs 2, 2 by the three joints 10R(L), 12R(L), 14R(L) of the hip of the legs 2. A control unit 60 to be described in detail below is housed in the body 3. In FIG. 1, the control unit 60 is shown as being outside of the body 3 for illustrative purposes.

In the legs 2 of the above construction, hip joints (or waist joints) are made up of the joints 10R(L), 12R(L), 14R(L), knee joints of the joints 16R(L), and ankle joints of the joints 18R(L), 20R(L). The hip joints and the knee joints are connected to each other by thigh links 24R(L), and the knee joints and the ankle joints are connected to each other by crus links 26R(L).

A pair of left and right arms 5, 5 is mounted on opposite sides of an upper portion of the body 3, and a head 5 is mounted on an upper end of the body 3. The arms 5, 5 and the head 4 will not be described in detail below as they have no direct bearing on the gist of the invention.

With the above arrangement, the feet 22R(L) of the legs 2 have six degrees of freedom with respect to the body 3. While the robot 1 is moving, e.g., walking, a total of 6*2=12 (in the present specification, * represents a multiplication as a calculation with respect to scalar quantities and an outer product as a calculation with respect to vectors) joints of both the legs 2, 2 are actuated through suitable angles to cause the feet 22R, 22L to make a desired motion. The robot 1 can thus move optionally in a three-dimensional space.

As shown in FIG. 1, known six-axis force sensors 50 are interposed between the ankle joints 18R(L), 20R(L) of the legs 2 and the feet 22R(L) below the ankle joints 18R(L), 20R(L). The six-axis force sensors 50 serve to detect whether the feet 22R(L) of the legs 2 have landed on the floor or not and also to detect floor reaction forces (landing loads) acting on the legs 2. The six-axis force sensors 50 output a detected signal of three direction components Fx, Fy, Fz of a translational force of the floor reaction force and three direction components Mx, My, Mz of a moment, to the control unit 60. The body 3 has an inclination sensor 54 for detecting an inclination (posture angle) of the body 3 with respect to a Z-axis (vertical direction (gravitational direction)), an angular velocity of the inclination, etc. A detected signal of the inclination sensor 54 is output from the inclination sensor 54 to the control unit 60. The inclination sensor 54 has three-axial-direction acceleration sensors and three-axial-direction gyro sensors, not shown. Detected signals from these sensors are used to detect an inclination of the body 3 and its angular velocity, and are also used to estimate a self position/posture of the robot. Though not shown in structural detail, each of the joints of the robot 1 has an electric motor 64 (see FIG. 5) for actuating the joint and an encoder (rotary encoder) 65 (see FIG. 5) for detecting an angular displacement (rotational angle of the joint) of the motor 64. A detected signal of the encoder 65 is output from the encoder 65 to the control unit 60.

Though not shown in FIG. 1, a joystick (manipulator) 73 (see FIG. 5) is mounted in an appropriate position on the robot 1. When the joystick 73 is operated, a request with respect to gaits of the robot 1 such as for turning the robot 1 which is moving straight can be input as required to the control unit 60.

Figure 2:
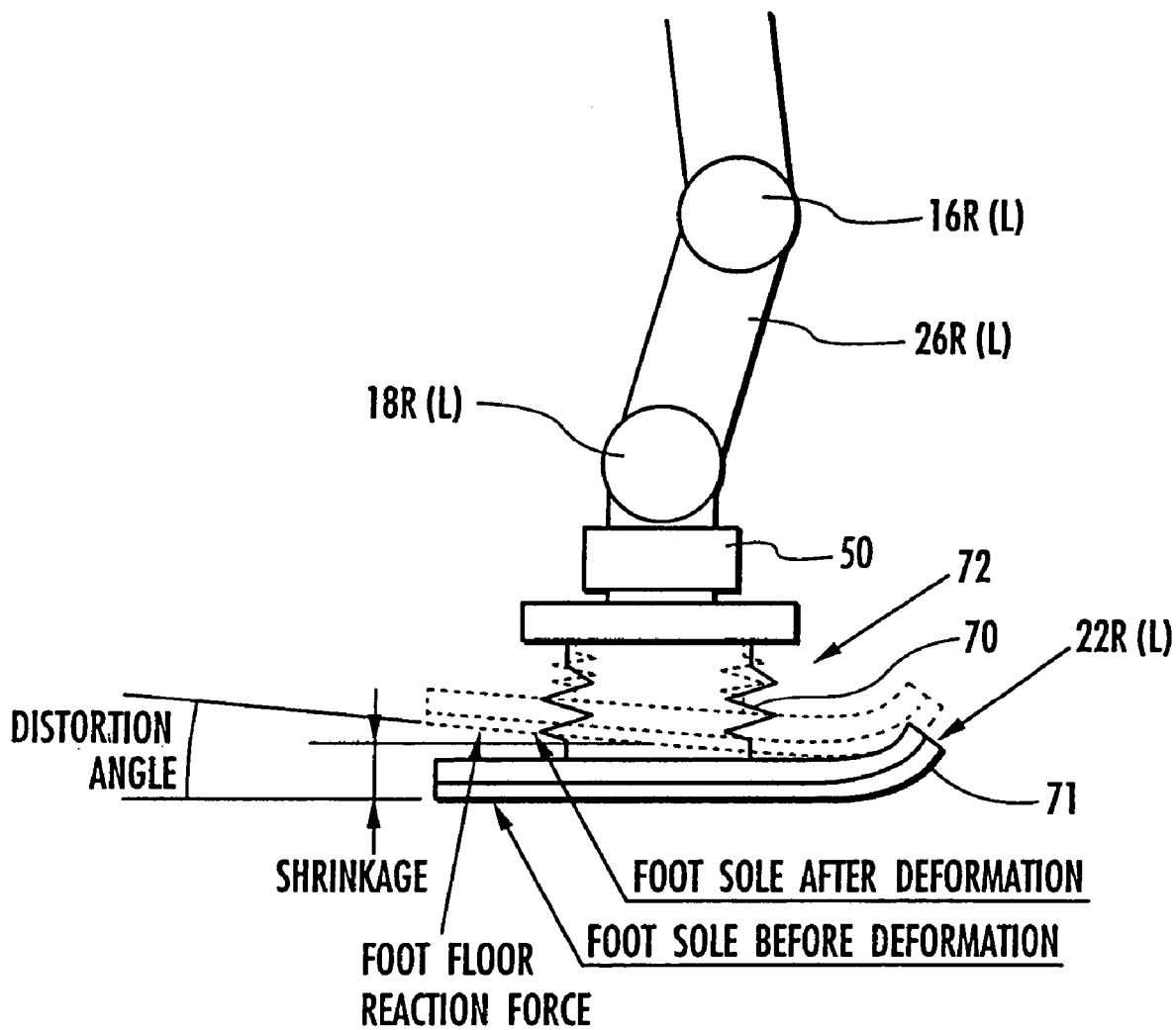
FIG. 2 is a schematic view showing a general arrangement of a foot of each leg shown in FIG. 1.

FIG. 2 is a view schematically showing a basic arrangement of the distal end portion (including each foot 22R(L)) of each leg 2 in the present embodiment. As shown in FIG. 2, a spring mechanism 70 is disposed between the foot 22R(L) and the six-axis force sensor 50 above the foot 22R(L), and a foot sole elastic member 71 made of rubber or the like is applied to the foot sole (the sole of each of the feet 22R, L). The spring mechanism 70 and the foot sole elastic member 71 jointly make up a compliance mechanism 72. The spring mechanism 70, whose details will be described later, comprises a square-shaped guide member (not shown in FIG. 2) mounted on an upper surface of the foot 22R(L) and a piston-like member (not shown in FIG. 2) mounted on the side of the ankle joint 18R(L) (the ankle joint 20R(L) is omitted from illustration in FIG. 2) and the six-axis force sensor 50, the piston-like member being slidably movably accommodated in the guide member with an elastic member (rubber or spring) interposed therebetween.

The foot 22R(L) as indicated by the solid lines in FIG. 2 represent a state in which no floor reaction force is applied thereto. When each leg 2 undergoes a floor reaction force, the spring mechanism 70 and the foot sole elastic member 71 of the compliance mechanism 72 flex, allowing the foot 22R(L) to change to a position/posture indicated by the dotted lines in FIG. 2, for example. As described in detail in Japanese laid-open patent publication No. Hei 5-305584 which the present applicant has proposed earlier, the structure of the compliance mechanism 72 is important not only for reducing landing shocks, but also for increasing controllability.

Figure 3:
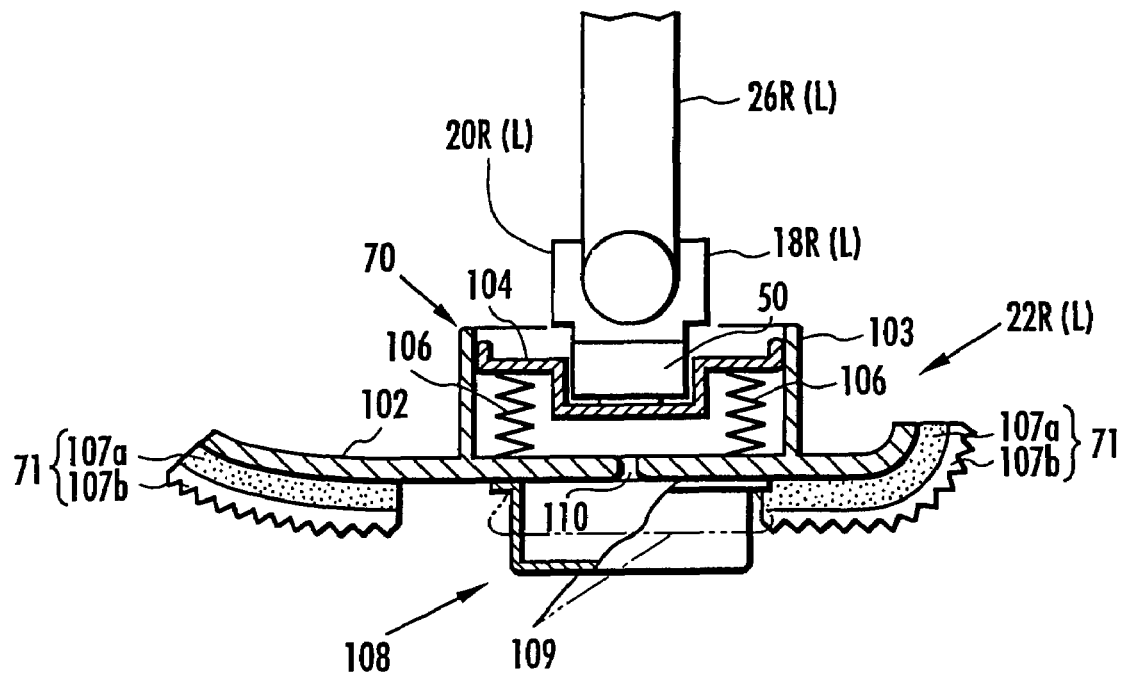
FIGS. 3 and 4 are a sectional side elevational view and a bottom view, respectively, showing a detailed arrangement of the foot of each leg.
Figure 4:
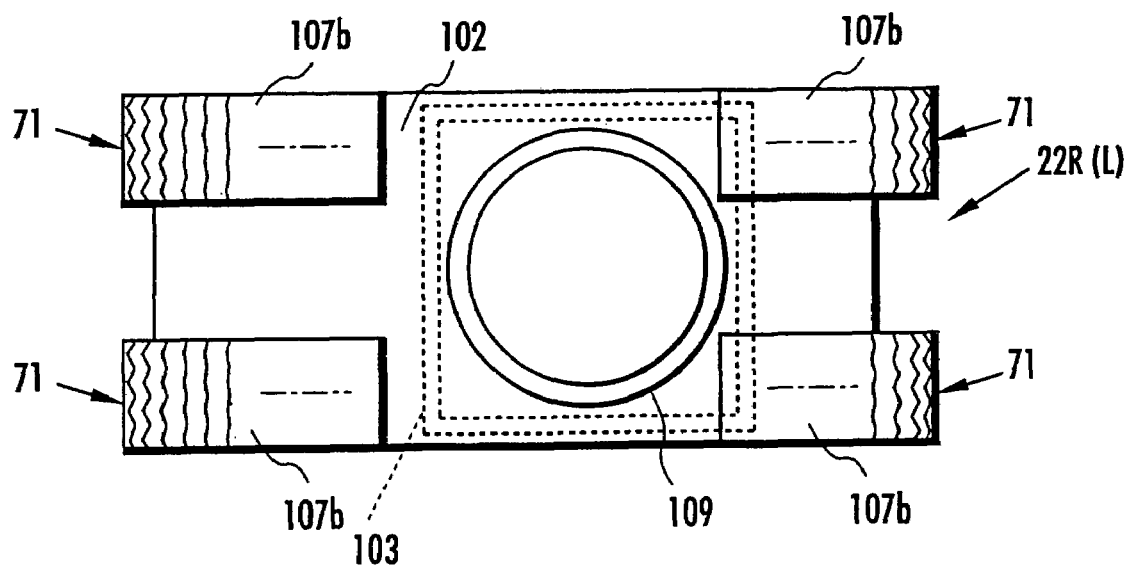

Structural details of the foot 22R(L) including the compliance mechanism 72 (which will also be referred to as a foot mechanism 22R(L)) will be described below with reference to FIGS. 3 and 4. FIG. 3 is a sectional side elevational view of the foot mechanism 22R(L), and FIG. 4 is a plan view of the foot mechanism 22R(L) as viewed from its bottom.

The foot mechanism 22R(L) has a foot plate member 102 substantially in the form of a flat plate as a skeleton member. The foot plate member 102 has a front end portion (toe) and a rear end portion (heel) which are curved slightly upwardly, and a remaining portion in the form of a flat plate. A guide member 103 having a rectangular transverse cross-sectional shape is fixedly mounted on an upper surface of the foot plate member 102, with its axis oriented vertically. The guide member 103 houses therein a movable plate (piston-like member) 104 that is movable substantially vertically along an inner peripheral surface of the guide member 103. The movable plate 104 is coupled to each of the ankle joints 18R(L), 20R(L) by the six-axis force sensor 50.

The movable plate 104 has a lower surface whose peripheral edge is coupled to the upper surface of the foot plate member 102 by a plurality of resilient members 106 (illustrated as springs) made of a resilient material such as springs, rubber, or the like. Therefore, the foot plate member 102 is coupled to the ankle joints 18R(L) by the resilient members 106, the movable plate 104, and the six-axis force sensor 50. The guide member 103 has an interior (a space below the movable plate 104) vented to the atmosphere through a hole or a gap (not shown), allowing atmospheric air to flow into and out of the guide member 103. The guide member 103, the movable plate 104, and the resilient members 106 jointly make up the spring mechanism 70 shown in FIG. 2.

The foot plate member 102 has a bottom surface (a lower surface) to which landing members 71 as the foot sole elastic member 71 are attached. The landing members 71 serves as elastic members (elastic members which directly contact the floor) that are interposed between foot plate member 102 and the floor when the foot mechanism 22R(L) is landed on the floor. In the present embodiment, the landing members 71 are fixed to respective four corners of the landing surface of the foot plate member 102 (both sides of the toe and both sides of the heel of the foot plate member 102).

In the present embodiment, the landing member 71 is of a two-layer structure comprising a soft layer 107a made of a relatively soft rubber material and a hard layer 107b made of a relatively hard rubber material, the soft layer 107a and the hard layer 107b being superimposed vertically. The hard layer 107b is disposed on the lowermost surface as a landing surface member for directly contacting the floor when the leg 2 is landed on the floor.

The foot mechanism 22R(L) also has a landing shock damping device 108 other than the above structural components. The landing shock damping device 108 comprises a pouch-like member 109 mounted on the bottom surface of the foot plate member 102 and a flow passage 110 for allowing air (atmospheric air) as a compressible fluid to flow into and out of the pouch-like member 109.

The pouch-like member 109 is disposed substantially centrally on the bottom surface of the foot plate member 102 with the landing members 71 being present around the pouch-like member 109. The pouch-like member 109 is made of an elastic material such as rubber or the like so that the pouch-like member 109 is freely deformable. When the pouch-like member 109 is in a natural state free of elastic deformation under external forces, the pouch-like member 109 is in the shape of a cylindrical casing that is open upwardly, as indicated by the solid lines in FIG. 3. The pouch-like member 109 has an open end fixed along its full circumference to the bottom surface of the foot plate member 102, and is closed by the foot plate member 102. When the pouch-like member 109 is in the natural state in which it is in the shape of a cylindrical casing, the bottom of the pouch-like member 109 projects downwardly beyond the landing members 71. That is, the height of the pouch-like member 109 (the distance from the lower surface of the foot plate member 102 to the bottom of the pouch-like member 109) is greater than the thickness of the landing members 71. Therefore, in a state in which the foot plate member 102 is landed on the floor through the landing members 71 (a landed state of the leg 2), the pouch-like member 109 is compressed in the direction of the height thereof under floor reaction forces as indicated by the imaginary line in FIG. 3.

In the present embodiment, the natural state in which the pouch-like member 109 is in the shape of a cylindrical casing is an expanded state of the pouch-like member 109. Since the pouch-like member 109 is made of an elastic material, it exerts a restoring force for restoring the shape in the natural state (the shape of a cylindrical casing) when the pouch-like member 109 is compressed.

The flow passage 110 serves as an inlet/outlet means for allowing air to flow into and out of the pouch-like member 109. In the present embodiment, the flow passage 110 comprises a flow hole defined in the foot plate member 102 to provide communication between the interior of the pouch-like member 109 and the interior of the guide member 103. Since the interior of the guide member 103 is vented to the atmosphere as described above, the flow passage 110 provides communication between the interior of the pouch-like member 109 and the atmosphere. Consequently, atmospheric air can freely flow into and out of the pouch-like member 109 through the flow passage 110. When the pouch-like member 109 is in the expanded state (natural state), the pouch-like member 109 is filled with air and has an internal pressure equal to the atmospheric pressure. The flow passage 110 also serves as a restriction passage for producing a fluid resistance to air as it flows into and out of the pouch-like member 109.

Figure 5:
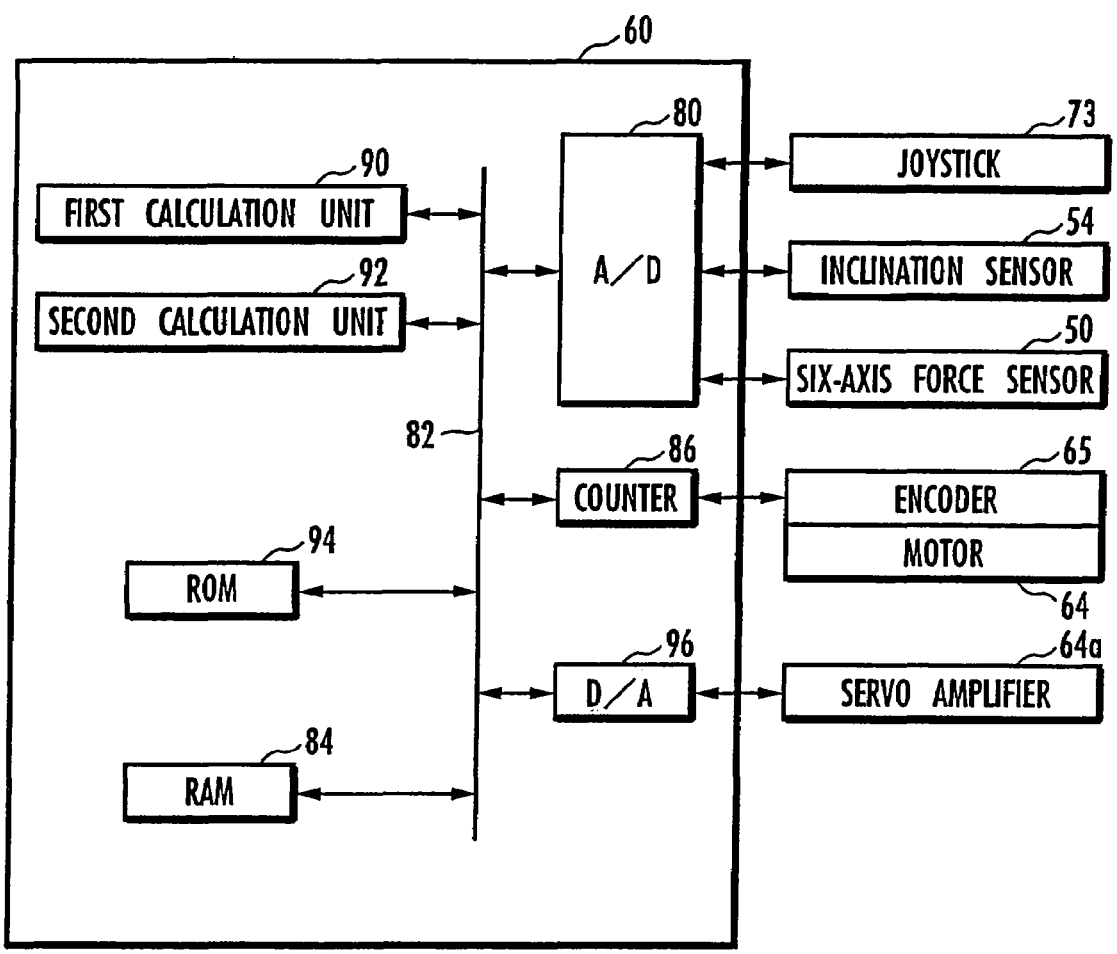
FIG. 5 is a block diagram showing an arrangement of a control unit of the robot shown in FIG. 1.

FIG. 5 is a block diagram showing an arrangement of the control unit 60. The control unit 60 comprises a microcomputer having a first arithmetic unit 90 and a second arithmetic unit 92 which comprise a CPU, an A/D converter 80, a counter 86, a D/A converter 96, a RAM 84, a ROM 94, and a bus line 82 for transmitting data between these components. In the control unit 60, output signals from the six-axis force sensors 50 of the legs 2, the inclination sensor 54 (acceleration sensors and gyro sensors), and the joystick 73 are converted by the A/D converter 80 into digital values, which are then sent via the bus line 82 to the RAM 84. Output signals from the encoders 65 (rotary encoders) of the joints of the robot 1 are input via the counter 86 to the RAM 84.

The first arithmetic unit 90 generates a desired gait as described later, and calculates joint angle displacement commands (command values for displacement angles of the joints or rotational angles of the electric motors 64) and sends the calculated joint angle displacement commands to the RAM 84. The second arithmetic unit 92 reads joint angle displacement commands from the RAM 84 and measured values of joint angles which are detected based on the output signals from the encoders 65, calculates manipulation quantities required to actuate the joints, and outputs the calculated manipulation quantities via the D/A converter 96 and a servoamplifier 64a to the electric motors 64 which actuate the joints.

Figure 6:
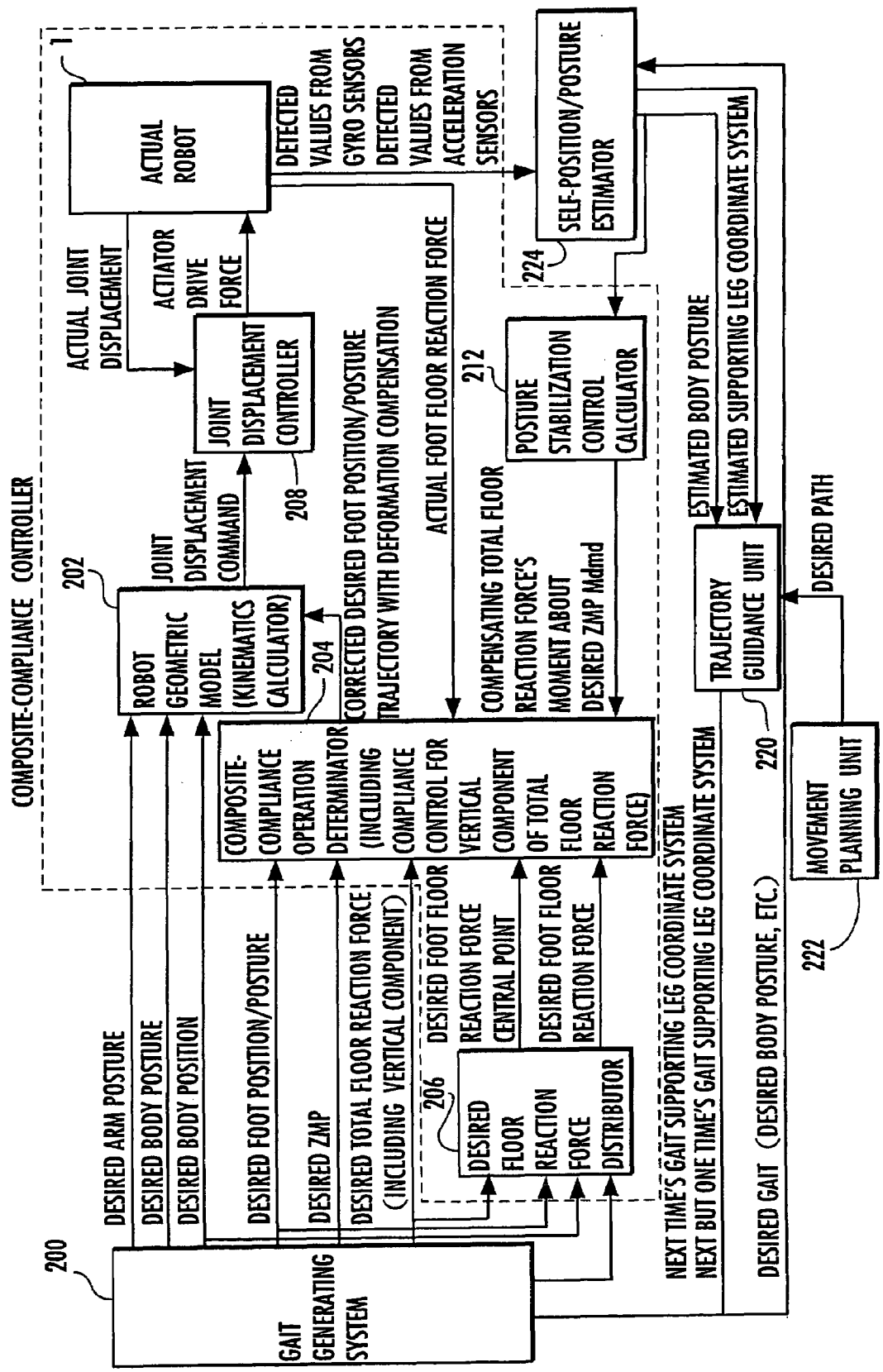
FIG. 6 is a block diagram showing a functional arrangement of the control unit shown in FIG. 5.

FIG. 6 is a block diagram showing a functional arrangement of the control unit of the legged mobile robot according to the present embodiment. In FIG. 6, a portion other than an "actual robot" is provided by a processing function performed by the control unit 60 (mainly a function of the first arithmetic unit 90 and the second arithmetic unit 92). In the description which follows, the reference characters R, L are omitted unless the left and right legs 2 need to be distinguished from each other.

The control unit 60 has a gait generation system 200 for generating and outputting a desired gait for the robot 1 freely in real-time. A desired gait output by the gait generation system 200 comprises a desired body position/posture trajectory (a trajectory of a desired position and a desired posture for the body 3), a desired foot position/posture trajectory (a trajectory of a desired position and a desired posture for each foot 22), a desired arm posture trajectory (a trajectory of a desired posture for each arm 5), a desired total floor reaction force central point (a desired ZMP), and a desired total floor reaction force trajectory. If the robot 1 has a member movable with respect to the body 3, other than the legs 2 and the arms 5, then a desired position/posture trajectory for that member is also added to the desired gait.

The meanings or definitions of terms used in the present embodiment will be supplemented. "Trajectory" in the gait means a pattern of chronological changes (time-series pattern), and may be referred to as "pattern". "Posture" of each component collectively refers to the inclination and orientation of the component. "Inclination" represents an angle of the component with respect to the vertical direction, and "orientation" represents the orientation of a vector, as projected onto a horizontal plane, that indicates the forward direction of the component. For example, an inclination of the body posture comprises an inclination angle (posture angle) of the body 3 in the rolling direction (about the X-axis) with respect to the Z-axis (vertical axis), and an inclination angle (posture angle) of the body 3 in the pitching direction (about the Y-axis) with respect to the Z-axis. An orientation of the body 3 is represented by the rotational angle in the yawing direction (about the Z-axis) of a vector, as projected onto a horizontal plane, that indicates the forward direction of the body 3. A foot posture is represented by the spatial azimuthal angles of two axes fixedly set up on each foot 22. A landed posture of the foot 22 basically represents the orientation of the foot 22 that is landed on the floor, and specifically represents the orientation of a vector, as projected onto a horizontal plane, directed from the heel to the toe of the foot 22 that is landed on the floor. A desired arm posture is represented by relative postures of all components of the arms 5, 5 with respect to the body 3.

A body position means a prescribed position of the body, or specifically, the position of a predetermined representative point of the body 3. Similarly, a foot position means the position of a predetermined representative point of each of the feet 22R, 22L. A body speed means the speed of motion of the above representative point of the body 3, and a foot speed means the speed of motion of the above representative point of each of the feet 22R, 22L.

With respect to a desired gait such as a desired body position/posture, etc., "desired" will often be omitted in the description which follows unless misunderstandings occur. Of gaits, gaits relative to components other than components concerned with the floor reaction force, i.e., motion of the robot 1, such as a foot position/posture, a body position/posture, etc., is collectively referred to as "motion".

A floor reaction force of each of the feet 22R, L (a floor reaction force comprising a translational force and a moment) is referred to as "each foot floor reaction force", and the sum of floor reaction forces of all (two) feet 22R, 22L of the robot 1 is referred to as "total floor reaction force". However, since almost no mention of each foot floor reaction force will be made in the description which follows, "floor reaction force" will be handled as being equivalent in meaning to "total floor reaction force" unless otherwise indicated.

A desired floor reaction force is generally represented by a point of action, a force (translational force) acting on that point, and a moment of the force. Inasmuch as a point of action may be set up anywhere, countless expressions may be considered for one desired floor reaction force. If a desired floor reaction force is expressed using the desired total floor reaction force central point described above as a point of action, then the moment of the force is 0 except for a vertical axis component.

With a gait which satisfies dynamic equilibrium conditions, since a ZMP calculated from a desired motion trajectory (a point where a moment produced when the sum of the inertial force of the robot 1 which is calculated from the desired motion trajectory and the gravitational force acts about the point is 0 except for a vertical axis component) and a desired total floor reaction force central point coincide with each other, it is equally applicable to say that a desired ZMP trajectory may be given instead of a desired total floor reaction force central point (for details, reference should be made to PCT laid-open publication WO/02/40224 filed by the present applicant).

In view of the above background, the specification of PCT laid-open publication WO/02/40224 defines a desired gait as follows:

a) A desired gait in a broad sense is a set of a desired motion trajectory in the period of one step or a plurality of steps and its desired floor reaction force trajectory.

b) A desired gait in a narrow sense is a set of a desired motion trajectory in the period of one step and its ZMP trajectory.

c) A series of gaits is a train of several gaits.

For the robot 1 to walk, when a body vertical position (the height of the body) is determined by the body height determining process previously proposed in Japanese laid-open patent publication No. 10-86080 by the present applicant, since a translational force component of the floor reaction force is dependently determined, only ZMP is sufficient as a physical quantity to be expressly set up with respect to the floor reaction force of a desired gait. Therefore, the above definition b) of a desired gait in a narrow sense is sufficient in the specification of PCT laid-open publication WO/02/40224. For the robot 1 to run, on the other hand, it is preferable to expressly set up a floor reaction force vertical component as the floor reaction force vertical component is important for controlling purposes. In an PCT application (PCT/JP02/13596) previously proposed by the present applicant, therefore, the following definition b') of a desired gait in a narrow sense has been adopted:

b') A desired gait in a narrow sense is a set of a desired motion trajectory in the period of one step, its ZMP trajectory, and a floor reaction force vertical component trajectory.

In the present specification, a desired gait will hereafter be used to mean a desired gait in a narrow sense unless otherwise indicated. Furthermore, "one step" of a desired gait is used to mean an interval from the time when one leg 2 of the robot 1 is landed on the floor until the time when the other leg 2 is landed on the floor.

In a gait, a two-leg supporting period refers to a period in which the weight of the robot 1 is supported by both the legs 2, 2, a one-leg supporting period refers to a period in which the weight of the robot 1 is supported by either one of the legs 2, and an floating period refers to a period in which both the legs 2, 2 are lifted from the floor (aloft).

In the one-leg supporting period, the leg 2 which does not support the weight of the robot 1 is referred to as "free leg", and the leg 2 which supports the weight of the robot 1 as "supporting leg". When the robot 1 walks, the two-leg supporting period and the one-leg supporting period are alternately repeated. When the robot 1 runs, the one-leg supporting period and the floating period are alternately repeated. In the floating period when the robot 1 runs, both the legs 2, 2 do not support the weight of the robot 1. Nevertheless, the leg 2 which was the free leg in the one-leg supporting period immediately prior to floating period is also referred to as the free leg in the floating period, and the leg 2 which was the supporting leg in the one-leg supporting period immediately prior to floating period is also referred to as the supporting leg in the floating period.

Positions/postures of various parts of the robot 1 in a desired gait, such as a desired body posture, a desired body position, a desired foot position/posture, a target arm posture, etc., are described in a supporting leg coordinate system. More specifically, as described in Japanese patent No. 3273443 owned by the present applicant, the supporting leg coordinate system is a coordinate system, created when the foot 22 of a supporting leg is turned to a horizontal posture without slippage on a landed surface, where the center of the ankle joint of the supporting leg as vertically projected onto the landed surface serves as the origin, a horizontal axis extending toward the toe of the foot 22 (a longitudinal axis of the foot 22) as the X-axis, a vertical axis of the foot 22 as the Z-axis, and a coordinate axis which is perpendicular to these X- and Z-axes (a transverse axis of the foot 22) as the Y-axis.

The gait generation system 200 according to the present embodiment is supplied with requested values (desired values) for landed positions/postures and landing times of the foot 22 of the free leg until two steps ahead, and generates a desired gait comprising a desired body position/posture trajectory, a desired foot position/posture trajectory, a desired ZMP trajectory, a desired floor reaction force vertical component trajectory, and a desired arm posture trajectory. Some of the parameters (referred to as gait parameters) which define these trajectories are corrected to satisfy the continuity of the gait.

The requested values for landed positions/postures of the foot 22 of the free leg until two steps ahead are determined by a trajectory guidance unit 220 shown in FIG. 6, and input to the gait generation system 200. To the trajectory guidance unit 220, there are given a desired path for the robot 1 (a desired footstep path to be described later) and an allowable landing range such as stepping stones and a staircase (an allowable range of environment-dependent landing positions/orientations) from a movement planning unit 222, and also given an estimated body posture representing an estimated value for an actual body posture and estimated values of an actual landing position/orientation (more specifically, a position/orientation of an estimated supporting leg coordinate system to be described later) of a landed free leg (a free leg which has become a supporting leg after it is landed on the floor) from a self-position/posture estimator 224. The allowable range of environment-dependent landing positions/postures is concerned with a fifth embodiment to be described later. In first through fourth embodiments and a sixth embodiment, a desired path is given from the movement planning unit 222 to the trajectory guidance unit 220.

The gait generation system 200 regards a desired gait (a desired gait in a narrow sense) for one step from the time when one leg 2 of the robot 1 is landed on the floor until the time when the other leg 2 is landed on the floor, as a unit, and sequentially generates such gaits each for one step. A gait that is generated at present or is about to be generated is referred to as "current time's gait", a next gait as "next time's gait", and a gait that is next to the next gait as "next but one time's gait". A desired gait that is generated so as to precede the "current time's gait" is referred to as "last time's gait".

A desired gait generated by the gait generation system 200 will partly be described by way of example below. For example, a desired foot position/posture trajectory is generated using a finite time settling filter disclosed in Japanese patent No. 3233450 owned by the present applicant. In the process of generating a foot position/posture trajectory with the finite time settling filter, a foot position trajectory, for example, is generated in order to start moving the foot 22, while gradually accelerating the same, toward a desired landing position (a requested value for a landing position), gradually reduce the speed to 0 or nearly 0 until a desired landing time (a requested value for a landing time), and stop the foot 20 when it reaches the desired landing position at the desired landing time. A foot posture trajectory is also generated in the same manner. The desired foot position/posture trajectory thus generated has a floor speed which is 0 or nearly 0 at the instant the foot is landed, and hence can reduce landing shocks when the foot is landed from the floating period especially while the robot 1 is running.

Figure 7:
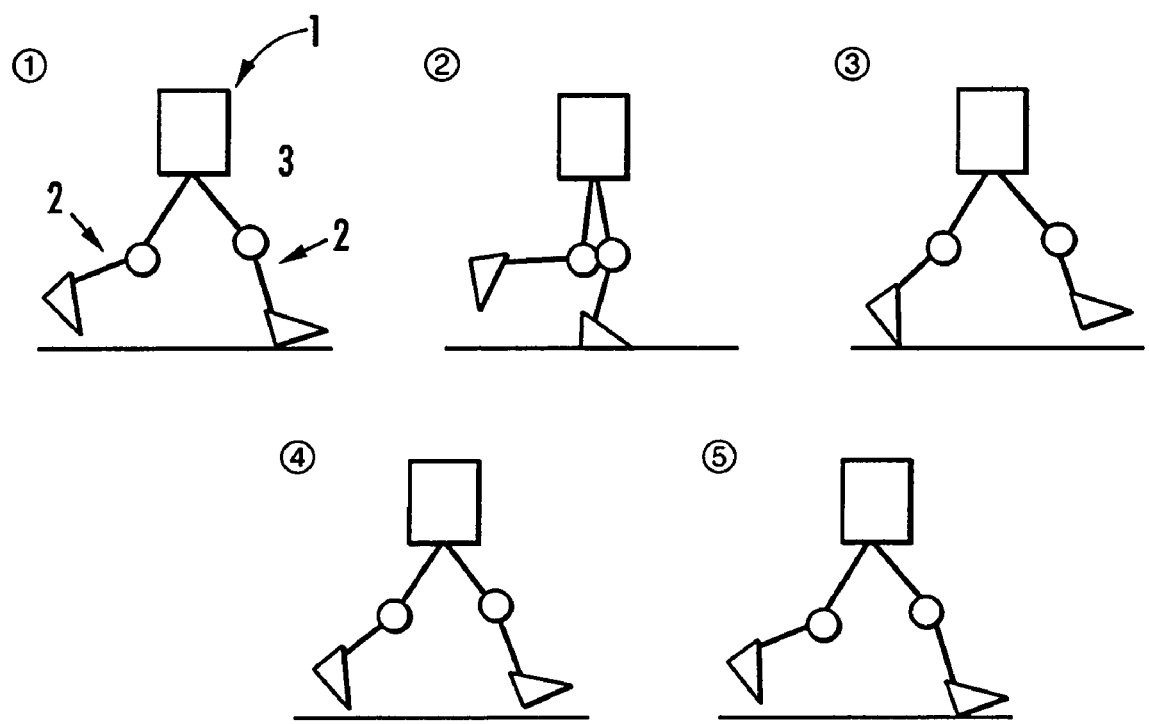
FIG. 7 is a diagram showing a running gait of the robot.
Figure 8:
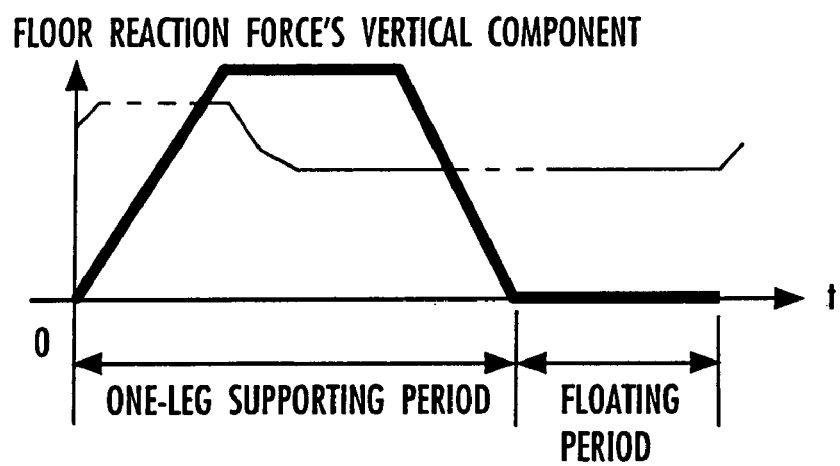
FIGS. 8(a) and 8(b) are graphs showing setting examples of floor reaction force vertical component and desired ZMP of a desired gait.
Figure 8:
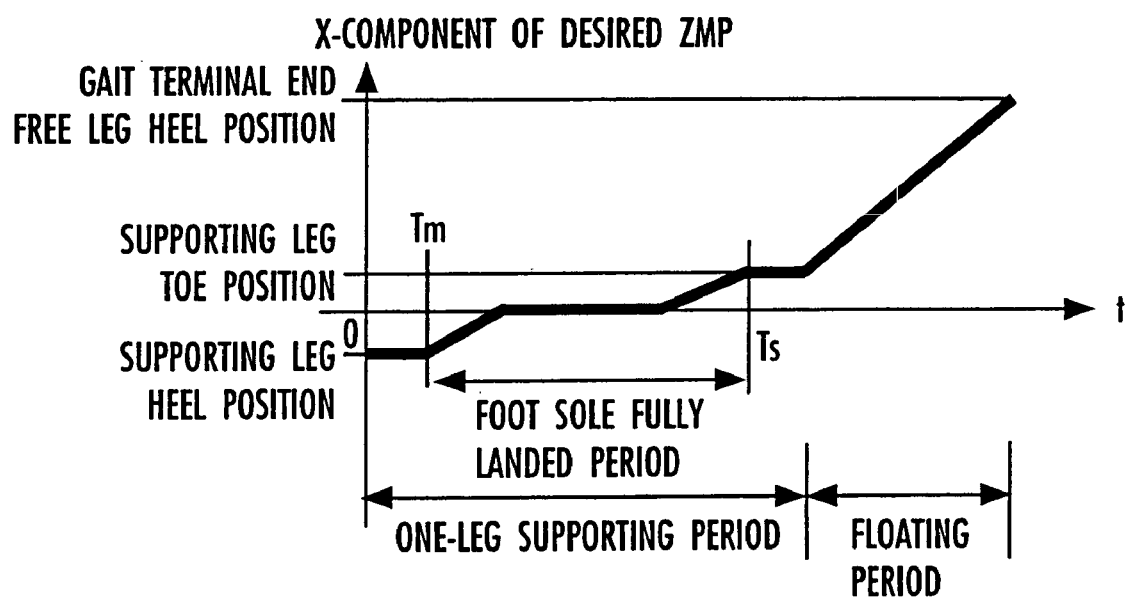

When the robot 1 runs in the same manner as a human being runs as shown in FIG. 7, a desired floor reaction force vertical component trajectory and a desired ZMP trajectory (specifically, a desired ZMP trajectory in the direction of the X-axis of the supporting leg coordinate system (the longitudinal direction of the supporting leg foot 22)) are set up in respective patterns indicated by the solid-line curves in FIGS. 8(a) and 8(b). The first through third figures of FIG. 7 schematically show motion states of both the legs 2, 2 of the robot 1 respectively at the starting time, the intermediate time, and the ending time of a one-leg supporting period, and the fourth and fifth figures of FIG. 7 schematically show motion states of both the legs 2, 2 of the robot 1 respectively at the intermediate time of an floating period and the ending time of the floating period (the starting time of a next one-leg supporting period).

For causing the robot 1 to run, the desired floor reaction force vertical component trajectory is basically of an upwardly convex pattern in the one-leg supporting period and kept 0 in the floating period. For causing the robot 1 to walk, the desired floor reaction force vertical component trajectory is set up as indicated by the two-dot-and-dash-line curve in FIG. 8(a). In this case, an upwardly convex portion of the two-dot-and-dash-line curve corresponds to the two-leg supporting period, and a downwardly convex portion of the two-dot-and-dash-line curve corresponds to the one-leg supporting period. Irrespective of whether the robot 1 is to run or walk, the desired ZMMP is basically set up in the vicinity of the center of the landing surface of the legs 2 of the robot 1 (more specifically, within a so-called supporting polygon).

Figure 9:
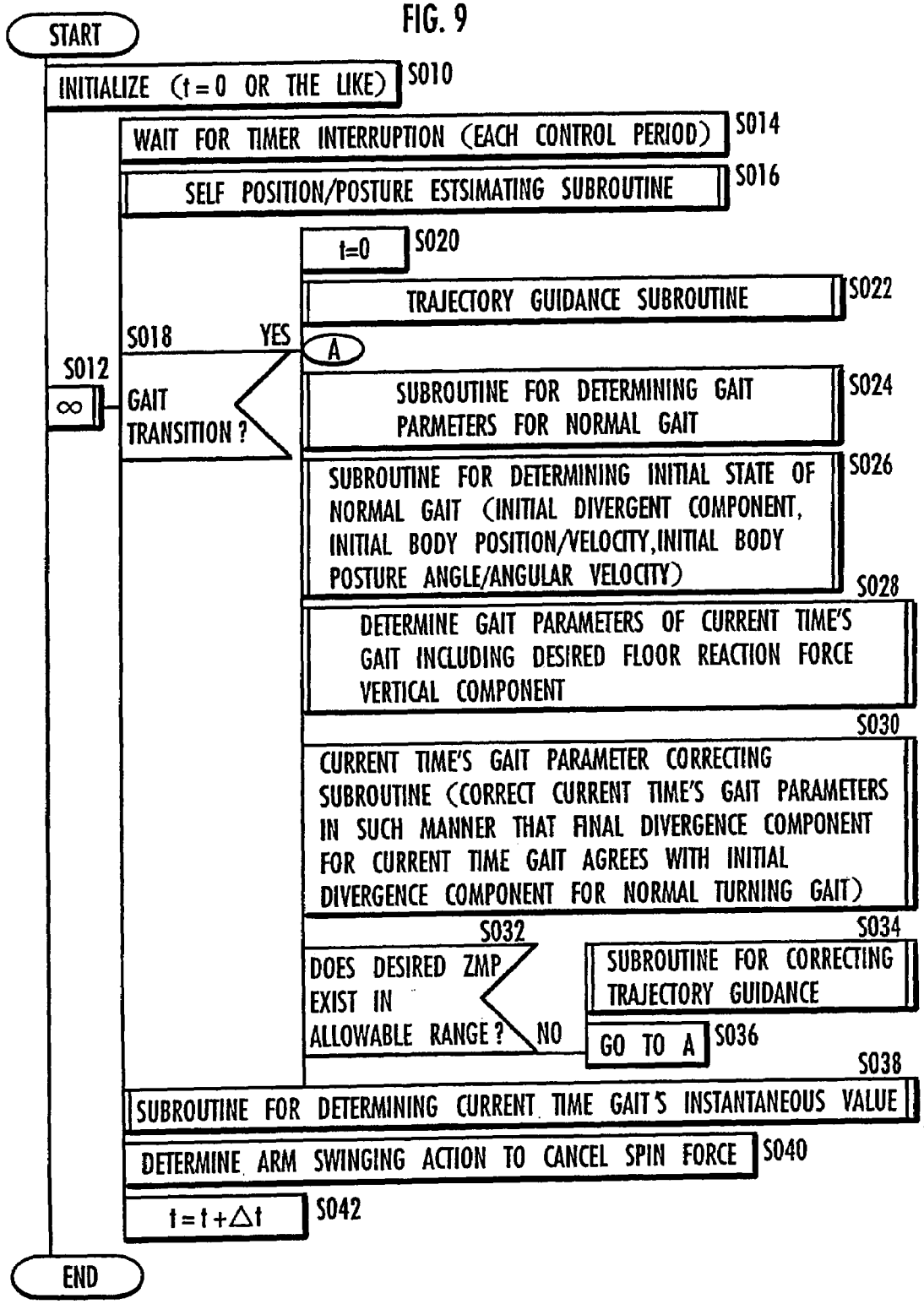
FIG. 9 is a flowchart of a processing sequence of the control unit according to a first embodiment.

FIG. 9 is a flowchart (structured flowchart) showing a gait generating process of the gait generation system 200, a self-position/posture estimating process of the self-position/posture estimator 224 shown in FIG. 6, and a trajectory guidance process of the trajectory guidance unit 220.

The flowchart will be described below.

In S010, various initializing operations such as to initialize a time t to 0 are performed.

Then, control goes through S012 to S014 in which it waits for a timer interrupt in each control period (processing period of the control unit 60). The control period is represented by $\Delta t$.

Then, control goes to S016 in which the self-position/posture estimator 224 performs a self-position/posture estimating process. The self-position/posture estimating process is a process of estimating an actual position and orientation of the robot 1 in a coordinate system (global coordinate system) fixed to the floor (ground) on which the robot 1 moves, and is carried out according to a flowchart shown in FIG. 10. The self-position/posture estimating process adopts a third embodiment of a process proposed in an application filed on the same date as the present application (a PCT application claiming priority based on Japanese patent application No. 2002-127066, entitled "Apparatus for estimating self-position of legged mobile robot"), and is described in detail in the PCT application. Therefore, the self-position/posture estimating process will be described only briefly.

The self-position/posture estimating process is a process of estimating a position/posture of the supporting leg coordinate system (more accurately, a position and an orientation about the vertical axis of the supporting leg coordinate system in the global coordinate system) which corresponds to the position/posture of the supporting leg foot 22 of the robot 1, as representing an actual position and orientation (about the vertical axis) of the supporting leg foot 22. More specifically, the self-position/posture estimating process is a process of estimating an actual position and orientation (about the vertical axis) of the supporting leg coordinate system which represents a landed position/posture of the free leg foot 22 which becomes a new supporting leg foot that is landed in a landing action per step of the robot 1, or stated otherwise, a process of estimating a position and orientation of the footstep of the robot 1 in the global coordinate system. More specifically, the orientation of the supporting leg coordinate system is expressed as the orientation about the vertical axis of the X-axis (the longitudinal horizontal axis of the supporting leg foot 22) of the supporting leg coordinate system.

Figure 10:
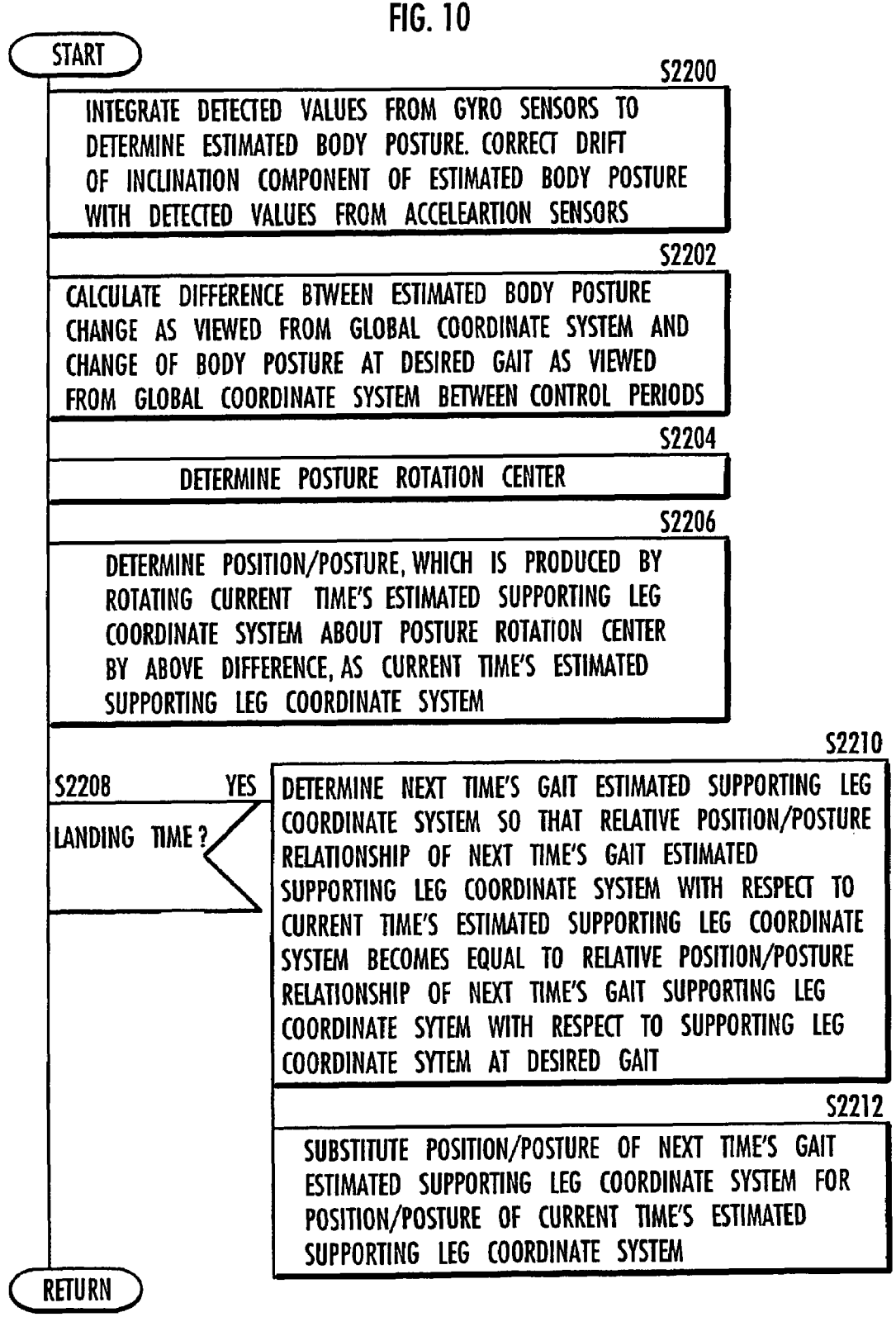
FIG. 10 is a flow-chart of a self position/posture estimating process in the flowchart shown in FIG. 9.

The self-position/posture estimating process will be described below with reference to FIG. 10. In S2200, detected values of the gyro sensors of the inclination sensor 54 on the body 3, i.e., detected values of angular velocities (angular velocities in three-axial-directions) of the body 3, are integrated (accumulatively added) thereby to determine an estimated body posture which represents an estimated value of the actual body posture. The estimated body posture is described in the global coordinate system. Inclination components of the estimated body posture, i.e., inclination angles with respect to the vertical axis, are drift-corrected using a gravitational direction detected by the acceleration sensors of the inclination sensor 54 in order to eliminate an accumulation of integral errors (drift) in the detected values of the gyro sensors.

Then, control goes to S2202 to calculate the difference (hereinafter referred to as a body posture change difference) between a change (the difference between an estimated body posture in the last control period (time t−Δt) and an estimated body posture in the current control period (time t)) in an estimated body posture as viewed from the global coordinate system between control periods, and a change (between a desired body posture in the last control period and a desired body posture in the current control period) in the body posture of a desired gait as viewed from the global coordinate system between control periods. The body posture of a desired gait as viewed from the global coordinate system is a body posture as viewed from the global coordinate system on the assumption that the robot 1 has moved according to the desired gait without causing a posture inclination and a spin of the robot 1 in one step on a current time's estimated supporting leg coordinate system. The estimated supporting leg coordinate system is a supporting leg coordinate system corresponding to the actual position/posture of the supporting leg foot 22 of the robot 1. More specifically, the estimated supporting leg coordinate system is a coordinate system, created when the actual supporting leg foot 22 of the robot 1 is turned from its position/posture to a horizontal position/posture without slippage on a landed surface, where the center of the ankle joint of the supporting leg as vertically projected onto the landed surface serves as the origin, a horizontal axis extending toward the toe of the foot 22 as the X-axis, a vertical axis of the foot 22 as the Z-axis, and a coordinate axis which is perpendicular to these X- and Z-axes as the Y-axis. In the present embodiment, as a result, a position/posture (a position and an orientation about the vertical axis) of the estimated supporting leg coordinate system is estimated as an estimated value of th self position of the robot 1. The position of the origin of the estimated supporting leg coordinate system and the orientations of the coordinate axes thereof are expressed according to the global coordinate system.

It is assumed that an initial value (initial position/posture) of the estimated supporting leg coordinate system has been set in the initializing process in S010.

Then, control goes to S2204 to determine a posture rotation center. Specifically, a desired ZMP at the instant (present desired ZMP) is determined as a posture rotation center. In the present embodiment, in view of the fact that the supporting leg foot 22 may possibly spin on the landed surface as the free leg swings out, the body posture change difference which represents the difference between a change in the estimated body posture and a change in the desired body posture during control periods is regarded as being caused by a spin of the supporting leg foot 22. The posture rotation center means the rotational center of the spin of the supporting leg foot 2.

Figure 11:
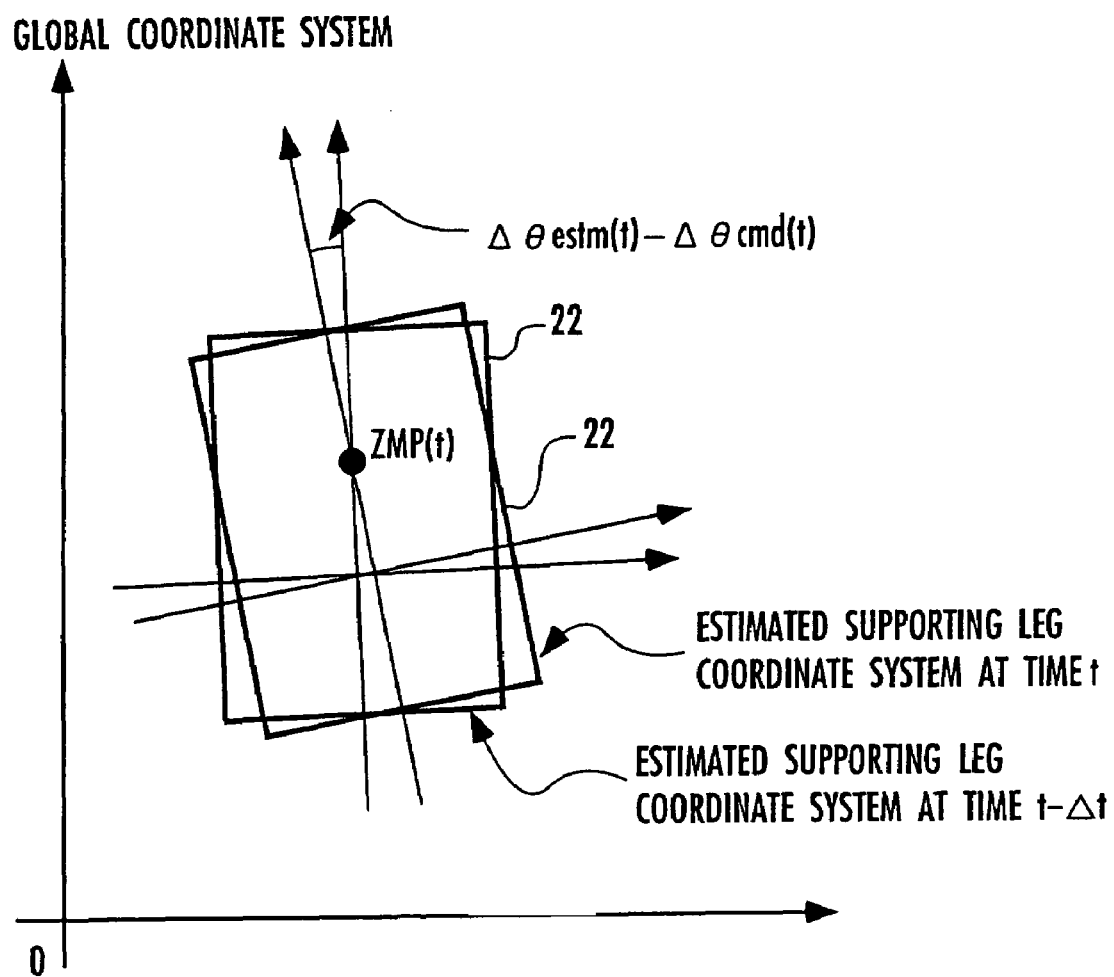
FIG. 11 is a diagram illustrative of the self position/posture estimating process in the flowchart shown in FIG. 9.

Then, control proceeds to S2206 in which the current time's estimated supporting leg coordinate system (the estimated supporting leg coordinate system at the time t−Δt shown in FIG. 11) as rotated about the posture rotation center by the body posture change difference determined in S2202 is determined again as the current time's estimated supporting leg coordinate system (the current time's estimated supporting leg coordinate system at the time t shown in FIG. 11). Because the body posture change difference determined in S2202 generally contains not only a component about the vertical axis but also a component about the horizontal axis, the direction of the Z-axis of the estimated supporting leg coordinate system that is newly determined as described above may not necessarily be the vertical direction. According to the present embodiment, therefore, after the present (at the time t−Δt) estimated supporting leg coordinate system is rotated about the posture rotation center by the body posture change difference, the estimated supporting leg coordinate system is rotated about its own origin in order to orient the Z-axis of the estimated supporting leg coordinate system in the vertical direction, thereby determining the new (at the time t) estimated supporting leg coordinate system. Alternatively, the present (at the time t−Δt) estimated supporting leg coordinate system may be rotated about the posture rotation center by only the component about the vertical axis of the body posture change difference, thereby determining the new estimated supporting leg coordinate system.

Then, control goes to S2208 to determine whether the present time t is a landing time (the time when the generation of the current time's gait for one step is completed) of the free leg foot 22 or not, i.e., whether the present time t is a switching time from gait to gait or not.

If the answer to S2208 is YES, then the following process is carried out: Control goes to S2210 in which the position and orientation of an estimated supporting leg coordinate system for a next time's gait are determined such that the relative position/posture relationship of the estimated supporting leg coordinate system for the next time's gait (an estimated supporting leg coordinate system corresponding to a landed position/posture of the foot 22 of the free leg to be landed next time) to the current time's estimated supporting leg coordinate system (determined in S2206) is the same as the relative position/posture relationship of the supporting leg coordinate system for the next time's gait to the supporting leg coordinate system for the desired gait (more specifically, the current time's gait generated until the time t−Δt (the control period preceding the switching time from gait to gait)). The supporting leg coordinate system for the next time's gait to the supporting leg coordinate system for the desired gait is a supporting leg coordinate system corresponding to the requested value for the landing position/posture for the first step.

Then, control goes to S2212 in which the position/posture of the next time's estimated supporting leg coordinate system is substituted for the position/posture of the current time's estimated supporting leg coordinate system. Thus, each time the free leg foot 22 is landed (each time the answer to S2208 is YES), the position and orientation of the estimated supporting leg coordinate system is determined as representing the actual landed position/posture of the free leg foot 22. The estimated supporting leg coordinate system is updated in each control period in view of the spin of the robot 1 until the free leg foot 22 in the current time's gait is landed.

The self-position/posture estimating process in S016 is now finished. In the present embodiment, the position and orientation of the estimated supporting leg coordinate system as representing the actual landed position/posture of the free leg foot 22 in each landing action of the robot 1 is determined. However, the self-position/posture estimating process is not limited to the above sequence. For example, the position/posture (the position/posture in the global coordinate system) of a certain component, such as the body 3, of the robot 1 may sequentially be estimated according to a known inertial navigation process, and the position and orientation of the estimated supporting leg coordinate system may be determined using the estimated position/posture and the desired gait for the robot 1 or the detected displacement values of the joints of the robot 1. At any rate, the self-position/posture estimating process may be any process insofar as it is capable of estimating, as accurately as possible, the actual landed position/posture (particularly, the orientation about the vertical axis for the posture) of the foot 22 which is landed in each time's landing action of the robot 1.

Referring back to FIG. 9, after the self-position/posture estimating process is performed as described above, control goes to S018 to determine whether the present time is a switching time from gait to gait (a time after the generation of a last time's gait is finished, when the generation of a current time's gait is to be started) or not. If the answer to S018 is YES, then control goes to S020. If the answer to S018 is NO, then control goes to S038.

When control goes to S020, the time t is initialized to 0.

Then, control goes to S022 in which the trajectory guidance process is performed by the trajectory guidance unit 220 to determine a next time's supporting leg coordinate system and a next but one time's supporting leg coordinate system. The next time's supporting leg coordinate system is a supporting leg coordinate system corresponding to a requested value for the landed position/posture (the landed position/posture of the first step) of the foot 22 of the free leg in the current time's gait, and the next but one time's supporting leg coordinate system is a supporting leg coordinate system corresponding to a requested value for the landed position/posture (the landed position/posture of the second step) of the foot 22 of the leg 2 which will become the free leg in the next time's gait. The trajectory guidance process in S022 is characteristic part of the present invention, and will be described later on. In S022, a current time's gait period and a next but one time's gait period are also determined. These gait periods are determined based on an action of the joystick 73 and a requested moving speed (or a requested landing time) for the robot 1 that is set up by a predetermined moving plane or the like.

Then, control proceeds to S024. The processing from S024 to S030 is described in detail in PCT laid-open publication WO/02/40224 and PCT/JP02/13596 which have previously been proposed by the applicant of the present application, and will only briefly be described below.

In S024, gait parameters of a normal turning gait to which the current time's gait is to be connected are determined based on the next time's supporting leg coordinate system, the next but one time's supporting leg coordinate system, the current time's gait period, and the next time's gait period which have been determined in S022. Mainly, foot trajectory parameters which define a desired foot position/posture trajectory, reference body posture trajectory parameters which define a reference trajectory of a desired body posture, arm posture trajectory parameters which define a desired arm posture trajectory, ZMP trajectory parameters which define a desired ZMP trajectory, and floor reaction force vertical component trajectory parameters which define a desired reaction force vertical component trajectory are determined. For example, the times and values of bent points of the pattern shown in FIG. 8($a$) are determined as the floor reaction force vertical component trajectory parameters.

The normal turning gait means a periodic gait which does not produce discontinuities in the motion of the robot 1 at gait boundaries when the gait is repeated ("normal turning gait" may subsequently be shortened as "normal gait").

As shown in FIG. 12, one period of the normal turning gait comprises a first turning gait corresponding to a gait for moving the foot 22 (the right foot 22R of the robot 1 in FIG. 12) of the supporting leg which corresponds to the current time's gait supporting leg coordinate system (XY coordinates in FIG. 12) to a position/posture corresponding to the next but one time's gait supporting leg coordinate system (X"Y" coordinates in FIG. 12), and a second turning gait corresponding to a gait for moving the foot 22 (the left foot 22L of the robot 1 in FIG. 12) of the supporting leg which corresponds to the next time's gait supporting leg coordinate system (X'Y' coordinates in FIG. 12) to a position/posture corresponding to the next but two time's gait supporting leg coordinate system (X'''Y''' coordinates in FIG. 12). In this case, a next but two time's gait supporting leg coordinate system corresponds to a desired landed position/posture for the free leg foot 22 of the second turning gait. The next but two time's gait supporting leg coordinate system is set up such that the position/posture (position and orientation) of the next but two time's gait supporting leg coordinate system as viewed from the next but one time's gait supporting leg coordinate system (the supporting leg coordinate system of the second turning gait) is in conformity with the position/posture (position and orientation) of the next time's gait supporting leg coordinate system (the landed position/posture of the free leg foot 22 of the current time's gait) as viewed from the current time's gait supporting leg coordinate system. The term "turning" is used with respect to the normal turning gait because straight motion can be covered by turning motion in a wide sense since turning motion with zero turning ratio means straight motion.

The normal turning gait is a hypothetical periodic gait that is temporarily generated by the gait generation system 200 to determine a divergent component and a body vertical position/speed at the terminal end of the current time's gait. The normal turning gait is not output from the gait generation system 200 for actually controlling the robot 1.

"Divergent" means that the position of the body 3 is displaced to a position that deviates from the positions of the feet 2, 2. The value of the divergent component is a numerical value representing the degree to which the position of the body of the legged mobile robot deviates from the positions of the feet (strictly, the origin of the supporting leg coordinate system established on the surface on which the supporting leg is landed), and is represented by a function of the horizontal position of the body 3 and its speed.

In the present embodiment, a normal gait which is connected subsequently to a current time's gait to be generated is set up depending on a moving request (requested values for landed positions/postures and landing times of the foot 22 of the free leg until two steps ahead), and an initial divergent component of the normal gait is determined, after which a current time's gait is generated in order to equalize the terminal divergent component of the current time's gait to the initial divergent component of the normal gait. Details of such a process are described in PCT laid-open publication WO/02/40224 or PCT/JP02/13596 which has previously been proposed by the applicant of the present application, and will not be described below.

After the gait parameters of a normal gait have been determined in S024, control goes to S206 to determine an initial state of a normal turning gait (an initial body horizontal position/speed, an initial body vertical position/speed, an initial divergent component, an initial body posture angle and angular velocity).

Then, control goes to S028 to determine gait parameters of a current time's gait (provisionally determine some gait parameters). The gait parameters of the current time's gait which are determined are foot trajectory parameters, reference body posture trajectory parameters, arm posture trajectory parameters, desired ZMP trajectory parameters, and desired floor reaction force vertical component trajectory parameters, as with the gait parameters of the normal turning gait. Trajectories defined by those parameters are determined so as to be contiguous to the trajectories of the normal turning gait. Of these parameters, however, the desired ZMP trajectory parameters are temporary. Details of the processing in S028 are described in PCT laid-open publication WO/02/40224 or PCT/JP/02/13596, and will not be described below.

Then, control goes to S030 to correct gait parameters of the current time's gait in order to equalize the terminal divergent component of the current time's gait to the initial divergent component of the normal gait. The gait parameters that are corrected are the desired ZMP trajectory parameters.

In the processing from S026 to S030, a dynamic model representing the relationship between the motion of the robot 1 and the floor reaction force is employed. The dynamic model may be a simplified model described in PCT laid-open publication WO/02/40224 or a multiparticle model (full model) described in Japanese laid-open patent publication 2002-326173 proposed by the present applicant.

Then, control goes to S032 to determine whether the desired ZMP exists in a predetermined allowable range or not.

The allowable range for the desired ZMP is set up within a range in which the desired ZMP can exist (which range is of a minimum convex polygonal shape including the landed surface, i.e., a so-called supporting polygonal shape).

It may be determined whether the gait parameters of the current time's gait which have been corrected at present satisfy other gait limiting conditions or not. Details of the gait limiting conditions are described in PCT laid-open publication WO/02/40224.

If the answer to S032 is NO, then control goes to S034 in which the trajectory guidance unit 220 performs a trajectory guidance correcting subroutine, to be described later, to correct the next time's supporting leg coordinate system and the next but one time's supporting leg coordinate system which have been determined by the trajectory guidance subroutine in S022. The processing in S034 is also central part of the present invention as with S022, and will be described later on.

Then, control returns via S036 to S024, and the processing from S024 is performed again.

If the answer to S032 is YES or if the answer to S018 is NO, then control goes to S038 in which a current time's gait instantaneous value is determined using the dynamic model based on the current time's gait parameters finally determined in S030. Details of this processing are described in PCT laid-open publication WO/02/40224 or PCT/JP/02/13596, and will not be described below.

Then, control goes to S040 in which an arm swinging action to cancel the spinning force is determined.

Then, control goes to S042 in which the gait generating time t is incremented by $\Delta t$. Thereafter, control returns to S014 to continue generating a gait as described above.

The gait generating process of the gait generation system 200, the self-position/posture estimating process of the self-position/posture estimator 224, and the trajectory guidance process of the trajectory guidance unit 220 have briefly been described above.

The control process of the control unit 60 according to the present embodiment will further be described with reference to FIG. 6. The gait generation system 200 generates a desired gait as described above. Of the generated desired gait, the desired body position/posture (trajectory) and the desired arm posture (trajectory) are directly sent to a robot geometric model (inverse kinematics calculator) 202.

The desired foot position/posture (trajectory), the desired ZMP trajectory (desired total floor reaction force central point trajectory), and the desired total floor reaction force (trajectory) (desired floor reaction force horizontal component and desired floor reaction force vertical component) are directly sent to a composite-compliance operation determinator 204, and also sent to a desired floor reaction force distributor 206. The desired floor reaction force distributor 206 distributes the desired total floor reaction force to the feet 22R, 22L, and determines desired foot floor reaction force central points and desired foot floor reaction forces. The desired foot floor reaction force central points and desired foot floor reaction forces that are determined are sent to the composite-compliance operation determinator 204.

The composite-compliance operation determinator 204 generates a corrected desired foot position/posture trajectory with deformation compensation, and sends the generated corrected desired foot position/posture trajectory with deformation compensation to the robot geometric model 202. When the desired body position/posture (trajectory) and the generated corrected desired foot position/posture (trajectory) are input to the robot geometric model 202, the robot geometric model 202 calculates joint displacement commands (values), which satisfy the input position/postures, for the twelve joints (10R(L), etc.) of the legs 2, 2, and sends the calculated joint displacement commands to a displacement controller 208. The displacement controller 208 controls displacements of the twelve joints of the robot 1 to follow the joint displacement commands (values) calculated by the robot geometric model 202, as desired values.

A floor reaction force generated on the robot 1 (specifically, actual foot floor reaction forces) is detected by the six-axis force sensors 50. The detected value is sent to the composite-compliance operation determinator 204. Inclination components of the difference between the estimated body posture determined in S2200 shown in FIG. 10 and the desired body posture generated by the gait generation system 200, i.e., posture inclination deviations $\theta errx$, $\theta erry$, is sent to a posture stabilization control calculator 212. $\theta errx$ represents an inclination component in the rolling direction (about the X-axis), and $\theta erry$ represents an inclination component in the pitching direction (about the Y-axis). The posture stabilization control calculator 212 calculates a compensating total floor reaction force's moment Mdmd about the desired total floor reaction force central point (desired ZMP) in order to recover the inclination of the body posture of the robot 1 to the inclination of the body posture of the desired gait, and sends the calculated compensating total floor reaction force's moment Mdmd to the composite-compliance operation determinator 204. The composite-compliance operation determinator 204 corrects the desired floor reaction force based on the input value. Specifically, the composite-compliance operation determinator 204 corrects the desired floor reaction force in order to cause the compensating total floor reaction force's moment Mdmd to act about the desired total floor reaction force central point (desired ZMP).

The composite-compliance operation determinator 204 determines the corrected desired foot position/posture (trajectory) with deformation compensation to equalize the state and floor reaction force of the actual robot calculated from the detected sensor values to the corrected desired floor reaction force. However, since it is practically impossible to equalize all statuses to desired values, a trade-off relationship is given therebetween to provide as much agreement between the statuses and the desired values as possible in a compromised fashion. Specifically, a control deviation for each target value is given a weight, and the control process is performed to minimize weighted average of the control deviation (or the square of the control deviation). In this manner, the actual foot position/posture and the actual total floor reaction force of the robot 1 are controlled to generally follow the desired foot position/posture and the desired total floor reaction force that are generated by the gait generating system 200.

Supplementarily, a deformation of a foot deforming mechanism (the resilient members 106, the foot sole elastic member 71, and the pouch-like member 109 of the feet mechanism shown in FIG. 3) required to produce a desired value for the floor reaction force corrected by the composite-compliance operation determinator 204 is determined using a dynamic model (a spring damper model or the like) of the foot deforming mechanism, and the corrected desired foot position/posture (trajectory) with deformation compensation is a desired foot position/posture (trajectory) that is corrected to generate such a deformation.

The trajectory guidance process in S022 according to a first embodiment of the present invention will be described in detail below.

FIG. 13 shows a flowchart of the trajectory guidance process.

Figure 16:
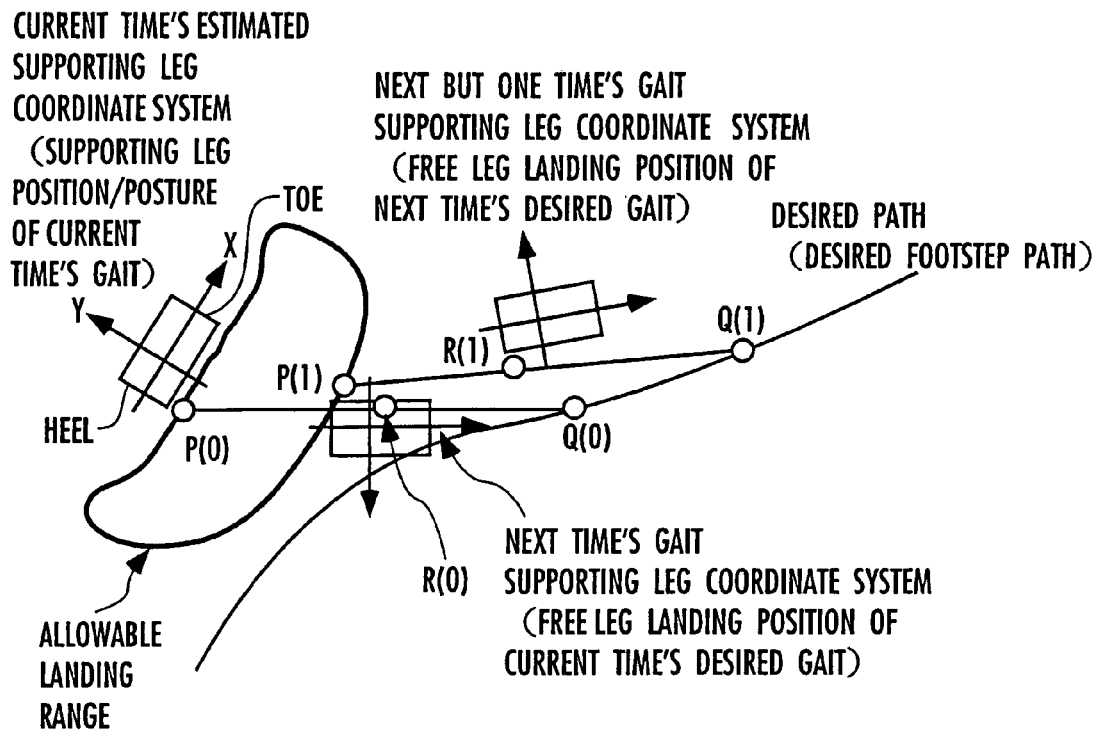

In S3000, as shown in FIG. 16, a current time's short-term desired point Q(0) is determined based on the position of a representative point P(0) of the current time's estimated supporting leg coordinate system (the estimated supporting leg coordinate system determined in the preceding control period) and a desired path.

The desired path is a path along which the actual footstep (a row of landed positions and orientations of the foot 22 of the free leg) of the robot 1 represented by a time sequence of the estimated supporting leg coordinate system is to follow. In the description which follows, the desired path may be referred to as a desired footstep path. The desired footstep path may be set up in advance, but may be generated from time to time in order to reach a desired point while avoiding obstacles, based on map information and the estimated self position/posture (the position and orientation of the estimated supporting leg coordinate system in the global coordinate system) of the robot 1. In the present embodiment, the movement planning unit 222 of the control unit 60 outputs the desired footstep path. However, the desired footstep path may be generated in S3000.

Figure 14:
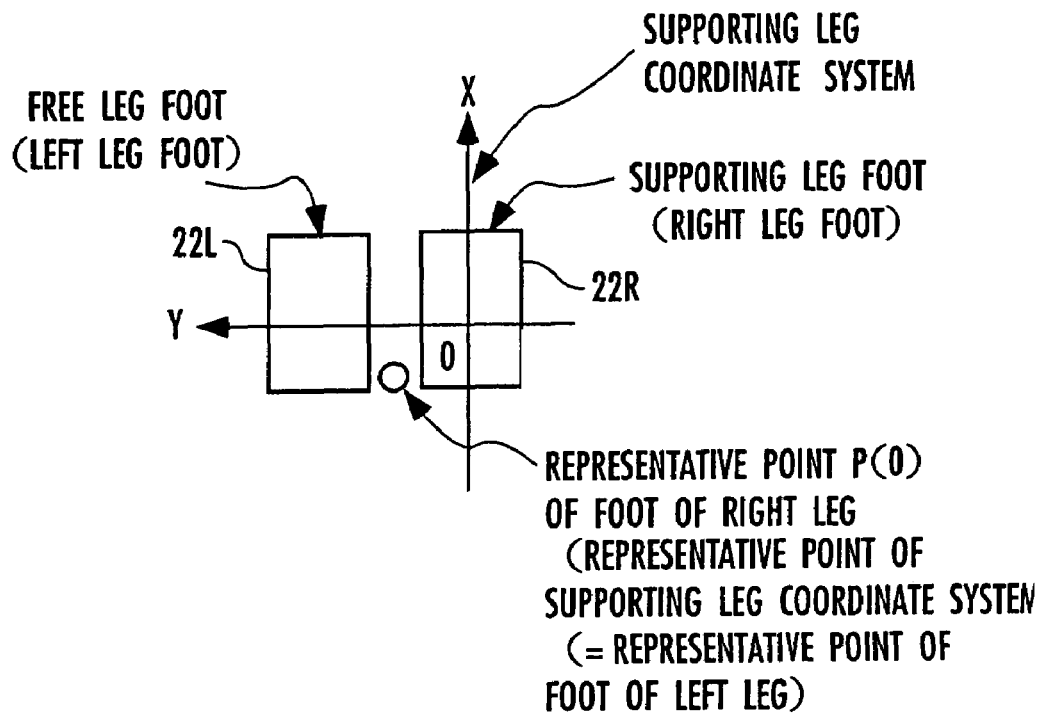
FIGS. 14 through 19 are diagrams illustrative of the trajectory guidance process.
Figure 15:
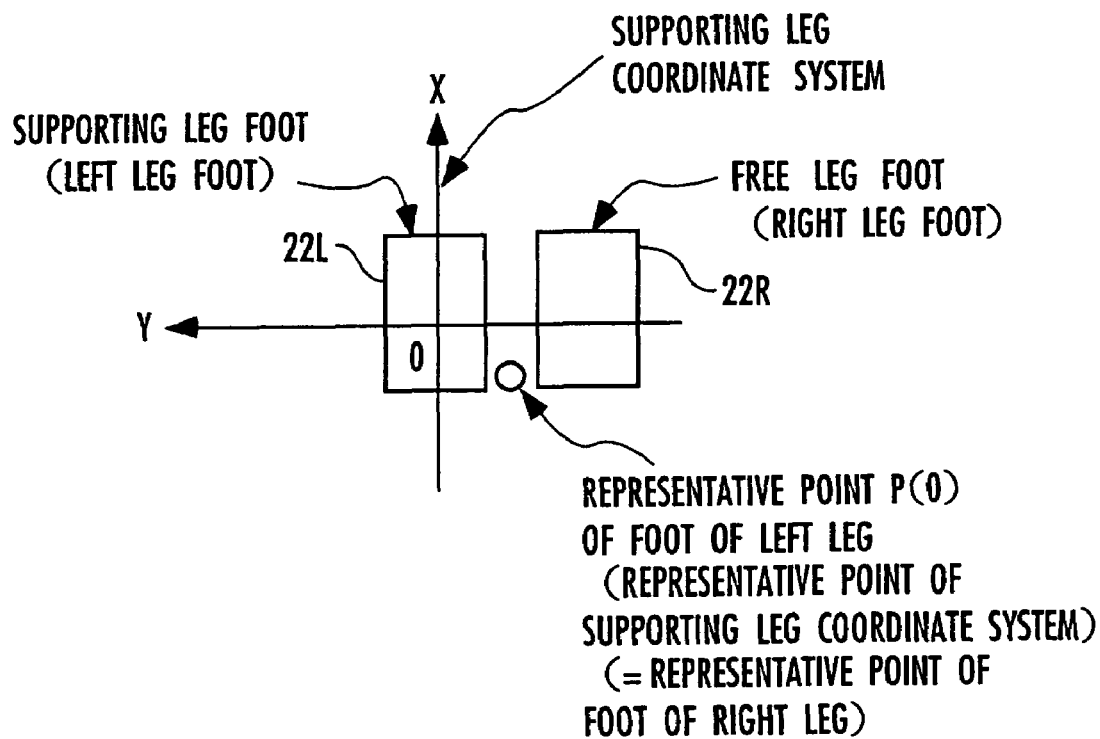

The representative point P(0) of the supporting leg coordinate system is a given point on the supporting leg coordinate system. As shown in FIGS. 14 and 15, the representative point P(0) is set up such that the position of the representative point P(0) in the direction of the Y-axis (the transverse direction) is located between the feet 22R, 22L while the supporting leg 22R or 22L in a horizontal posture that is determined so as to correspond to the supporting leg coordinate system to satisfy the corresponding relationship between the position/posture of the supporting leg foot 22 and the position/posture of the supporting leg coordinate system, are flanked in parallel by the other foot 22L or 22R (both feet 22R, 22L are arranged neatly), and the robot 1 is erected in an ordinary upstanding posture (the robot 1 is in a symmetrical state). That is, if the supporting leg foot 22 is the left foot 22L, then, as shown in FIG. 15, the representative point P(0) of the supporting leg coordinate system corresponding to the supporting leg foot 22L has its position in the direction of the Y-axis spaced a predetermined distance rightward from the supporting leg foot 22L. If the supporting leg foot 22 is the right foot 22R, then, as shown in FIG. 14, the representative point P(0) of the supporting leg coordinate system corresponding to the supporting leg foot 22R has its position in the direction of the Y-axis spaced a predetermined distance leftward from the supporting leg foot 22R.

The position of the representative point of the supporting leg coordinate system in the direction of the X-axis should preferably be set up near the heel or toe of the supporting leg foot 22 corresponding to the supporting leg coordinate system. If the representative point of the supporting leg coordinate system is set up near the heel of the supporting leg foot 22, then the feet 22R, 22L do not interfere with each other even when the toes of the feet 22R, 22L are opened or closed to turn the feet 22R, 22L on site while the representative points of the supporting leg coordinate systems corresponding to the left and right feet 22R, 22L remain in conformity with certain points fixed to the floor. If the representative point of the supporting leg coordinate system is set up near the toe of the foot 22, then the feet 22R, 22L do not interfere with each other even when the heels of the feet 22R, 22L are opened or closed to turn the feet 22R, 22L on site while the representative points of the supporting leg coordinate systems corresponding to the left and right feet 22R, 22L remain in conformity with certain points fixed to the floor.

However, if the position of the representative point of the supporting leg coordinate system in the direction of the X-axis (the longitudinal direction of the supporting leg foot 22) is set up nearly midmost between the toe and heel of the supporting leg foot 22, then the heels or toes of the feet 22R, 22L interfere with each other even when the foot 22L or 22R is oriented slightly differently from the other foot 22R or 22L.

In view of the foregoing, according to the present embodiment, as shown in FIGS. 14 and 15, while the robot 1 is in an ordinary upstanding posture (symmetrical posture) with the feet 22R, 22L arranged neatly, the representative points of the supporting leg coordinate systems are set up such that the representative points of the supporting leg coordinate systems corresponding to the left and right feet 22R, 22L are in conformity with each other laterally centrally between the feet 22R, 22L near the heels thereof. FIG. 14 shows the representative point of the supporting leg coordinate system if the right leg 2R is the supporting leg. FIG. 15 shows the representative point of the supporting leg coordinate system if the left leg 2L is the supporting leg.

Since the representative point P(0) of the supporting leg coordinate system is a point determined by the relative relationship with respect to the foot 22 as it is landed, it may hereinafter be referred to as a foot representative point.

The current time's short-term desired point Q(0) is specifically set up on the desired path (desired footstep path) such that a line segment P(0)Q(0) has a given length Lq0. Stated otherwise, the current time's short-term desired point Q(0) is set to a point of intersection between the circumference of a circle having a center at P(0) and a radius equal to the given length Lq0, and the desired path. However, if the distance from the representative point P(0) to a final destination to which the robot 1 is to move is equal to or smaller than the given length Lq0, then the current time's short-term desired point Q(0) is set to the destination.

The predetermined length Lq0 should preferably be set up depending on a moving speed which is required of the robot 1 such that the length Lq0 is greater as the moving speed is higher. If the length Lq0 is smaller, then the speed at which the foot landing position of the robot 1 is asymptotically close to the desired path is higher, and the rate of change of the foot landing orientation (or the yaw rate of the body 3 of the robot 1) is greater.

Then, control goes to S3002 to determine a representative candidate point R(0) of a next time's gait supporting leg coordinate system on the line segment P(0)Q(0). Specifically, the representative candidate point R(0) is set up on the line segment P(0)Q(0) such that the line segment P(0)R(0) has a certain given length Lr0. However, if the distance from the representative point P(0) to a final destination to which the robot 1 is to move is equal to or smaller than the given length Lr0, then the representative candidate point R(0) is set to the destination. The given length Lr0 may be a length corresponding to an ordinary stride at the time the robot 1 moves straight at the moving speed that is required of the robot 1.

Then, control goes to S3004 to determine a point, closest to the representative candidate point R(0), within the allowable landing range, as P(1).

The allowable landing range is an allowable range of positions of the free leg foot representative point and orientations of the free leg foot 22 (an allowable range of positions and orientations of the representative point of the next time's gait supporting leg coordinate system) at the time the free leg foot 22 is landed, without causing difficulties such as an interference between the legs 2, motions beyond an allowable motion range of the legs 2, and undue speeds and forces generated by the joint actuators (electric motors 64) of the legs 2 when the free leg is swung from the present status of the robot 1 (to start the current time's gait) to land the free leg foot 22. That is, the allowable landing range is an allowable range based on mechanism-dependent (or motion-dependent) limitations of the robot 1 itself (the allowable landing range may hereinafter be referred to as self-dependent allowable landing range).

The self-dependent allowable landing range is therefore included in a range where the free leg and the support leg do not interfere with each other with the free leg foot being landed.

For example, an interference between the free leg and the supporting leg at the time the free leg foot 22 is landed while the robot 1 is walking will be considered. If the landing orientation of the free leg foot 22 is 0 degree with respect to the supporting leg foot 22, i.e., if the free leg foot 22 is landed in the same orientation as the supporting leg foot 22 (the orientation of the direction of the X-axis of the supporting leg coordinate system), then an allowable landing range for the free leg foot 22 (specifically, an allowable range of free leg foot representative points) resides within the thick curve shown in FIG. 18 with respect to the supporting leg foot 22. If the landing orientation of the free leg foot 22 is −30 degrees with respect to the supporting leg foot 22, i.e., if the free leg foot 22 is landed in an orientation that it 30° spaced clockwise from the orientation of the supporting leg foot 22 (the orientation of the direction of the X-axis of the supporting leg coordinate system), then an allowable landing range (specifically, an allowable range of free leg foot representative points) resides within the thick curve shown in FIG. 19.

Figure 18:
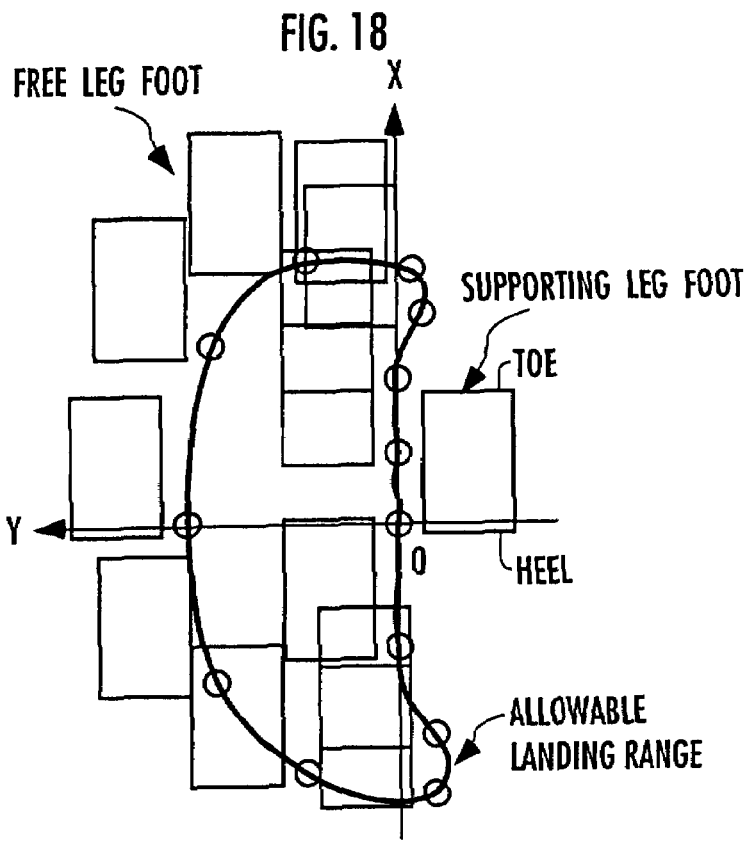
Figure 19:
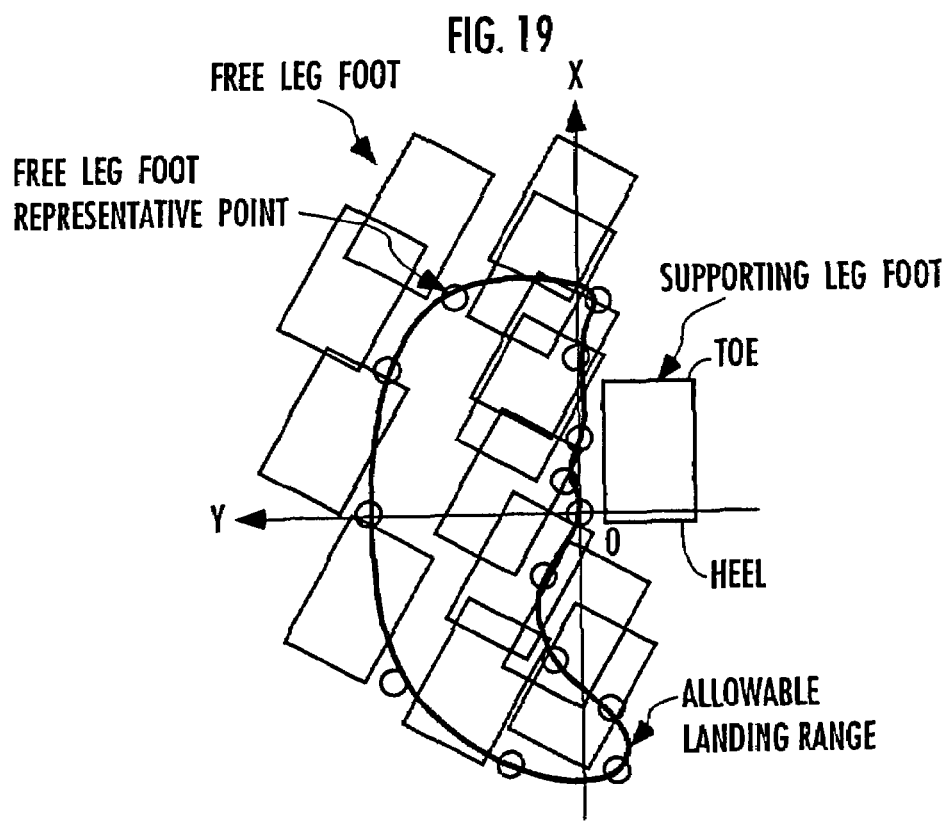

Strictly, the allowable landing range is a set of combinations of X- and Y-coordinates of the representative point of the free leg foot 22 and the foot landing orientation θz, i.e., a three-dimensional set. FIG. 18 shows a subset of the set where the foot landing orientation θz is 0 degree, and FIG. 19 shows a subset of the set where the foot landing orientation θz is −30 degrees. FIGS. 18 and 19 each show a range represented by a cross section that is produced when a three-dimensional allowable landing range is truncated by a plane where the foot landing orientation θz is of a constant value. This cross-sectional range as represented by a set of combinations of X- and Y-coordinates is referred to as a self-dependent allowable landing position range.

In the examples shown in FIGS. 18 and 19, the self-dependent allowable landing range is in conformity with a range where the free leg and the supporting leg do not interfere with each other while the free leg is landed. Depending on the present position/posture of the free leg foot 22 (the position/posture of the free leg foot 22 at the start of the current time's gait), the free leg may interfere with the supporting leg while the free leg is moving from the present position/posture to the landed position/posture. In view of such an interference during the motion of the free leg, the self-dependent allowable landing range may be smaller than a range where the free leg and the supporting leg do not interfere with each other while the free leg is landed (the allowable landing ranges shown in FIGS. 18 and 19), depending on the present position/posture of the free leg.

The self-dependent allowable landing range may be determined in real-time while the robot 1 is moving. According to the present embodiment, the self-dependent allowable landing range is set up by a predetermined map in order to reduce computing loads on the computer of the control unit 60. In this case, the self-dependent allowable landing range is available in the form of a map as a relative allowable range with respect to the supporting leg coordinate system. The self-dependent allowable landing range is set up by the map from the position/posture (position and orientation) of the current time's estimated supporting leg coordinate system, the position/posture of the present free leg foot 22 with respect to the current time's estimated supporting leg coordinate system, and the landing orientation of the free leg foot 22 that is determined by the orientation of the line segment P(0)Q(0). Alternatively, a relative region (range boundary) of the self-dependent allowable landing range with respect to the supporting leg coordinate system may be determined in advance by a formula, and the self-dependent allowable landing range may be set up using the formula.

The self-dependent allowable landing range of the free leg foot 22 may also be limited to a smaller range when there is no sufficient time until the free leg is landed. In this case, the self-dependent allowable landing range depends on the landed position/posture of the free leg foot 22 before the landed position/posture is changed (the next time's gait supporting leg coordinate system which is determined or corrected in the previous trajectory guidance process).

In S3004, specifically, if the representative candidate point R(0) exists within the allowable landing position range (stated otherwise, if the combination of the representative candidate point R(0) and the free leg landing orientation exists in the allowable landing range), then the representative candidate point R(0) is determined directly as the representative point P(1) at the time the free leg foot 22 is landed for the current time's gait. As shown in FIG. 16, if the representative candidate point R(0) deviates from the allowable landing position range, then a point, closest to the representative candidate point R(0), on a boundary (indicated by the thick line) of the allowable landing position range is determined as P(1).

Alternatively, within a three-dimensional space which has X- and Y-coordinates of the foot representative point and the foot orientation θ as elements, a distance norm $a_{NM}$ between any optional two points $M=(X_M, Y_M, \theta_{ZM})$, $N=(X_N, Y_N, \theta_{ZN})$ may be defined, for example, by:

$$a_{NM}=\sqrt{W_X(X_M-X_N)^2+W_Y(Y_M-Y_N)^2+W_Z(\theta_{ZM}-\theta_{ZN})^2}$$

(where $W_X$, $W_Y$, $W_Z$ are weighting coefficients) and the position and orientation of a point within the self-dependent allowable landing range where the distance norm is minimum may be determined as the position and orientation of the next time's gait supporting leg coordinate system, from a point in the three-dimensional space where the X- and Y-coordinates are the coordinates of R(0) and the foot orientation is θz.

Then, control goes to S3006 to determine the position and orientation of the next time's gait supporting leg coordinate system based on the position of the representative point P(1) which indicates the landing position of the free leg foot 22 at the current time's gait, and the orientation of the line segment P(0)Q(0). More specifically, the position and orientation of the next time's gait supporting leg coordinate system is determined such that the position of the representative point of the next time's gait supporting leg coordinate system is P(1) and the direction of the X-axis of the next time's gait supporting leg coordinate system is the orientation of the line segment P(0)Q(0).

In the above description, the orientation of the next time's gait supporting leg coordinate system is determined as the orientation of the line segment P(0)Q(0). However, the orientation may deviate from an allowable turning range for the orientation of the next time's gait supporting leg coordinate system with respect to the current time's gait supporting leg coordinate system (a range, determined by the mechanism-dependent limitations of the robot 1, for the orientation of the next time's gait supporting leg coordinate system, in which the allowable landing range can exist). In such a case, the orientation of the next time's gait supporting leg coordinate system is forcibly determined to be an upper-limit or lower-limit orientation of the allowable turning range, and the position of the next time's gait supporting leg coordinate system is determined depending on the determined orientation, as with the processing from S3002 to S3006. This also holds true for the process of determining the position and orientation of the next but one time's gait supporting leg coordinate system to be described below (specifically, the processing from S3010 to S3014).

Figure 17:
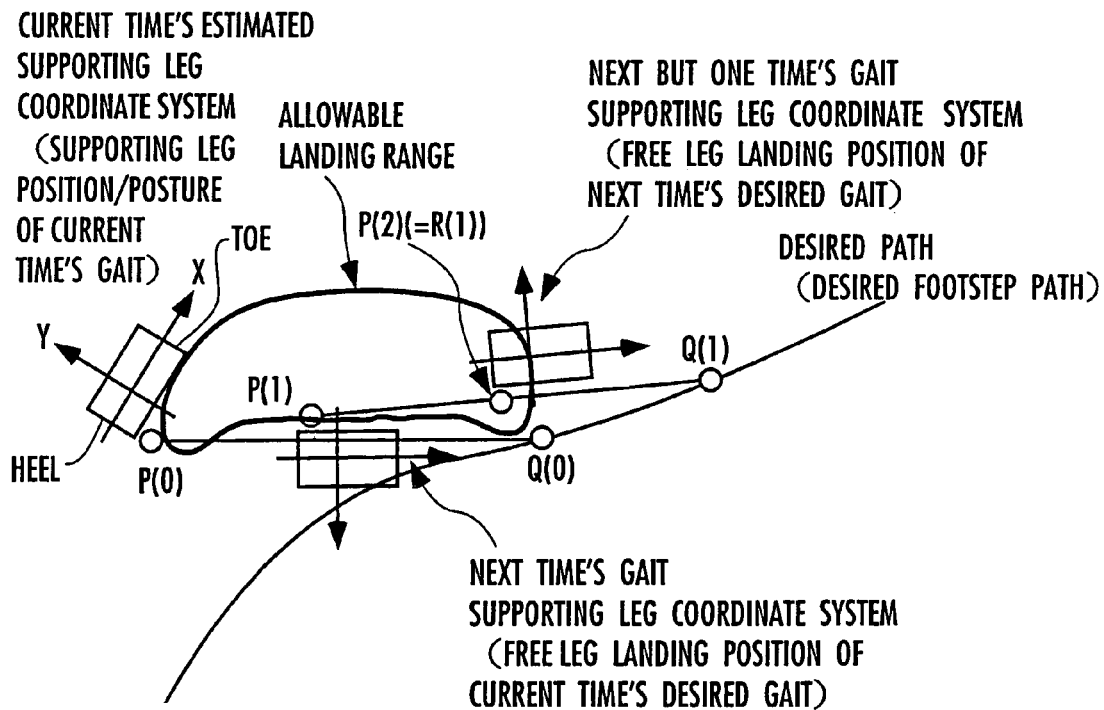

Then, control goes to S3008 to determine a next time's short-term desired point Q(1) based on the representative point P(1) of the next time's gait supporting leg coordinate system and the desired path, as shown in FIG. 17. More specifically, the next time's short-term desired point Q(1) is set up on the desired footstep path such that a line segment P(1)Q(1) has a given length Lq1. However, if the distance from the representative point P(1) to the final destination to which the robot 1 is to move is equal to or smaller than the given length Lq1, then the next time's short-term desired point Q(1) is set to the destination. The length Lq1 may be the same as the length Lq0, but may be set to a value different therefrom.

Then, control goes to S3010 to determine a representative candidate point R(1) of a next but one time's gait supporting leg coordinate system on the line segment P(1)Q(1). Specifically, the representative candidate point R(1) is set up on the line segment P(1)Q(1) such that the line segment P(1)R(1) has a certain given length Lr1. However, if the distance from the representative point P(1) to a final destination to which the robot 1 is to move is equal to or smaller than the given length Lr1, then the representative candidate point R(1) is set to the destination. The given length Lr1 may be the same as the length Lr0, but may be set to a value different therefrom.

Then, control goes to S3012 to determine a point, closest to the representative candidate point R(1), as P(2) within the allowable landing position range set up with respect to the next time's gait supporting leg coordinate system (the allowable landing position range in the case where the free leg landing orientation is the orientation of the line segment P(1)Q(1)). Specifically, if the representative candidate point R(1) does not exist within the allowable landing position range corresponding to the next time's gait supporting leg coordinate system, then a point, closest to the representative candidate point R(1), on a boundary (indicated by the thick line) of the allowable landing position range is determined as P(2). Also, as is shown in FIG. 17, the representative candidate point R(1) itself is determined as P(2) when the representative candidate point R(1) exists within the allowable landing position range.

Then, control goes to S3014 to determine the position and orientation of the next but one time's gait supporting leg coordinate system based on the position of the representative point P(2) of the next but one time's gait supporting leg coordinate system and the orientation of the line segment P(1)Q(1), as with S3004. More specifically, the position and orientation of the next but one time's gait supporting leg coordinate system is determined such that the position of the representative point of the next but one time's gait supporting leg coordinate system is P(2) and the direction of the X-axis of the next but one time's gait supporting leg coordinate system is the orientation of the line segment P(1)Q(1).

The trajectory guidance process in S022 according to the first embodiment has been described above.

As described above, the processing from S024 to S032 is executed, and if it is judged that the desired ZMP does not exist in the allowable range in S032, then control goes to S034 to execute the trajectory guidance correcting subroutine.

The trajectory guidance correcting subroutine in S034 will be described below with reference to a flowchart shown in FIG. 20.

In S3100, a deviation by which the desired ZMP exceeds the allowable range is determined. The deviation is subsequently referred to as e. The deviation e is a vector comprising an X-axis component and a Y-axis component of the current time's gait supporting leg coordinate system. The components that do not exceed the allowable range are set to 0.

Then, control goes to S3012 to determine new R(0) (R(0) on the left side) based on R(0) (R(0) on the right side)

determined by the trajectory guidance correcting subroutine, using the following equation 1:

$$R(0) = Ka*e + R(0) \qquad \text{equation 1}$$

where Ka is a predetermined coefficient.

The reasons for the above calculation will be described below. If the landing position of the free leg foot 22 at the current time's gait is corrected in the trajectory guidance correcting subroutine, then the corrected quantity of the landing position of the free leg foot 22 at the current time's gait and the corrected quantity of the desired ZMP trajectory parameters are made proportional to each other when the desired ZMP trajectory parameters are corrected to equalize the terminal divergent component of the current time's gait to the initial divergent component of the normal gait. Therefore, R(0) is changed according to the equation (1) thereby to prevent the desired ZMP from exceeding the allowable range or at least reduce the deviation by which the desired ZMP exceeds the allowable range.

Then, the processing from S3104 to S3114 is executed in the same manner as with the processing from S3004 to S3014. As with R(0), R(1) may, or may not necessarily, be changed depending the deviation by which the desired ZMP exceeds the allowable range. This is because R(1) represents the representative point of the next but one time's gait supporting leg coordinate system that is used to determine a normal turning gait which is a hypothetical periodic gait which is not used in the actual control of the robot 1.

According to the trajectory guidance correcting subroutine, as described above, the landing position (desired landing position) of the free leg foot 22 at the current time's gait, i.e., the position of the next time's gait supporting leg coordinate system, is corrected such that if the desired ZMP exceeds the allowable range, the desired ZMP is prevented from exceeding the allowable range or at least the deviation by which the desired ZMP exceeds the allowable range is reduced.

After the trajectory guidance correcting subroutine is ended, control goes via S036 shown in FIG. 9 back to S024, thus executing the above processing again. Subsequently, if it is judged that the desired ZMP exists in the allowable range in S032, control goes to S038. When control goes to S038, therefore, a next time's gait supporting leg coordinate system (next time's landing position/posture) and a next but one time's gait supporting leg coordinate system (next but one time's landing position/posture) have been determined which satisfy both the limitations on the allowable landing range (self-dependent allowable landing range) and the desired ZMP allowable range.

In the trajectory guidance correcting subroutine, it is possible to determine current time's gait parameters to keep the desired ZMP within the allowable range by correcting other gait parameters (e.g., gait periods or the like) than the positions of the next time's gait supporting leg coordinate system and the next but one time's gait supporting leg coordinate system.

The first embodiment described above is an embodiment of first through ninth inventions of the present invention, and the gait generating process and the self position/posture estimating process correspond respectively to a desired gait determining means and a foot landing position/orientation estimating means. The trajectory guidance process and the trajectory guidance correcting process correspond to a desired foot landing orientation determining means.

A second embodiment of the present invention will be described below with reference to FIGS. 21 through 24. The second embodiment is the same as the first embodiment except for the trajectory guidance process in S022 shown in FIG. 9 and the trajectory guidance correcting process in S034 shown in FIG. 9. Therefore, only the trajectory guidance process in S022 in FIG. 9 and the trajectory guidance correcting process in S034 in FIG. 9 according to the second embodiment will be described below.

FIG. 21 is a flowchart of the trajectory guidance process in S022 in FIG. 9 according to the second embodiment.

Figure 22:
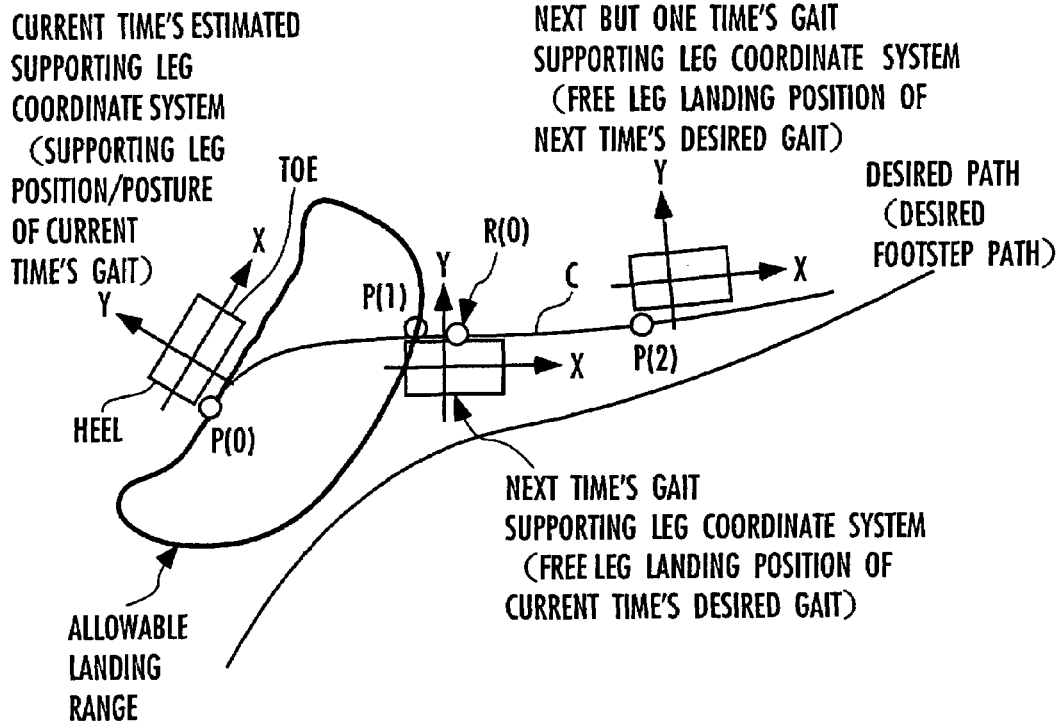
FIGS. 22 and 23 are diagrams illustrative of the trajectory guidance process according to the second embodiment.

The trajectory guidance process in S022 according to the second embodiment will be described below with reference to FIG. 21. In S3200, a curve C which is asymptotically close from the representative point P(0) to the desired footstep path, as shown in FIG. 22, is determined based on the representative point P(0) of the current time's estimated supporting leg coordinate system (estimated supporting leg coordinate system determined in S016 shown in FIG. 9 in the control period at the current time t) and the desired path (desired footstep path). Specifically, a curve C is determined to be a trajectory for an unmanned vehicle or an automatically driven vehicle under trajectory guidance control to be asymptotically close to the desired path.

More specifically, if a point of intersection between a perpendicular line extending from an optional point A on the curve C to the desired path, and the desired path is a point B, then the curvature of the curve C at the point A is determined by the following equation 2:

$$\text{The curvature of the curve at the point } A = \qquad \text{equation 2}$$
$$Ka * (\text{the length of the line segment } AB) +$$
$$Kb * (\text{the orientation of a line tangential to the curve}$$
$$\text{at the point } A - \text{the orientation of a line}$$
$$\text{tangential to the desired path at the point } B)$$

where Ka, Kb represent predetermined gains.

Then, control goes to S3202 to determine a representative candidate point R(0) of a next time's gait supporting leg coordinate system on the curve C. Specifically, the representative candidate point R(0) is set up on the curve such that the line segment P(0)R(0) has a certain given length Lr0. However, if the distance from the representative point P(0) to a final destination to which the robot 1 is to move is equal to or smaller than the given length Lr0, then the representative candidate point R(0) is set to the destination.

Then, control goes to S3204 to determine a point, closest to the representative candidate point R(0), as P(1) within the self-dependent allowable landing position range with respect to the current time's estimated supporting leg coordinate system (the self-dependent allowable landing position range where the landing orientation is the orientation of the line tangential to the curve C at the representative candidate point R(0)), as with the processing in S3004 shown in FIG. 13 according to the first embodiment.

Then, control goes to S3206 to determine the position and orientation of a next time's gait supporting leg coordinate system such that the position of the representative point of the next time's gait supporting leg coordinate system is P(1) and the direction of the X-axis of the next time's gait supporting leg coordinate system is the orientation of a line tangential to the curve C at the representative point P(1) (more accurately, the orientation of a line tangential to the curve C at the point of intersection between a perpendicular line extending from the representative point P(1) to the curve C, and the curve C).

Supplementarily, since the orientation of the line tangential to the curve C at the representative point P(1) and the orientation of the line tangential to the curve C at the representative candidate point R(0) are considered to be substantially equal to each other, the combination of the position and orientation of the next time's gait supporting leg coordinate system essentially satisfies the self-depending allowable landing range.

Then, control goes to S3208 to determine a representative candidate point R(1) of a next but one time's gait supporting leg coordinate system on the curve C. Specifically, the representative candidate point R(1) is set up on the curve C such that the line segment P(1)R(1) up on the curve C such that the line segment P(1)R(1) has a certain given length Lq1. However, if the distance from the representative point P(1) to a final destination to which the robot 1 is to move is equal to or smaller than the given length Lq1, then the representative candidate point R(1) is set to the destination. The given length Lq1 may be the same as the length Lq0, but may be set to a value different therefrom.

Figure 23:
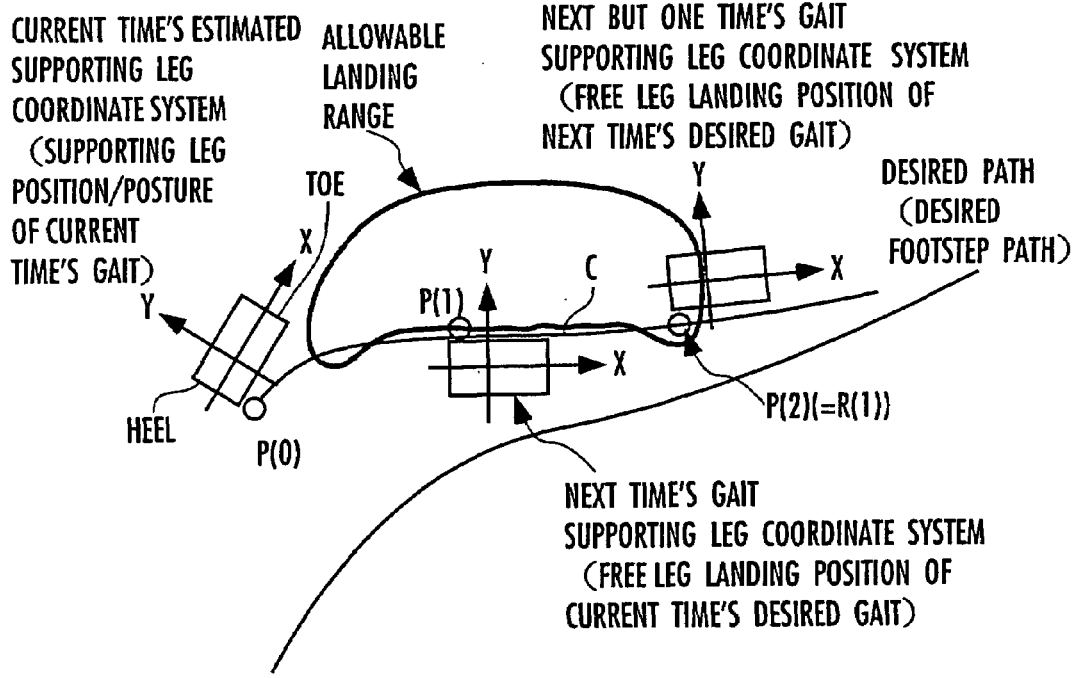

Then, control goes to S3210 to determine a point, closest to the representative candidate point R(1), as P(2) within the self-dependent allowable landing position range with respect to the next time's supporting leg coordinate system (the self-dependent allowable landing position range where the landing orientation is the orientation of the line tangential to the curve C at the representative candidate point R(1)), as with the processing in S3012 shown in FIG. 13 according to the first embodiment (see FIG. 23).

Then, control goes to S3212 to determine the position and orientation of a next but one time's gait supporting leg coordinate system such that the position of the representative point of the next but one time's gait supporting leg coordinate system is P(2) and the direction of the X-axis of the next but one time's gait supporting leg coordinate system is the orientation of a line tangential to the curve at the representative point P(2) (more accurately, the orientation of a line tangential to the curve C at the point of intersection between a perpendicular line extending from the representative point P(2) to the curve C, and the curve C).

The trajectory guidance process in S022 in FIG. 9 according to the second embodiment has been described above.

The trajectory guidance correcting subroutine in S034 in FIG. 9 according to the second embodiment will be described below with reference to FIG. 24 which shows a flowchart thereof.

Figure 20:
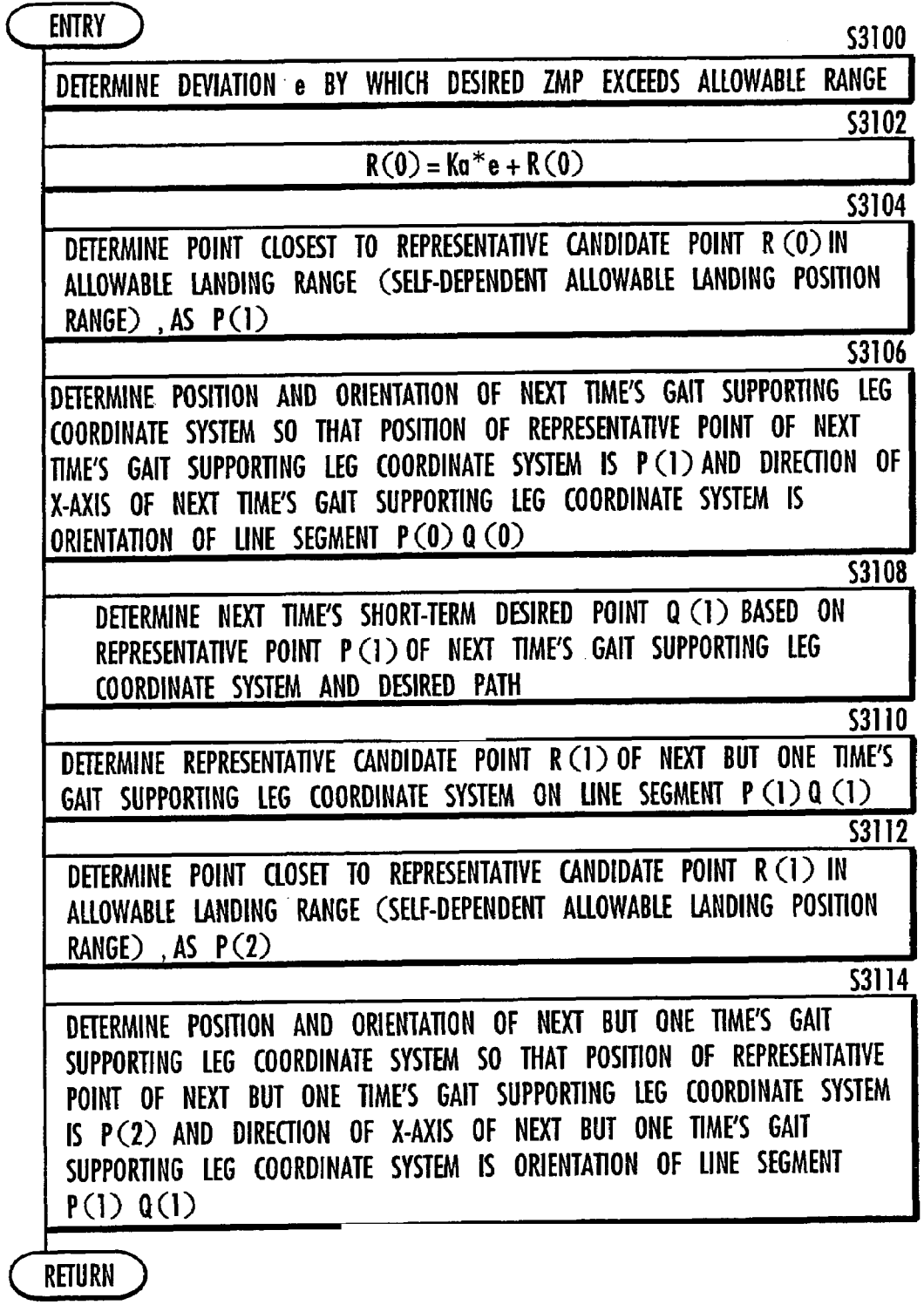
FIG. 20 is a flowchart of a trajectory guidance correcting process in the flowchart shown in FIG. 9.

In step S3300, a deviation e by which the desired ZMP exceeds the allowable range is determined, as with S3100 shown in FIG. 20 according to the first embodiment.

Then, control goes to S3302 to determine R(0) according to the equation (1), as with S3102 shown in FIG. 20 according to the first embodiment.

The processing from S3304 to S3312, which is the same as the processing from S3204 to S3212 shown in FIG. 21, is executed.

The second embodiment described above is an embodiment of first through ninth inventions of the present invention, as with the first embodiment.

A third embodiment of the present invention will be described below with reference to FIGS. 25 through 27. The third embodiment is the same as the first embodiment except for the trajectory guidance process in S022 shown in FIG. 9 and the trajectory guidance correcting process in S034 shown in FIG. 9. Therefore, only the trajectory guidance process in S022 in FIG. 9 and the trajectory guidance correcting process in S034 in FIG. 9 according to the third embodiment will be described below.

FIG. 25 is a flowchart of the trajectory guidance process in S022 in FIG. 9 according to the third embodiment.

The trajectory guidance process in S022 in FIG. 9 according to the third embodiment will be described in detail below. In S3400, as shown in FIG. 26, a current time's short-term desired point Q(0) is determined based on a representative point P(0) of the current time's estimated supporting leg coordinate system and a desired path (desired footstep path), as with S3000 shown in FIG. 13 according to the first embodiment.

Then, control goes to S3402 to determine a representative point P(1) of a next time's gait supporting leg coordinate system on the line segment P(0)Q(0) so as not to exceed the self-dependent allowable landing position range with respect to the current time's estimated supporting leg coordinate system (the self-dependent allowable landing position range where the landing orientation is the orientation of the line segment P(0)Q(0)). Specifically, as shown in FIG. 26, the representative point P(1) is set to a point of intersection between the boundary line of the self-dependent allowable landing position range and the line segment P(0)Q(0). The self-dependent allowable landing position range is set up in the same manner as with the first embodiment.

Figure 26:
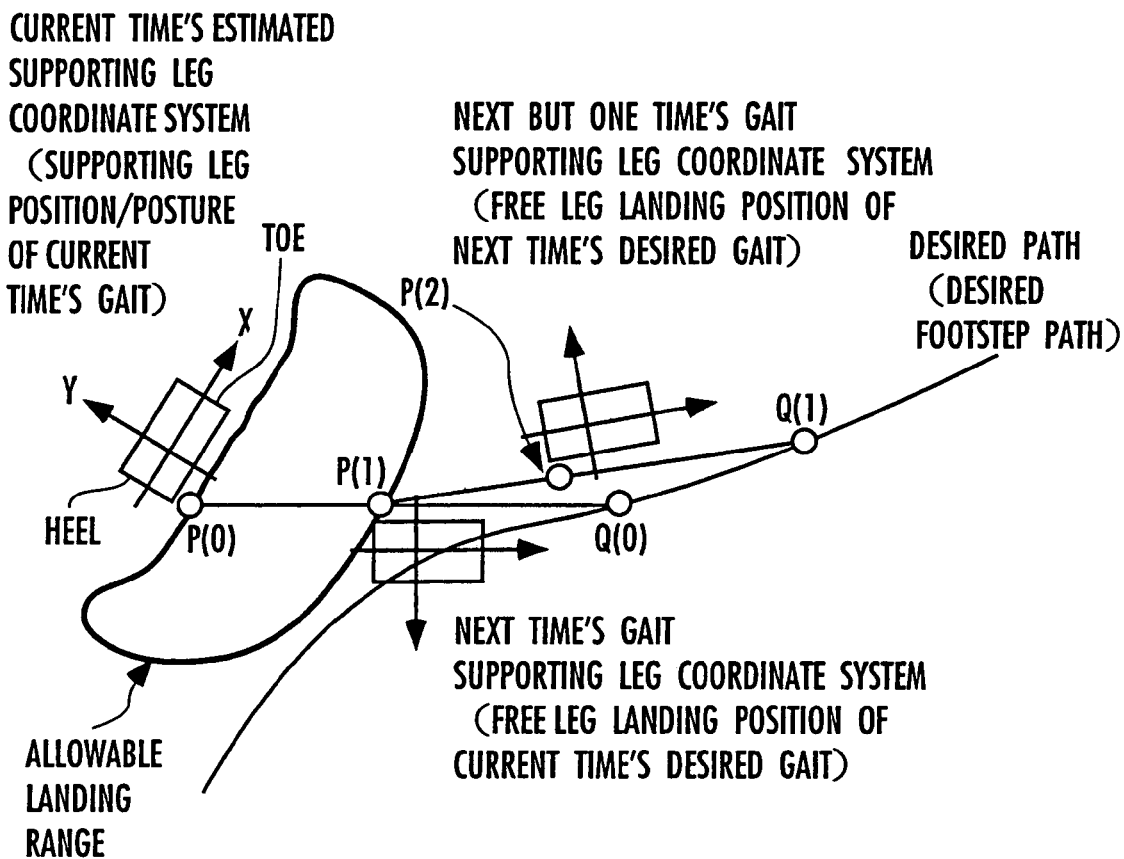
FIG. 26 is a diagram illustrative of the trajectory guidance process according to the third embodiment.
Figure 27:
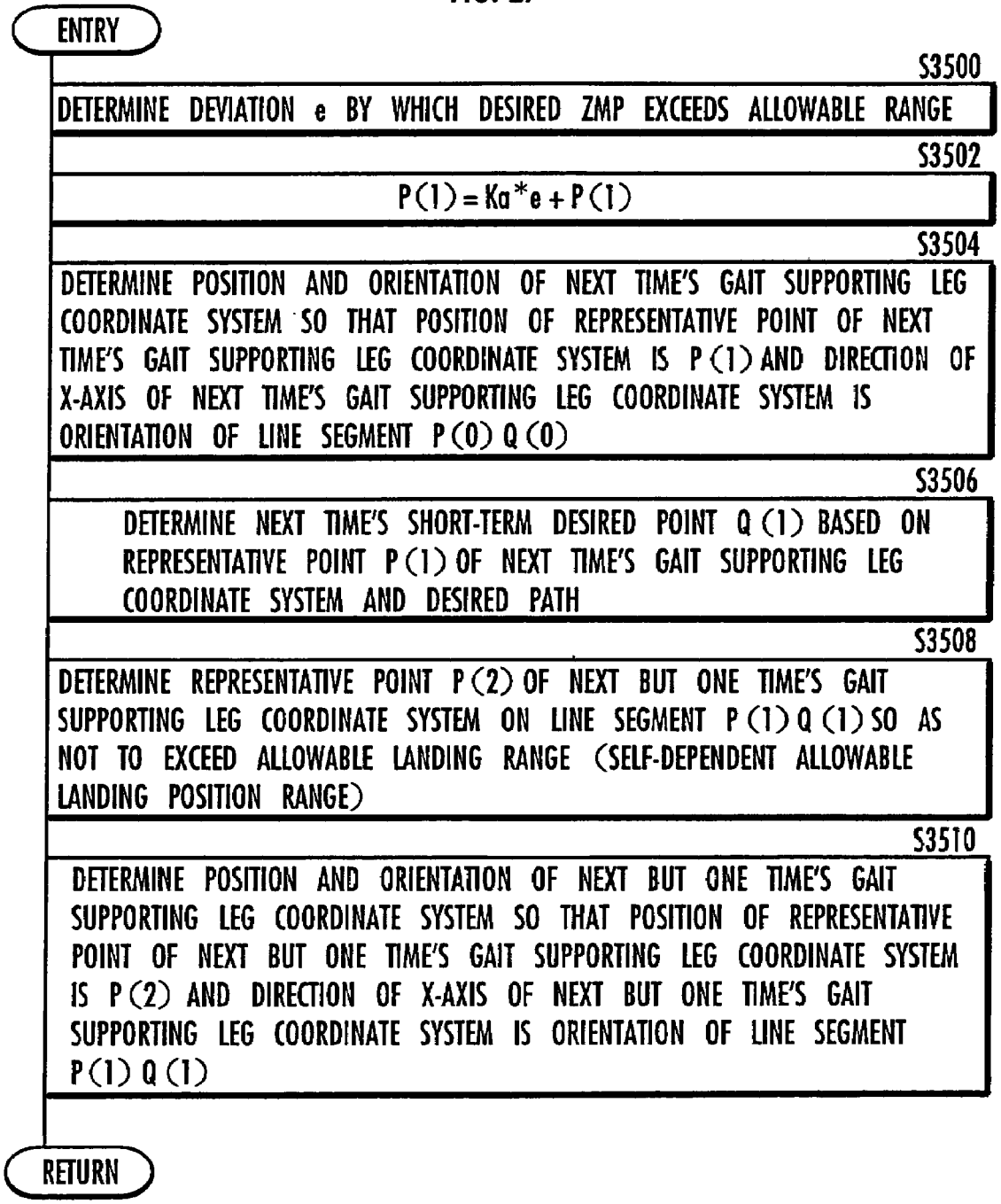
FIG. 27 is a flowchart of a trajectory guidance correcting process according to the third embodiment.

Then, control goes to S3404 to determine the position and orientation of the next time's gait supporting leg coordinate system such that the position of the representative point of the next time's gait supporting leg coordinate system is P(1) and the direction of the X-axis of the next time's gait supporting leg coordinate system is the orientation of the line segment P(0)Q(0), as shown in FIG. 26, as with S3006 shown in FIG. 13 according to the first embodiment.

Then, control goes to S3406 to determine a next time's short-term desired point Q(1) based on the representative point P(1) of the next time's gait supporting leg coordinate system and the desired path (desired footstep path), as shown in FIG. 26, as with S3008 shown in FIG. 13 according to the first embodiment.

Then, control goes to S3408 to determine a representative point P(2) of a next but one time's gait supporting leg coordinate system on the line segment P(1)Q(1) so as not to exceed the self-dependent allowable landing position range with respect to the next time's gait supporting leg coordinate system (the self-dependent allowable landing position range where the landing orientation is the orientation of the line segment P(1)Q(1)). Specifically, the representative point P(2) is set to a point of intersection between the boundary line of the self-dependent allowable landing position range with respect to the next time's gait supporting leg coordinate system and the line segment P(1)Q(1) (see FIG. 26). In FIG. 26, the self-dependent allowable landing position range with respect to the next time's gait supporting leg coordinate system is omitted from illustration.

Then, control goes to S3410 to determine the position and orientation of a next but one time's gait supporting leg coordinate system such that the position of the representative point of the next but one time's gait supporting leg coordinate system is P(2) and the direction of the X-axis of the next but one time's gait supporting leg coordinate system is the orientation of the line segment P(1)Q(1), as with S3014 shown in FIG. 13 according to the first embodiment.

The trajectory guidance process in S022 in FIG. 9 according to the third embodiment has been described above.

The trajectory guidance correcting subroutine in S034 in FIG. 9 according to the third embodiment will be described below with reference to FIG. 27 which shows a flowchart thereof.

In step S3500, a deviation e by which the desired ZMP exceeds the allowable range is determined, as with S3100 shown in FIG. 20 according to the first embodiment.

Then, control goes to S3502 to determine new P(1) based on P(1) determined in the trajectory guidance subroutine according to the following equation 3:

$$P(1)=Ka*e+P(1) \quad \text{equation (3)}$$

Then, the processing from S3504 to S3510 is executed in the same manner as with the processing from S3404 to S3410 shown in FIG. 25.

In the trajectory guidance correcting subroutine according to the third embodiment, if the desired ZMP exceeds the allowable range, then the landing position of the free leg foot 22 at the current time's gait (the position of the next time's gait supporting leg coordinate system) is corrected to prevent the desired ZMP from exceeding the allowable range.

The third embodiment described above is an embodiment of first through ninth inventions of the present invention, as with the first embodiment.

A fourth embodiment of the present invention will be described below with reference to FIGS. 28 through 30. The fourth embodiment is the same as the first embodiment except for the trajectory guidance process in S022 shown in FIG. 9 and the trajectory guidance correcting process in S034 shown in FIG. 9. Therefore, only the trajectory guidance process in S022 in FIG. 9 and the trajectory guidance correcting process in S034 in FIG. 9 according to the fourth embodiment will be described below.

FIG. 28 is a flowchart of the trajectory guidance process in S022 in FIG. 9 according to the fourth embodiment.

The trajectory guidance process in S022 according to the fourth embodiment will be described in detail below with reference to FIG. 28. In S3600, a first turning gait determined in the last control period (the control period preceding the control period of the switching time from gait to gait) is set as a current time's gait, and a second turning gait determined in the last control period is set as a next time's gait. Stated otherwise, the first turning gait and the second turning gait of the normal turning gait (see FIG. 12) which is determined at the start of generating the last time's gait are set respectively as the current time's gait and the next time's gait.

Then, control goes to S3602 to calculate a predicted next time's landing position/posture and a predicted next but one time's landing position/posture based on the current time's estimated supporting leg coordinate system (the estimated supporting leg coordinate system finally determined in S016 shown in FIG. 9 in the control period of the switching time from gait to gait), and the current time's gait and the next time's gait that are determined in S3600. The predicted next time's landing position/posture is a provisional value of the landing position/posture of the free leg foot 22 at the current time's gait, and the predicted next but one time's landing position/posture is a provisional value of the landing position/posture of the free leg foot 22 at the next time's gait.

More specifically, on the assumption that the supporting leg coordinate system of the current time's gait is in conformity with the current time's estimated supporting leg coordinate system, the predicted next time's landing position/posture (the predicted landing position/orientation of the free leg foot 22 at the current time's gait) and the predicted next but one time's landing position/posture (the predicted landing position/orientation of the free leg foot 22 at the next time's gait) are determined to satisfy the relationship between the coordinate systems shown in FIG. 12 (specifically, the next time's gait supporting leg coordinate system, the next but one time's gait supporting leg coordinate system, and the next but two time's gait supporting leg coordinate system shown in FIG. 12). This process will be described in greater detail with reference to FIG. 29 and FIG. 12. It is assumed that the supporting leg coordinate system of the first turning gait (the next time's gait supporting leg coordinate system shown in FIG. 12) of the normal turning gait that is determined so as to correspond to the last time's gait is in agreement with the current time's estimated supporting leg coordinate system. Then, the predicted next time's landing position/posture is determined such that the position and orientation of a predicted next time's supporting leg coordinate system (see FIG. 29) corresponding to the predicted next time's landing position/posture, as viewed from the current time's estimated supporting leg coordinate system, is in conformity with the position and orientation of the supporting leg coordinate system of the second turning gait as viewed from supporting leg coordinate system of the first turning gait of the normal turning gait corresponding to the last time's gait (the position and orientation of the next but one time's gait supporting leg coordinate system as viewed from the next time's gait supporting leg coordinate system shown in FIG. 12). Therefore, the relative position/posture of the predicted next time's supporting leg coordinate system with respect to the current time's estimated supporting leg coordinate system shown in FIG. 29 is made the same as the relative position/posture of the next but one time's gait supporting leg coordinate system (the supporting leg coordinate system of the second turning gait) with respect to the next time's gait supporting leg coordinate system (the supporting leg coordinate system of the first turning gait) shown in FIG. 12.

Furthermore, the predicted next but one time's landing position/posture is determined such that the position and orientation of a predicted next but one time's supporting leg coordinate system (see FIG. 29) corresponding to the predicted next but one time's landing position/posture, as viewed from the current time's estimated supporting leg coordinate system, is in conformity with the position and orientation of the supporting leg coordinate system of the next first turning gait as viewed from supporting leg coordinate system of the first turning gait of the normal turning gait corresponding to the last time's gait (the position and orientation of the next but two time's gait supporting leg coordinate system as viewed from the next time's gait supporting leg coordinate system shown in FIG. 12). Therefore, the relative position/posture of the predicted next but one time's supporting leg coordinate system with respect to the current time's estimated supporting leg coordinate system shown in FIG. 29 is made the same as the relative position/posture of the next but one time's gait supporting leg coordinate system (the supporting leg coordinate system of the second first turning gait) with respect to the next time's gait supporting leg coordinate system (the supporting leg coordinate system of the first first turning gait) shown in FIG. 12.

Figure 29:
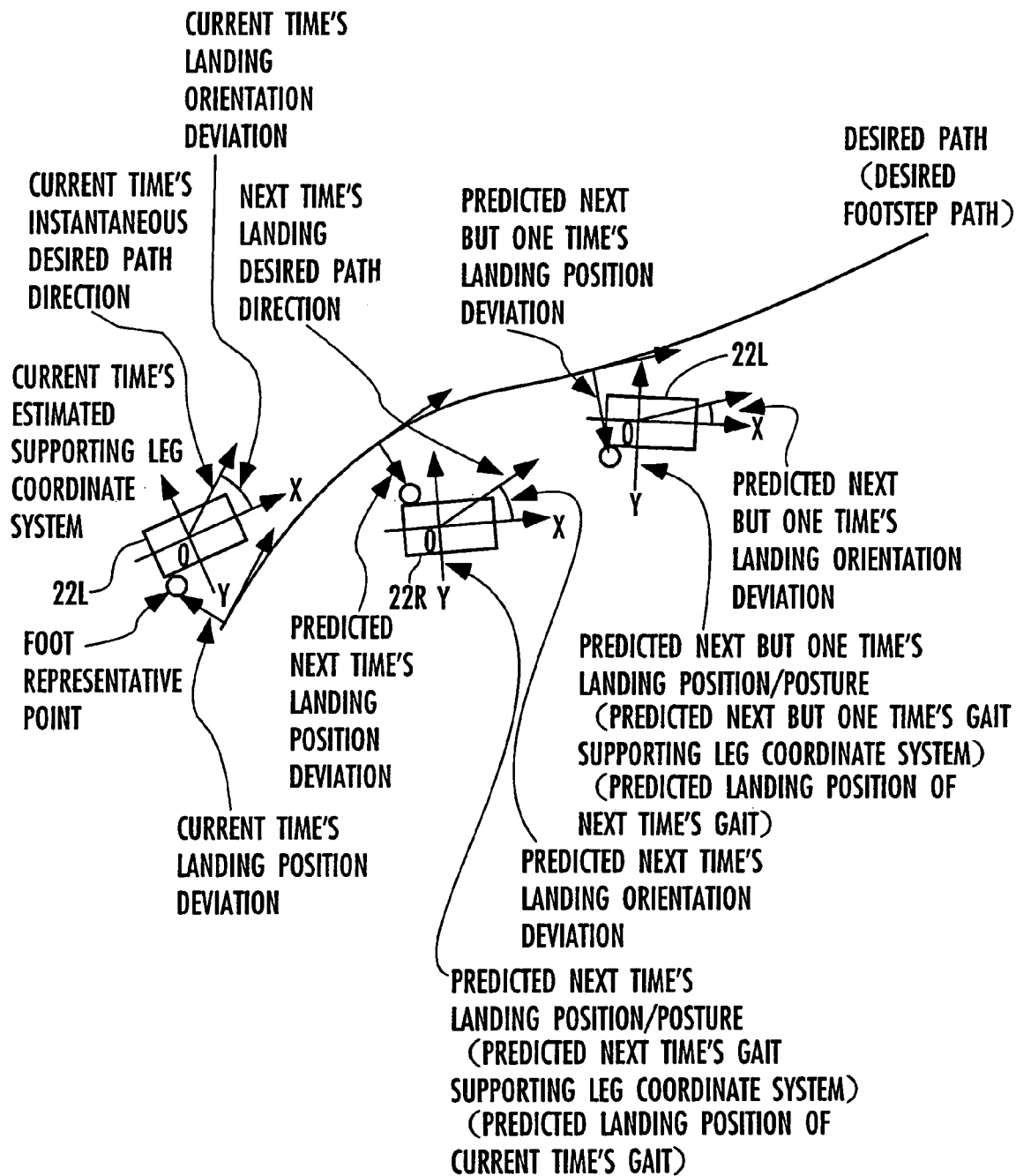
FIG. 29 is a diagram illustrative of the trajectory guidance process according to the fourth embodiment.
Figure 30:
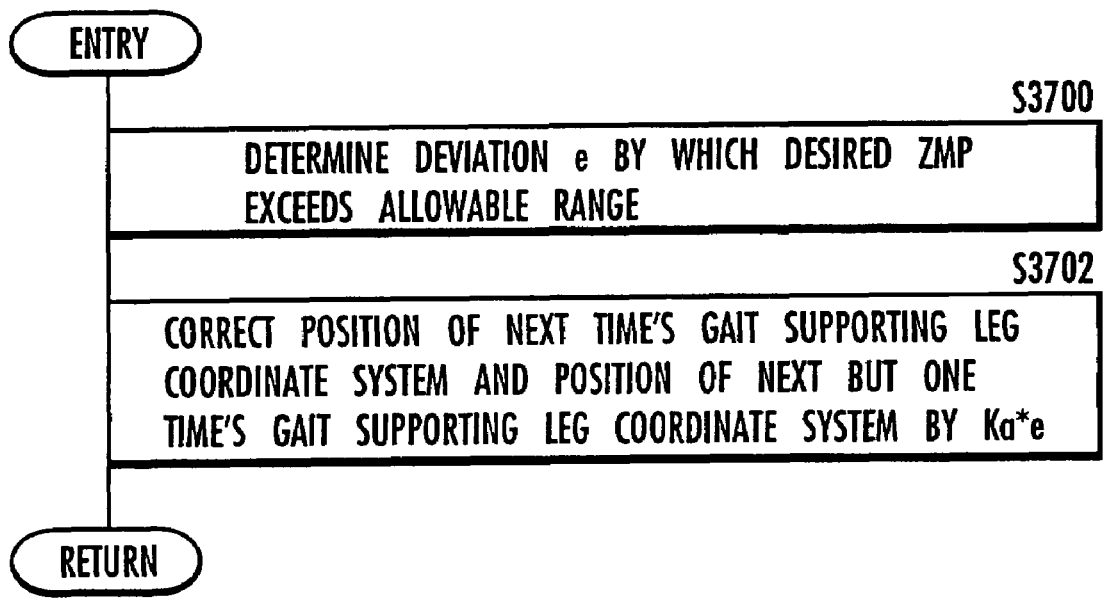
FIG. 30 is a flowchart of a trajectory guidance correcting process according to the fourth embodiment.

Then control goes to S3604 to calculate a predicted next time's landing position deviation and a predicted next time's landing orientation deviation, which are a positional deviation and an orientational deviation of the predicted next time's landing position/posture from the desired path, as shown in FIG. 29. The predicted next time's landing position deviation is represented by the length of a perpendicular line extending from the foot representative point corresponding to the predicted next time's landing position/posture to the desired path (the distance from the foot representative point to the desired path), and the predicted next time's landing orientation deviation is represented by the angle formed between the orientation of a line tangential to the desired path at a point of intersection between the perpendicular line and the desired path and the orientation (longitudinal orientation) of the foot 22 (22R in FIG. 29) corresponding to the predicted next time's landing position/posture.

Then, control goes to S3606 to calculate a predicted next but one time's landing position deviation and a predicted next but one time's landing orientation deviation, which are a positional deviation and an orientational deviation of the predicted next but one time's landing position/posture from the path, as shown in FIG. 29. These calculations are performed in the same manner as with S3604 described above.

Then, control goes to S3608 to determine the position and orientation of a next time's gait supporting leg coordinate system and the position and orientation of a next but one time's gait supporting leg coordinate system.

For example, corrective quantities of the position and orientation of the next time's gait supporting leg coordinate system and corrective quantities of the position and orientation of the next but one time's gait supporting leg coordinate system are determined by equations 4, 5, 6, and 7, and the determined corrective quantities are added to the position and orientation of the predicted next time's supporting leg coordinate system corresponding to the predicted next time's landing position/posture determined in S3602 and the position and orientation of the predicted next but one time's supporting leg coordinate system corresponding to the predicted next but one time's landing position/posture determined in S3602, thus determining the next time's gait supporting leg coordinate system and the next but one time's gait supporting leg coordinate system.

Corrective quantity of the position of the next time's gait supporting leg coordinate system=$K11$*predicted next time's landing position deviation+$K12$*predicted next time's landing orientation deviation+$K13$*predicted next but one time's landing position deviation+$K14$*predicted next but one time's landing orientation deviation    equation 4

Corrective quantity of the orientation of the next time's gait supporting leg coordinate system=$K21$*predicted next time's landing position deviation+$K22$* predicted next time's landing orientation deviation+$K23$*predicted next but one time's landing position deviation+$K24$*predicted next but one time's landing orientation deviation    equation 5

Corrective quantity of the position of the next but one time's gait supporting leg coordinate system=$K31$*predicted next time's landing position deviation+$K32$* predicted next time's landing orientation deviation+$K33$*predicted next but one time's landing position deviation+$K34$*predicted next but one time's landing orientation deviation    equation 6

Corrective quantity of the orientation of the next but one time's gait supporting leg coordinate system=$K41$*predicted next time's landing position deviation+$K42$*predicted next time's landing orientation deviation+$K43$*predicted next but one time's landing position deviation+$K44$*predicted next but one time's landing orientation deviation    equation 7

In S3608, at least either the position and orientation of the next time's gait supporting leg coordinate system or the position and orientation of the next but one time's gait supporting leg coordinate system may be corrected.

The trajectory guidance process in S022 in FIG. 9 according to the fourth embodiment has been described above.

The trajectory guidance correcting subroutine in S034 in FIG. 9 according to the fourth embodiment will be described below with reference to FIG. 30 which shows a flowchart thereof.

In step S3700, a deviation e by which the desired ZMP exceeds the allowable range is determined, as with S3100 shown in FIG. 20 according to the first embodiment.

Then, control goes to S3702 to correct the position of a next time's gait supporting leg coordinate system and the position of a next but one time's gait supporting leg coordinate system, by a quantity which is produced by multiplying a predetermined coefficient Ka by e.

The fourth embodiment described above is an embodiment of tenth through fourteenth inventions of the present invention, and the gait generating process and the self position/posture estimating process correspond respectively to a desired gait determining means and a foot landing position/orientation estimating means. The trajectory guidance process and the trajectory guidance correcting process, as combined together, correspond to a desired foot landing position/orientation provisionally determining means and a desired foot landing position/orientation correcting means.

A fifth embodiment of the present invention will be described below with reference to FIGS. 31 through 35. The fifth embodiment is the same as the first embodiment except for the trajectory guidance process in S022 shown in FIG. 9 and the trajectory guidance correcting process in S034 shown in FIG. 9. Therefore, only the trajectory guidance process in S022 in FIG. 9 and the trajectory guidance correcting process in S034 in FIG. 9 according to the fifth embodiment will be described below.

The fifth embodiment is an embodiment for an application where the allowable range of landing positions of free leg foot 22 is limited, as when the robot walks on stepping stones.

In the above embodiments up to the fourth embodiments, only the directions of normals to the desired path may basically be taken into account as positional deviations from landing positions of the free leg foot 22 of the robot 1. However, if landing positions of the free leg foot 22 are designated as when the robot walks on stepping stones, then it is necessary to take into account deviations in both fore-and-aft and lateral directions as positional deviations from the landing positions.

Figure 31:
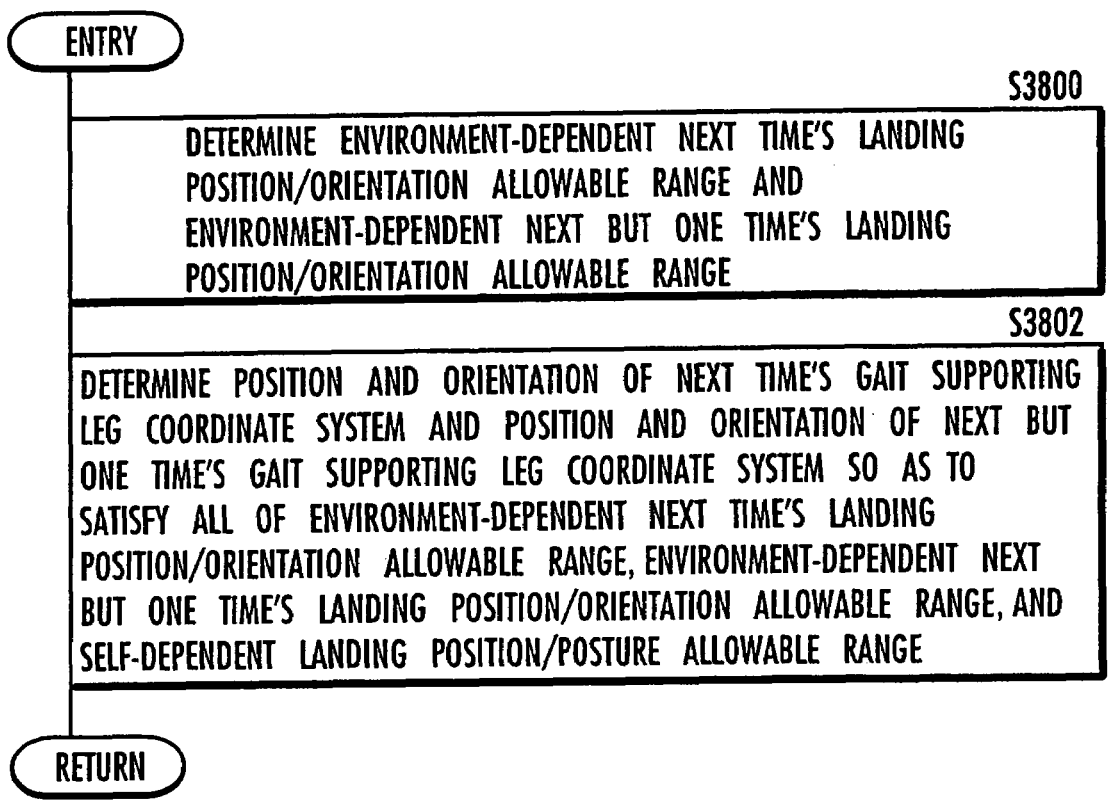
FIG. 31 is a flowchart of a trajectory guidance process according to a fifth embodiment.

FIG. 31 shows the trajectory guidance process in S022 according to the fifth embodiment.

The trajectory guidance process in S022 according to the fifth embodiment will be described below with reference to FIG. 31. In S3800, an allowable range of environment-dependent next time's landing positions/orientations and an allowable range of environment-dependent next but one time's landing positions/orientations are determined. In the present embodiment, the processing in S3800 is performed by the movement planning unit 222 shown in FIG. 6. The determined allowable range of environment-dependent next time's landing positions/orientations and the determined allowable range of environment-dependent next but one time's landing positions/orientations are given to the trajectory guidance unit 220, which performs the processing in S3802 to be described below.

Figure 32:
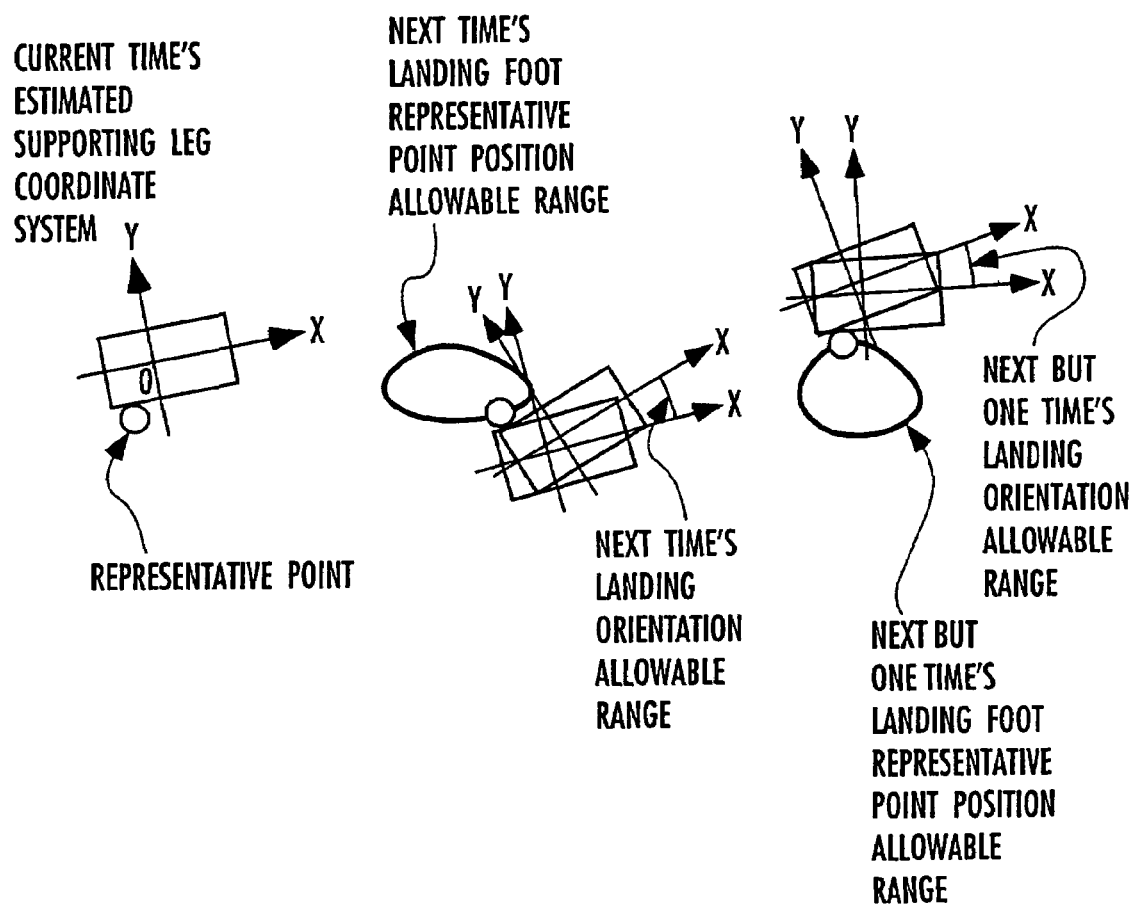
FIG. 32 is a diagram illustrative of the trajectory guidance process according to the fifth embodiment.

The allowable range of environment-dependent next time's landing positions/orientations which is determined in S3800 comprises, as shown in FIG. 32, an allowable range of environment-dependent next time's landing foot representative point positions (within the thick-line frame in FIG. 32) and an allowable range of environment-dependent next time's landing orientations. In a situation where the allowable range of environment-dependent next time's landing foot representative point positions and the allowable range of environment-dependent next time's landing orientations cannot be set independently of each other, then the allowable range of environment-dependent next time's landing orientations may be a combined allowable range of environment-dependent next time's landing foot representative point positions and environment-dependent next time's landing orientations. The allowable range of environment-dependent next time's landing positions/orientations may be available and stored in the form of a map, or may be determined on a case-by-case basis from environmental information indicative of steppingstones or the like. The allowable range of environment-dependent next but one time's landing positions/orientations is also set in the same manner as with the allowable range of environment-dependent next time's landing positions/orientations.

Then, control goes to S3802 to determine the position and orientation of a next time's supporting leg coordinate system and the position and orientation of a next but one time's supporting leg coordinate system in order to satisfy all of the allowable range of environment-dependent next time's landing positions/orientations, the allowable range of environment-dependent next but one time's landing positions/orientations, and the self-dependent allowable landing range based on the mechanism-dependent limitations of the robot 1 itself (the allowable landing range described with reference to FIGS. 18 and 19 in the first embodiment).

Figure 33:
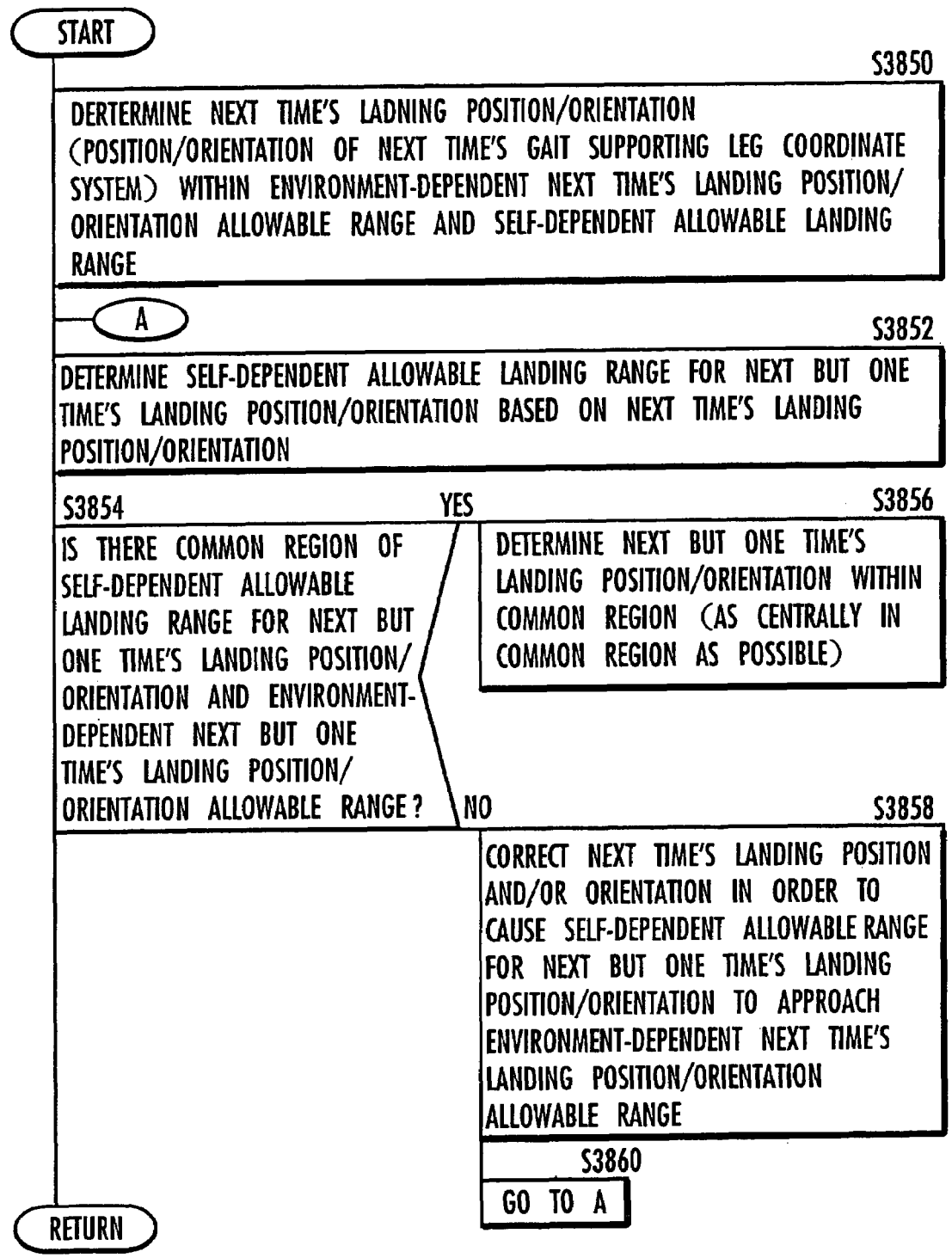
FIGS. 33 and 34 are a flowchart of a detailed process in the flowchart shown in FIG. 31 and a diagram illustrative of the detailed process.
Figure 34:
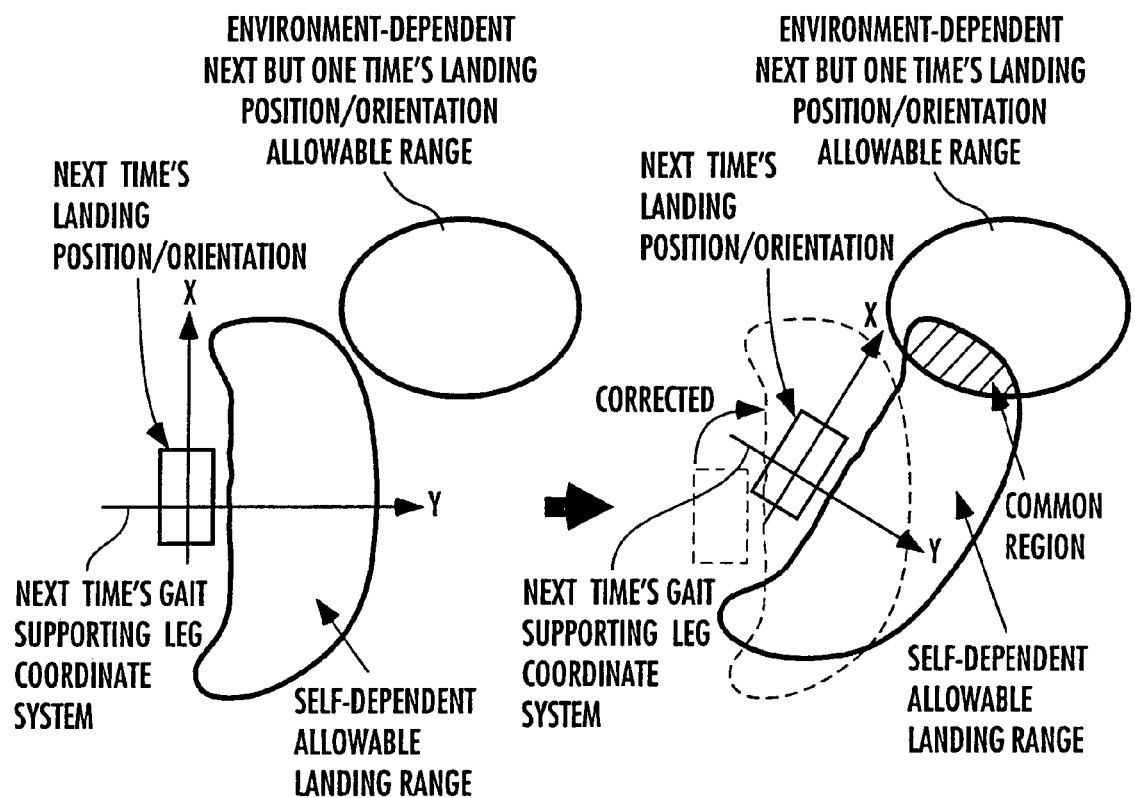

The processing in S3802 will further be described below with reference to a flowchart shown in FIG. 33. In S3850, a next time's landing position/orientation (the position of the representative of the next time's gait supporting leg coordinate system and the orientation of the next time's gait supporting leg coordinate system) is provisionally determined within the allowable range of environment-dependent next time's landing positions/orientations and also within the self-dependent allowable landing range (the self-dependent allowable landing range of next time's landing positions/orientations) corresponding to the current time's estimated supporting leg coordinate system. Specifically, a next time's landing position/orientation is provisionally determined in the center of a common region of the allowable range of environment-dependent next time's landing positions/orientations and the self-dependent allowable landing range (a common region of combinations of positions and orientations).

Then, control goes to S3852 to determine a self-dependent allowable landing range of next but one time's landing positions/orientations based on the provisionally determined next time's landing position/orientation (the position of the representative point of the next but one time's supporting leg coordinate system and the foot landing orientation).

Then, control goes to S3854 to determine whether there is a common region of the self-dependent allowable landing range of next but one time's landing positions/orientations and the allowable range of environment-dependent next but one time's landing positions/orientations.

If the answer to S3854 is YES, then control goes to S3856 to determine a next but one time's landing position/orientation (the position of the representative point of the next but one time's supporting leg coordinate system and the orientation of the next but one time's supporting leg coordinate system) in the common region of the self-dependent allowable landing range of next but one time's landing positions/orientations and the allowable range of environment-dependent next but one time's landing positions/orientations. In this case, the next but one time's landing position/orientation is determined a substantially central position and orientation in the common region. The positions and orientations of the next time's gait supporting leg coordinate system and the next but one time's gait supporting leg coordinate system are thus determined, after which the processing in S3802 shown in FIG. 31 is put to an end.

If the answer to S3854 is NO, then control goes to S3858 to correct at least either the position or orientation of the presently determined next time's landing position/orientation (at least either one of the position of the representative point of the next time's supporting leg coordinate system and the orientation of the next time's supporting leg coordinate system) in order to bring the self-dependent allowable landing range of next but one time's landing positions/orientations closely to the allowable range of environment-dependent next but one time's landing positions/orientations (so that they have a common region). For example, if there is no common region of the self-dependent allowable landing range of next but one time's landing positions/orientations and the allowable range of environment-dependent next but one time's landing positions/orientations, as shown in a left figure of FIG. 34, then the next time's landing position/orientation is corrected as shown in a right figure of FIG. 34. The next time's landing position/orientation is corrected within the common region of the self-dependent allowable landing range of next time's landing positions/orientations and the allowable range of environment-dependent next time's landing positions/orientations.

Then, control goes via S3860 to execute the processing from S3852. Finally, control goes via S3856 to determine the positions and orientations of the next time's gait supporting leg coordinate system and the next but one time's gait supporting leg coordinate system, after which the processing in S3802 shown in FIG. 31 is put to an end.

The trajectory guidance process in S022 in FIG. 9 according to the fifth embodiment has been described above.

Figure 35:
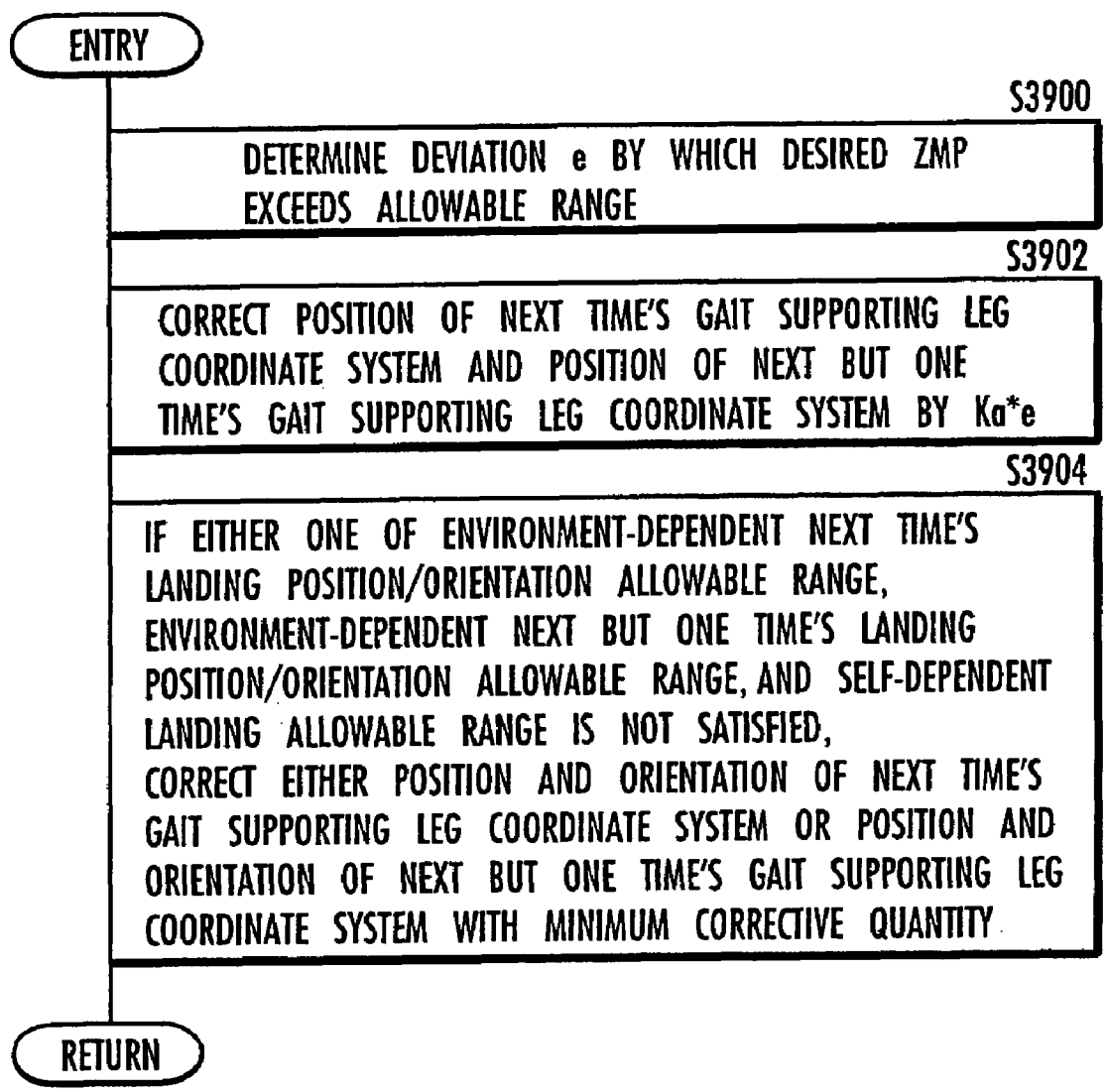
FIG. 35 is a flowchart of a trajectory guidance correcting process according to the fifth embodiment.

The trajectory guidance correcting subroutine in S034 in FIG. 9 according to the fifth embodiment will be described below with reference to FIG. 35 which shows a flowchart thereof.

In step S3900, a deviation e by which the desired ZMP exceeds the allowable range is determined, as with S3100 shown in FIG. 20 according to the first embodiment.

Then, control goes to S3902 to correct the position of a next time's gait supporting leg coordinate system and the position of a next but one time's gait supporting leg coordinate system, by a quantity which is produced by multiplying a predetermined coefficient Ka by e.

Then, control goes to S3904 to correct either the position and orientation of the next time's gait supporting leg coordinate system or the position and orientation of the next but one time's gait supporting leg coordinate system, with a minimum corrective quantity, if the corrected position of the next time's gait supporting leg coordinate system and the corrected position of the next but one time's gait supporting leg coordinate system do not satisfy either one of the allowable range of environment-dependent next time's landing positions/orientations, the allowable range of environment-dependent next but one time's landing positions/orientations, and the self-dependent allowable landing range.

Specifically, either the position and orientation of the next time's gait supporting leg coordinate system or the position and orientation of the next but one time's gait supporting leg coordinate system is corrected in order not to deviate unnecessarily from the values determined in S3902.

The fifth embodiment described above is an embodiment of fifteenth through twenty-seventh inventions of the present invention, and the gait generating process and the self position/posture estimating process correspond respectively to a desired gait determining means and a foot landing position/orientation estimating means. The trajectory guidance process and the trajectory guidance correcting process, as combined together, correspond to an allowable landing range setting means and a desired foot landing position/orientation determining means.

Figure 36:
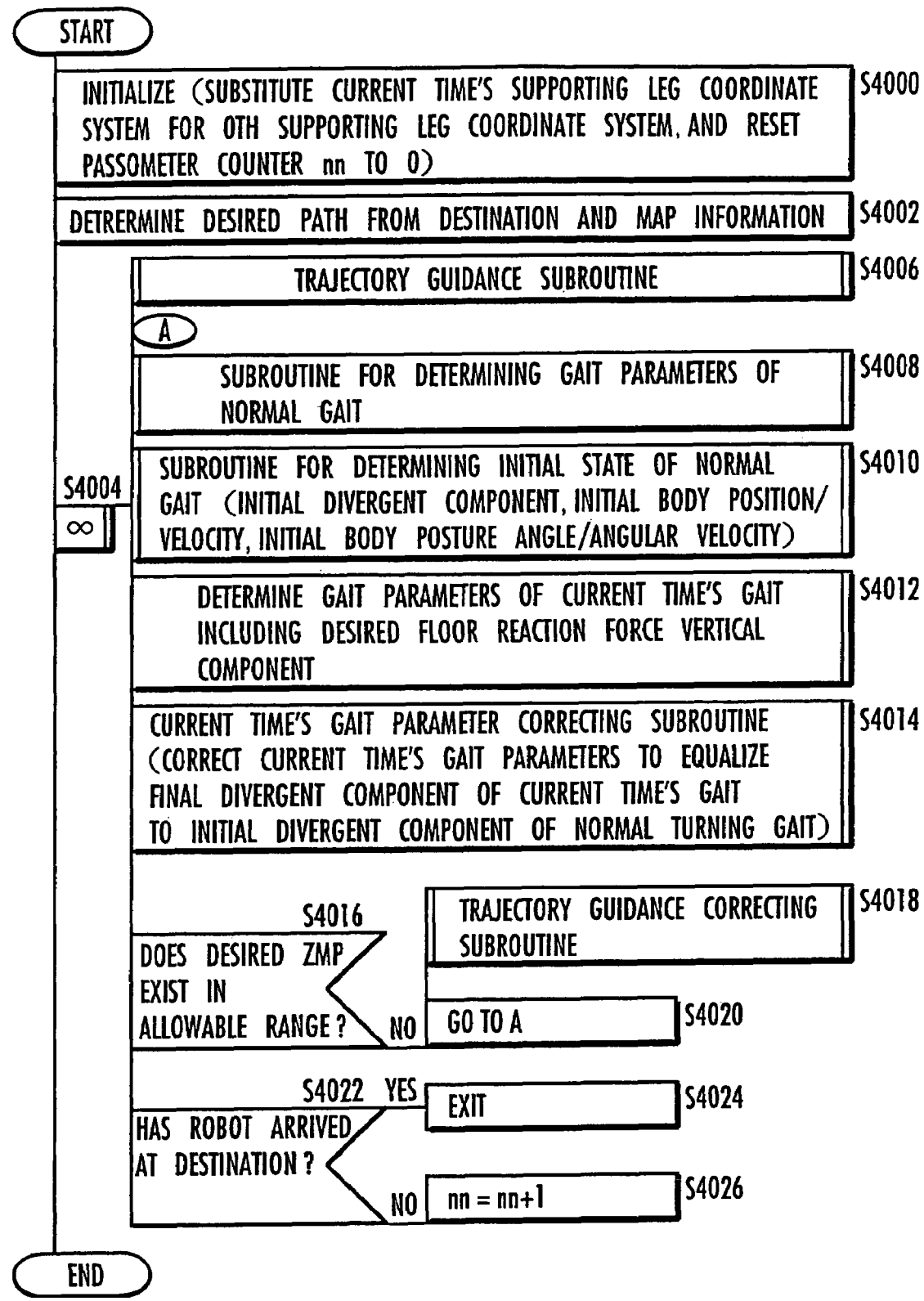
FIG. 36 is a flowchart of a footstep determining process according to a seventh embodiment.

A sixth embodiment of the present invention will be described below with reference to FIG. 36. FIG. 36 shows a trajectory planning process (a robot footstep determining process) according to the sixth embodiment. This process is executed by the movement planning unit 222 shown in FIG. 6.

The sixth embodiment is the same as the first embodiment except for the processing sequence performed by the movement planning unit 222.

The trajectory planning process according to the sixth embodiment will be described below with reference to FIG. 36. In S4000, an initializing process is performed. Specifically, the current time's supporting leg coordinate system is substituted for a 0th step supporting leg coordinate system, and a passometer counter nn is reset to 0. A desired gait is initialized. An initial desired gait is usually a gait representing an upstanding state of the robot 1.

Then, control goes to S4002 to determine a desired path (desired footstep path) based on a predetermined destination and map information.

Then, control goes via S4004 to S4006 to execute the trajectory guidance subroutine shown in FIG. 13 (the trajectory guidance subroutine according to the first embodiment). In the trajectory guidance subroutine, the estimated supporting leg coordinate system is replaced with an nnth supporting leg coordinate system, the next time's gait supporting leg coordinate system with an (nn+1)th supporting leg coordinate system, and the next but one time's gait supporting leg coordinate system with an (nn+2)th supporting leg coordinate system.

Then, the processing from S4008 to S4020 is executed in the same manner as with the processing from S024 to S036 shown in FIG. 9.

If the answer to S4016 (which determines whether the desired ZMP exists in the allowable range or not) is NO, then control goes to S4018 to execute the trajectory guidance correcting subroutine shown in FIG. 20, after which control goes via S4020 back to S4008. In the trajectory guidance correcting subroutine, as with the trajectory guidance subroutine in S4006, the estimated supporting leg coordinate system is replaced with the nnth supporting leg coordinate system, the next time's gait supporting leg coordinate system with the (nn+1)th supporting leg coordinate system, and the next but one time's gait supporting leg coordinate system with the (nn+2)th supporting leg coordinate system.

If the answer to S4016 is YES, then control goes to S4022 to determine whether a desired trajectory until the robot 1 reaches a final destination has been generated or not.

If the answer to S4022 is YES, then the trajectory planning process is put to an end.

If the answer to S4022 is NO, then the passometer counter nn is incremented by 1, after which control returns to S4006.

The trajectory planning process according to the sixth embodiment has been described above. The trajectory planning process is executed before the robot 1 moves, and the processed result is given to the gait generating system 200.

The sixth embodiment described above is an embodiment of twenty-eighth through thirty-forth inventions of the present invention. The processing sequence according to the flowchart shown in FIG. 36 provides various means according to the twenty-eighth through thirty-forth inventions.

In the sixth embodiment, since the allowable range for the desired ZMP and the self-dependent allowable landing range are satisfied by the trajectory planning process before the robot 1 moves, the gait generating system 200 may dispense with the processing in S022 shown in FIG. 9, and may substitute a sequence of supporting leg coordinate systems determined in the movement planning unit 222 successively for the next time's supporting leg coordinate system and the next but one time's supporting leg coordinate system. In the processing of the trajectory guidance subroutine in S4006 shown in FIG. 36 and the trajectory guidance correcting subroutine in S4018 shown in FIG. 36, the processing described in the second through fourth embodiments, other than the processing described in the first embodiment, may be executed. For determining footsteps of the robot 1 to move the robot 1 in a stepping stone environment, the processing described in the fifth embodiment may be executed in the processing of the trajectory guidance subroutine in S4006 and the trajectory guidance correcting subroutine in S4018. In this manner, an embodiment according to thirty-fifth through forty-first inventions is provided. In this case, inasmuch as not only the allowable range for the desired ZMP and the self-dependent allowable landing range, but also the allowable range of environment-dependent landing positions/orientations, are satisfied by the trajectory planning process before the robot 1 moves, the processing in S022 shown in FIG. 9 according to the fifth embodiment may be dispensed with when the robot 1 actually moves.

From the foregoing, it can be interpreted according to the sixth embodiment that part of the trajectory guidance process is executed before the robot 1 moves.

In each of the above embodiments, if the robot moves to a destination while avoiding obstacles or the like that are newly found during the movement, a desired path for moving the robot toward the destination while avoiding obstacles or the like may be generated again from the position/posture of the current time's estimated supporting leg coordinate system, depending on the position/posture of the current time's estimated supporting leg coordinate system.

Figure 37:
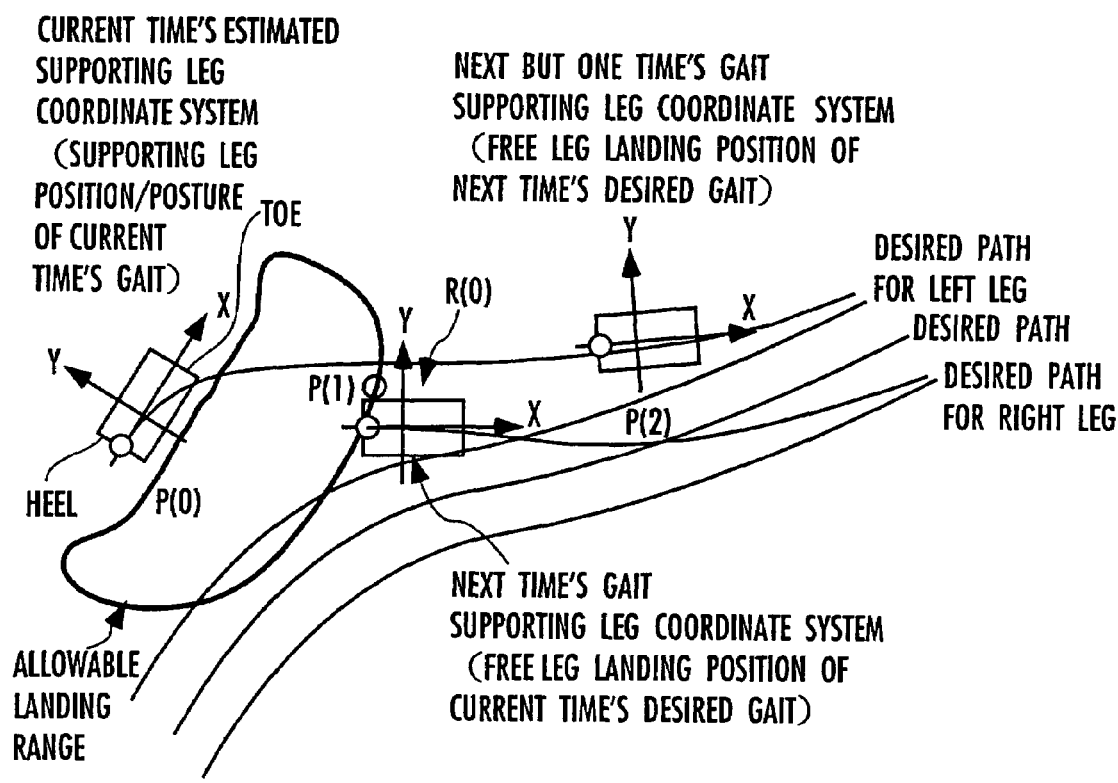
FIG. 37 is a diagram showing another example of a desired path.

Rather than setting the foot representative point (the representative point of the supporting leg coordinate system) at a position deviating from the supporting leg foot 22 toward the other foot 22, the representative point of each foot 22 may be set up laterally centrally between the feet 22, a desired path for the left leg (a desired footstep path for the left foot) and a desired path for the right leg (a desired footstep path for the right foot) may be set up at positions slightly spaced from the desired path in each of the embodiments, and a landing position/posture of the free leg foot 22 may be determined so that the representative point of each foot is asymptotically close to the desired footstep path. FIG. 37 shows an example (seventh embodiment) in which desired paths are set up for the respective left and right feet 22 as described above in the second embodiment. The same modification may be incorporated in the other embodiments.

There may be considered a system for changing the landing position/posture of the free leg foot 22 to cause the estimated body position/posture to follow the desired body position/posture as with trajectory guidance for flight vehicles and trajectory guidance for unmanned vehicles. However, even when the rotor moves straight, since the desired body position swings fore and aft and laterally in order to satisfy dynamic equilibrium conditions, an instantaneous moving direction of the desired body position is not in conformity with a long-term moving direction. In addition, because the desired body position/posture changes when the desired gait is corrected, i.e., because the desired body position/posture depends on the present walking state, the trajectory of the desired body position/posture does not become a desired trajectory that can absolutely be set up in the global coordinate system. According to this system, therefore, there is required a highly complex process as for canceling fore- and -aft and lateral swinging motions of the robot to derive a long-term moving direction of the body 3 in order to eliminate the above shortcomings.

The desired path may be, other than a path set up based on stored map information, a marker placed on the floor, a white line drawn on the floor, an electrically energized wire, an antenna, or a path made up of a collection of dots spaced a predetermined distance from a wall (for moving the robot along the wall).

Estimated self-positions may not be positions on the global coordinate system, but may be represented by a relative positional relationship with respect to the environment, such as white lines drawn on the floor or distances from a wall.

The trajectory guidance process may be executed at times other than the switching time from gait to gait to correct gait parameters such as a landing position/posture. However, since the landing position of the free leg foot 22 at the current time's gait is nearly unalterable immediately before the free leg foot 22 is landed, the landing position of the free leg foot 22 at the next time's gait is primarily changed in this case. If it is too late to change the landing position/posture of the free leg foot 22 at the current time's gait, then it is preferable not to correct the landing position/posture of the free leg foot 22 at the current time's gait, but to correct only the landing position of the free leg foot 22 at the next time's gait.

That it is too late to correct the landing position/posture of the free leg foot 22 at the current time's gait refers to a case in which the desired ZMP trajectory or the free leg foot trajectory cannot be changed by a program, or a case in which the landing position/posture would be corrected beyond physical limitations of the robot, such as when the acceleration pattern of the foot, the joint speed, the force (torque), or the desired ZMP trajectory would exceed their limitations if the desired landing position is changed.

When the positions and orientations of the next time's and next but one time's gait supporting leg coordinate systems determined in the trajectory guidance subroutine are to be changed in the trajectory guidance correcting subroutine, the trajectory guidance subroutine may be used rather than the trajectory guidance correcting subroutine to set up again at least either one of the given lengths Lr0, Lr1, Lq0, Lq1 (usually the lengths Lq0, Lq1 may be increased and the length Lr0, Lr1 may be reduced), thus determining again the positions and orientations of the next time's and next but one time's gait supporting leg coordinate systems.

As described above, according to each of the above embodiments, since a desired gait is determined based on the landing position/posture (orientation) of the foot 22 which is almost free of the effect of swinging motions of the body 3, trajectory guidance can be performed with high accuracy and response to follow the desired path.

According to the first through fifth embodiments and the seventh embodiment, 1) trajectory guidance (path guidance) can be performed with high accuracy and response to follow the desired path, 2) trajectory guidance (path guidance) can be performed while satisfying motion limiting conditions due to the structure of the robot itself, such as an interference between the legs 2, and 3) trajectory guidance (path guidance) can be performed with a high safety margin maintained.

According to the sixth embodiment, 4) it is possible to establish a plan which satisfies motion limiting conditions due to the structure of the robot itself, such as an interference between the legs 2, and 5) it is possible to establish a plan with a high safety margin maintained.

INDUSTRIAL APPLICABILITY

As described above, the present invention is useful to smoothly move a legged mobile robot such as a biped mobile robot or the like along a required desired path or in an environment where the landed positions or the like of the feet are limited, such as on stepping stones or the like.

The invention claimed is:

1. An apparatus for controlling a legged mobile robot which is movable by repeating lifting and then landing actions of each of a plurality of legs, comprising:

foot landing position/orientation estimating means for estimating a landing position and landing orientation of the foot of each of the legs which is landed in each landing action of the robot;

desired path setting means for setting a desired footstep path for the robot;

desired foot landing orientation determining means for determining a desired landing orientation of the foot which is landed in at least either one of subsequent landing actions of the robot in order to cause actual footsteps of the robot to approach said desired footstep path based on at least said estimated landing position and landing orientation of the foot and said desired footstep path;

desired gait determining means for determining a desired gait for the robot using at least the desired landing orientation determined by said desired foot landing orientation determining means; and operation control means for controlling operation of the robot depending on the determined desired gait.

2. An apparatus for controlling a legged mobile robot according to claim 1, characterized in that said desired landing orientation comprises an orientation about a vertical axis, and the landing orientation estimated by said foot landing position/orientation estimating means includes at least an orientation about a vertical axis.

3. An apparatus for controlling a legged mobile robot according to claim 1, characterized in that said legged mobile robot comprises a biped mobile robot having two legs, the desired foot landing orientation determined by said desired foot landing orientation determining means includes at least a desired landing orientation of the foot which is to be landed in a next time's landing action of the robot and a desired landing orientation of the foot which is to be landed in a next but one time's landing action of the robot, and said desired gait determining means determines a desired gait which defines the next time's landing action of the robot using at least said desired landing orientation determined by said desired foot landing orientation determining means for said next time's landing action and said next but one time's landing action.

4. An apparatus for controlling a legged mobile robot according to claim 1, characterized in that said desired foot landing orientation determining means determines a desired landing position for the foot which determines said desired landing orientation, together with said desired landing orientation, based on at least the landing position and landing orientation of the foot estimated by said foot landing position/orientation estimating means and said desired footstep path, and said desired gait determining means determines said desired gait using the desired landing position and the desired landing orientation which are determined by said desired foot landing orientation determining means.

5. An apparatus for controlling a legged mobile robot according to claim 4, characterized in that said desired foot landing orientation determining means comprises means for determining a desired landing orientation about a vertical axis and a desired landing position of the foot which is to be landed in at least several landing actions ahead including a next time's landing action, based on at least said landing position and landing orientation estimated by said foot landing position/orientation estimating means and said desired footstep path, said desired gait determining means comprises means for determining a desired gait which defines the next time's landing action using at least the desired landing position and desired landing orientation of the foot in the several landing actions ahead, which are determined by said desired foot landing orientation determining means, and said desired foot landing orientation determining means determines a combination of a desired landing position and a desired landing orientation of the foot within a self-dependent allowable landing range determined under mechanism-dependent limiting conditions of the robot itself, which include an interference between the leg making the next time's landing action and the other leg, when a desired landing position and a desired landing orientation of the foot corresponding to at least the next landing action are to be determined.

6. An apparatus for controlling a legged mobile robot according to claim 5, characterized in that said self-dependent allowable landing range is set based on a map or formula which is determined in advance as defining a relative allowable landing range of the foot to be landed in the next time's landing action, with respect to the foot landed in the landing action.

7. An apparatus for controlling a legged mobile robot according to claim 5, characterized in that said desired gait determining means comprises means for provisionally determining a desired ZMP in said desired gait which defines said next time's landing action using at least the desired landing position and desired landing orientation determined by said desired foot landing orientation determining means, and said desired foot landing orientation determining means corrects at least either one of said desired landing position and desired landing orientation of the foot to be landed in at least either one of said several landing actions ahead when the provisionally determined desired ZMP does not satisfy predetermined limiting conditions.

8. An apparatus for controlling a legged mobile robot according to claim 4, characterized in that said legged mobile robot comprises a biped mobile robot having two legs, said desired landing position for the foot comprises a representative point having a predetermined positional relationship to each foot and a desired position for a representative point which is determined in advance with respect to each foot such that the representative point with respect to each foot becomes an identical point for both feet when said robot is upstanding in a predetermined reference symmetrical posture, and said desired footstep path comprises a path to be approached by said representative point.

9. An apparatus for controlling a legged mobile robot according to claim 8, characterized in that said representative point comprises a point set up near the heel or toe of each foot.

10. An apparatus for controlling a legged mobile robot which is movable by repeating lifting and then landing actions of each of a plurality of legs to determine a desired gait, control operation of said robot depending on the desired gait, determine a hypothetical periodic gait following a new desired gait when the new desired gait is determined each time the foot of each leg of the robot is landed in at least each landing action of the robot, and determines the desired gait so as to approach the periodic gait, comprising:

foot landing position/orientation estimating means for estimating a landing position and landing orientation of the foot of each of the legs which is landed in each landing action of the robot;

desired path setting means for setting a desired footstep path for the robot;

desired foot landing position/orientation provisionally determining means for provisionally determining a desired landing position and desired landing orientation of the foot which is landed in at least either one of subsequent landing actions of the robot based on at least either one of a latest desired gait and said periodic gait corresponding to the desired gait, and the estimated landing position and landing orientation of the foot;

desired foot landing position/orientation correcting means for correcting at least either one of the provisionally determined desired landing position and desired landing orientation in order to cause actual footsteps of the robot to approach said desired footstep path based on the provisionally determined desired landing position and desired landing orientation and said desired footstep path; and desired gait determining means for determining said new desired gait for the robot using at least the corrected desired landing position and desired landing orientation.

11. An apparatus for controlling a legged mobile robot according to claim 10, characterized in that said desired landing orientation comprises an orientation about a vertical axis, and the landing orientation estimated by said foot landing position/orientation estimating means includes at least an orientation about a vertical axis.

12. An apparatus for controlling a legged mobile robot according to claim 10, characterized in that said desired gait determining means comprises means for provisionally determining a desired ZMP in said new desired gait using at least the desired landing position and desired landing orientation corrected by said desired foot landing position/orientation correcting means, and said desired foot landing position/orientation correcting means corrects at least either one of said desired landing position and desired landing orientation in at least either one of said several landing actions, which has been provisionally determined by said desired foot landing position/orientation provisionally determining means, when the provisionally determined desired ZMP does not satisfy predetermined limiting conditions.

13. An apparatus for controlling a legged mobile robot according to claim 10, characterized in that said legged mobile robot comprises a biped mobile robot having two legs, said desired landing position for the foot comprises a representative point having a predetermined positional relationship to each foot and a desired position for a representative point which is determined in advance with respect to each foot such that the representative point with respect to each foot becomes an identical point for both feet when said robot is upstanding in a predetermined reference symmetrical posture, and said desired footstep path comprises a path to be approached by said representative point.

14. An apparatus for controlling a legged mobile robot according to claim 13, characterized in that said representative point comprises a point set up near the heel or toe of each foot.

15. An apparatus for controlling a legged mobile robot which is movable by repeating lifting and then landing actions of each of a plurality of legs, comprising:
  foot landing position/orientation estimating means for estimating a landing position and landing orientation of the foot of each of the legs which is landed in each landing action of the robot;
  allowable foot landing range setting means for selling a plurality of environment-dependent allowable landing ranges corresponding to several landing actions ahead which include at least next time's and next but one time's landing actions, of environment-dependent allowable landing ranges determined under environmental conditions in which the robot moves, which are allowable ranges of combinations of landing positions and landing orientations of feet landed in the landing actions of the robot;
  desired foot landing position/orientation determining means for determining combinations of desired landing positions and desired landing orientations of feet to be landed in said several landing actions ahead in order to satisfy the environment-dependent allowable landing position ranges, based on at least said estimated landing orientation of the foot and a plurality of environment-dependent allowable landing position ranges set by said allowable foot landing range selling means;
  desired gait determining means for determining a hypothetical periodic gait of the robot using at least the determined desired landing positions and desired landing orientations corresponding to the determined several landing actions ahead, and determining a new desired gait for the robot which defines at least the next time's landing action in order to approach the determined hypothetical periodic gait; and
  operation control means for controlling operation of the robot depending on the determined new desired gait.

16. An apparatus for controlling a legged mobile robot according to claim 15, characterized in that said desired landing orientation comprises an orientation about a vertical axis, and the landing orientation estimated by said foot landing position/orientation estimating means includes at least an orientation about a vertical axis.

17. An apparatus for controlling a legged mobile robot according to claim 15, characterized in that said desired foot landing position/orientation determining means determines a combination of a desired landing position and desired landing orientation for the foot in at least the next time's landing action within a common region of a self-dependent allowable landing range determined under mechanism-dependent limiting conditions of the robot itself, which include an interference between the leg making the next time's landing action and the other leg, and the environment-dependent allowable landing range corresponding to the next time's landing action, and said desired gait determining means uses the desired landing position and desired landing orientation for the foot to be landed in at least the next time's landing action in order to determine said hypothetical periodic gait.

18. An apparatus for controlling a legged mobile robot according to claim 17, characterized in that said self-dependent allowable landing range is set based on a map or formula which is determined in advance as defining a relative allowable landing range of the foot to be landed in the next time's landing action, with respect to the foot landed in the landing action.

19. An apparatus for controlling a legged mobile robot according to claim 17, characterized in that said legged mobile robot comprises a biped mobile robot having two legs, and said desired landing position for the foot comprises a representative point having a predetermined positional relationship to each foot and a desired position for a representative point which is determined in advance with respect to each foot such that the representative point with respect to each foot becomes an identical point for both feet when said robot is upstanding in a predetermined reference symmetrical posture.

20. An apparatus for controlling a legged mobile robot according to claim 15, characterized in that said desired gait determining means comprises means for provisionally determining a desired ZMP in the desired gait for the robot which defines at least said next time's landing action, and said desired foot landing position/orientation determining means corrects at least either one of said desired landing position and desired landing orientation of the foot to be landed in at least either one of said several landing actions ahead when the provisionally determined desired ZMP does not satisfy predetermined limiting conditions.

21. An apparatus for controlling a legged mobile robot according to claim 15, characterized in that said legged mobile robot comprises a biped mobile robot having two legs, and said desired landing position for the foot comprises a representative point having a predetermined positional relationship to each foot and a desired position for a representative point which is determined in advance with respect to each foot such that the representative point with respect to each foot becomes an identical point for both feet when said robot is upstanding in a predetermined reference symmetrical posture.

22. An apparatus for controlling a legged mobile robot according to claim 21, characterized in that said representative point comprises a point set up near the heel or toe of each foot.

23. An apparatus for controlling a legged mobile robot which is movable by repeating lifting and then landing actions of each of a plurality of legs, comprising:
  foot landing position/orientation estimating means for estimating a landing position and landing orientation of the foot of each of the legs which is landed in each landing action of the robot;
  first allowable landing range setting means for setting a plurality of environment-dependent allowable landing ranges corresponding to several landing actions ahead which include at least next time's and next but one time's landing actions, of environment-dependent allowable landing ranges determined under environmental conditions in which the robot moves, which are allowable ranges of combinations of landing positions and landing orientations of feet landed in the landing actions of the robot;

second allowable landing range setting means for setting a self-dependent allowable landing range for a combination of a landing position and landing orientation of the foot to be landed in the next time's landing action, based on a desired landing position and desired landing orientation of the foot in each landing action which are estimated by said foot landing position/orientation estimating means and mechanism-dependent limiting conditions of the robot itself, which include an interference between the leg making the next time's landing action and the other leg;

desired foot landing position/orientation determining means for determining a combination of a desired landing position and desired landing orientation of a foot to be landed in the next time's landing action within a common region of the environment-dependent allowable landing range and the self-dependent allowable landing range which are set respectively by said first allowable landing range setting means and said second allowable landing range setting means for at least said next time's landing action, based on said environment-dependent allowable landing range and said self-dependent allowable landing range;

desired gait determining means for determining a desired gait which defines the next time's landing action using at least the determined desired landing position and desired landing orientation; and operation control means for controlling operation of the robot depending on the determined desired gait.

24. An apparatus for controlling a legged mobile robot according to claim 23, characterized in that said desired landing orientation comprises an orientation about a vertical axis, and the landing orientation estimated by said foot landing position/orientation estimating means includes at least an orientation about a vertical axis.

25. An apparatus for controlling a legged mobile robot according to claim 23, characterized in that said desired foot landing position/orientation determining means comprises means for determining the desired landing position and desired landing orientation corresponding to the next time's landing action and thereafter provisionally determining a self-dependent allowable landing range for the landing position of the foot to be landed in the next but one time's landing action based on the determined desired landing position and desired landing orientation and the mechanism-dependent limiting conditions of the robot, and means for correcting at least either one of the desired landing position and desired landing orientation corresponding to the next time's landing action in order to have a common region of at least the provisionally determined self-dependent allowable landing range corresponding to the next but one time's landing action and the next but one time's environment-dependent allowable range set by said first allowable landing range setting means for the next but one time's landing action, if said common region is not provided.

26. An apparatus for controlling a legged mobile robot according to claim 23, characterized in that said second allowable landing range setting means sets said self-dependent allowable landing range based on a map or formula which is determined in advance as defining a relative allowable landing range of the foot to be landed in the next time's landing action, with respect to the foot landed in the landing action.

27. An apparatus for controlling a legged mobile robot according to claim 23, characterized in that said legged mobile robot comprises a biped mobile robot having two legs, and said desired landing position for the foot comprises a point having a predetermined positional relationship to each foot and a position of a representative point which is determined in advance with respect to each foot such that the representative point with respect to each foot becomes an identical point for both feet when said robot is upstanding in a predetermined reference symmetrical posture.

28. An apparatus for controlling a legged mobile robot according to claim 27, characterized in that said representative point comprises a point set up near the heel or toe of each foot.

29. A footstep determining apparatus for determining a desired landing position and desired landing orientation for the foot of a leg to be landed in each landing action of a legged mobile robot which is movable by repeating lifting and then landing actions of each of a plurality of legs, comprising:

desired path setting means for setting a desired footstep path for said robot;

wherein the desired landing position and desired landing orientation for the foot to be landed in each landing action of said robot are determined based on the desired landing position and desired landing orientation for the foot landed in at least the preceding landing action, and said desired footstep path.

30. A footstep determining apparatus for a legged mobile robot according to claim 29, characterized in that said desired landing orientation comprises an orientation about a vertical axis.

31. A footstep determining apparatus for a legged mobile robot according to claim 29, characterized in that when a desired landing position and desired landing orientation for the foot to be landed in each landing action of the robot is to be determined, a combination of a desired landing position and desired landing orientation for the foot in the landing action is determined in a self-dependent allowable landing range which is determined under mechanism-dependent limiting conditions of the robot itself, which include an interference between the leg making the landing action and the other leg.

32. A footstep determining apparatus for a legged mobile robot according to claim 31, characterized in that said self-dependent allowable landing range which is used to determine a desired landing position and desired landing orientation for the foot to be landed in an Nth landing action of the robot is set based on a map or formula which is determined in advance as defining a relative allowable landing range of the foot to be landed in the Nth landing action with respect to the foot to be landed in an (N−1)th landing action.

33. A footstep determining apparatus for a legged mobile robot according to claim 29, comprising:

desired landing position/orientation provisionally determining means for, when a desired landing position and desired landing orientation for the foot to be landed in an Nth landing action of the robot is to be determined, provisionally determining a desired landing position and desired landing orientation of the foot to be landed in several landing actions ahead including said Nth landing action, based on a desired landing position and desired landing orientation for the foot to be landed in an (N−1)th landing action and said desired footstep path;

provisional desired gait determining means for determining a provisional desired gait of the robot which defines at least said Nth landing action using the provisionally determined desired landing position and desired landing orientation in the several landing actions ahead; and desired landing position/orientation correcting means for determining whether a desired ZMP corresponding to the determined provisional desired gait satisfies a predetermined limiting condition or not, and, if the desired ZMP does not satisfy the predetermined limiting condition, correcting at least either one of the desired landing position and desired landing orientation of the foot to be landed in said Nth landing action, thereby to determine the desired landing position and desired landing orientation of the foot to be landed in said Nth landing action.

34. A footstep determining apparatus for a legged mobile robot according to claim 29, characterized in that said legged mobile robot comprises a biped mobile robot having two legs, said desired landing position for the foot comprises a point having a predetermined positional relationship to each foot and a desired position for a representative point which is determined in advance with respect to each foot such that the representative point with respect to each foot becomes an identical point for both feet when said robot is upstanding in a predetermined reference symmetrical posture, and said desired footstep path comprises a path to be approached by said representative point.

35. A footstep determining apparatus for a legged mobile robot according to claim 34, characterized in that said representative point comprises a point set up near the heel or toe of each foot.

36. A footstep determining apparatus for determining a desired landing position and desired landing orientation for the foot of a leg to be landed in each landing action of a legged mobile robot which is movable by repeating lifting and then landing actions of each of a plurality of legs, comprising:

allowable foot landing range setting means for setting an environment-dependent allowable landing range determined under environmental conditions in which the robot moves, which is an allowable range of combinations of landing positions and landing orientations of feet landed in each landing actions of the robot;

wherein a combination of the desired landing position and desired landing orientation for the foot to be landed in each landing action of said robot is determined based on the desired landing position and desired landing orientation for the foot landed in at least the preceding landing action, and said environment-dependent allowable landing range.

37. A footstep determining apparatus for a legged mobile robot according to claim 36, characterized in that said desired landing orientation comprises an orientation about a vertical axis.

38. A footstep determining apparatus for a legged mobile robot according to claim 36, characterized in that when a desired landing position and desired landing orientation for the foot to be landed in each landing action of the robot is to be determined, a combination of a desired landing position and desired landing orientation for the foot in the landing action is determined in a common region of a self-dependent allowable landing range determined under mechanism-dependent limiting conditions of the robot itself, which include an interference between the leg making the landing action and the other leg, and the environment-dependent allowable landing range corresponding to the landing action, based on said self-dependent allowable landing range and said environment-dependent allowable landing range.

39. A footstep determining apparatus for a legged mobile robot according to claim 38, characterized in that said self-dependent allowable landing range which is used to determine a desired landing position and desired landing orientation for the foot to be landed in an Nth landing action of the robot is set based on a map or formula which is determined in advance as defining a relative allowable landing range of the foot to be landed in the Nth landing action with respect to the foot to be landed in an (N−1)th landing action.

40. A footstep determining apparatus for a legged mobile robot according to claim 38, comprising:

desired landing position/orientation provisionally determining means for, when a desired landing position and desired landing orientation for the foot to be landed in an Nth landing action of the robot is to be determined, provisionally determining a desired landing position and desired landing orientation of the foot to be landed in several landing actions ahead including said Nth landing action, based on a desired landing position and desired landing orientation for the foot to be landed in an (N−1)th landing action, said environment-dependent allowable landing range corresponding to each of the several landing actions ahead, and said self-dependent allowable landing range corresponding to each of the several landing actions ahead;

provisional desired gait determining means for determining a provisional desired gait of the robot which defines at least said Nth landing action using the provisionally determined desired landing position and desired landing orientation in the several landing actions ahead; and desired landing position/orientation correcting means for determining whether a desired ZMP corresponding to the determined provisional desired gait satisfies a predetermined limiting condition or not, and, if the desired ZMP does not satisfy the predetermined limiting condition, correcting at least either one of the desired landing position and desired landing orientation of the foot to be landed in said Nth landing action, thereby to determine a combination of the desired landing position and desired landing orientation of the foot to be landed in said Nth landing action.

41. A footstep determining apparatus for a legged mobile robot according to claim 36, characterized in that said legged mobile robot comprises a biped mobile robot having two legs, and said desired landing position for the foot comprises a point having a predetermined positional relationship to each foot and a desired position for a representative point which is determined in advance with respect to each foot such that the representative point with respect to each foot becomes an identical point for both feet when said robot is upstanding in a predetermined reference symmetrical posture.

42. A footstep determining apparatus for a legged mobile robot according to claim 41, characterized in that said representative point comprises a point set up near the heel or toe of each foot.

* * * * *

UNITED STATES PATENT AND TRADEMARK OFFICE
CERTIFICATE OF CORRECTION

| | |
|---|---|
| PATENT NO. | : 7,319,919 B2 |
| APPLICATION NO. | : 10/511360 |
| DATED | : January 15, 2008 |
| INVENTOR(S) | : Takenaka et al. |

It is certified that error appears in the above-identified patent and that said Letters Patent is hereby corrected as shown below:

Column 53, Line 26, (Claim 15, Line 8), delete "selling" and insert --setting--.

Column 53, Line 44, (Claim 15, Line 26), delete "selling" and insert --setting--.

Signed and Sealed this

Sixth Day of May, 2008

JON W. DUDAS
*Director of the United States Patent and Trademark Office*